US 9,217,089 B2

(12) United States Patent
Nagai et al.

(10) Patent No.: US 9,217,089 B2
(45) Date of Patent: Dec. 22, 2015

(54) INK FOR INKJET RECORDING

(71) Applicants: Kazukiyo Nagai, Shizuoka (JP); Yuusuke Koizuka, Shizuoka (JP); Mitsuru Naruse, Shizuoka (JP); Masayasu Nonogaki, Shizuoka (JP); Akihiko Matsuyama, Shizuoka (JP); Keita Katoh, Shizuoka (JP); Shigeyuki Harada, Shizuoka (JP); Masayuki Fukuoka, Shizuoka (JP)

(72) Inventors: Kazukiyo Nagai, Shizuoka (JP); Yuusuke Koizuka, Shizuoka (JP); Mitsuru Naruse, Shizuoka (JP); Masayasu Nonogaki, Shizuoka (JP); Akihiko Matsuyama, Shizuoka (JP); Keita Katoh, Shizuoka (JP); Shigeyuki Harada, Shizuoka (JP); Masayuki Fukuoka, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/452,811

(22) Filed: Aug. 6, 2014

(65) Prior Publication Data
US 2015/0056425 A1 Feb. 26, 2015

(30) Foreign Application Priority Data

Aug. 26, 2013 (JP) ................. 2013-174231
Apr. 18, 2014 (JP) ................. 2014-086159
Apr. 23, 2014 (JP) ................. 2014-089099

(51) Int. Cl.
*C09D 11/107* (2014.01)
*C09D 11/30* (2014.01)
*C09D 11/10* (2014.01)
*C09D 11/106* (2014.01)
*C09D 11/324* (2014.01)
*C09D 11/326* (2014.01)

(52) U.S. Cl.
CPC ............. *C09D 11/107* (2013.01); *C09D 11/10* (2013.01); *C09D 11/106* (2013.01); *C09D 11/30* (2013.01); *C09D 11/324* (2013.01); *C09D 11/326* (2013.01)

(58) Field of Classification Search
CPC ...... C09D 11/10; C09D 11/30; C09D 11/107; C09D 11/106; C09D 11/326; C09D 11/324
See application file for complete search history.

(56) References Cited

U.S. PATENT DOCUMENTS

| 2007/0100023 | A1 | 5/2007 | Burns et al. |
| 2007/0100024 | A1 | 5/2007 | Gu et al. |
| 2007/0173549 | A1* | 7/2007 | Kanzaki .......... 521/27 |
| 2010/0175585 | A1 | 7/2010 | Liu et al. |
| 2012/0242741 | A1 | 9/2012 | Hasegawa et al. |
| 2012/0328854 | A1 | 12/2012 | Matsuyama et al. |
| 2013/0123426 | A1 | 5/2013 | Clarke |
| 2014/0002539 | A1 | 1/2014 | Goto et al. |
| 2014/0072779 | A1 | 3/2014 | Matsuyama et al. |
| 2014/0092180 | A1 | 4/2014 | Matsuyama et al. |
| 2014/0120331 | A1 | 5/2014 | Koizuka et al. |
| 2014/0141209 | A1 | 5/2014 | Koizuka et al. |
| 2014/0199530 | A1 | 7/2014 | Katoh et al. |

FOREIGN PATENT DOCUMENTS

| JP | 2004-123904 | 4/2004 |
| JP | 2009-513802 | 4/2009 |
| JP | 2012-051357 | 3/2012 |
| JP | 2013-56965 | 3/2013 |
| WO | WO2007/053563 A2 | 5/2007 |
| WO | WO2010/080686 A1 | 7/2010 |

(Continued)

OTHER PUBLICATIONS

European Search Report dated Oct. 15, 2014 in corresponding European patent application No. 14 18 1226.3.

(Continued)

*Primary Examiner* — Alexander Kollias
(74) *Attorney, Agent, or Firm* — Cooper & Dunham LLP

(57) ABSTRACT

An ink for inkjet recording includes water; a hydrosoluble solvent, a pigment, and a copolymer including a salt of a diphosphonic acid group. The copolymer including a salt of a diphosphonic acid group includes structural units having the following formulae (1) and (2):

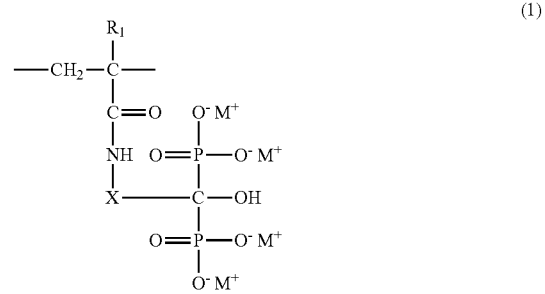

(1)

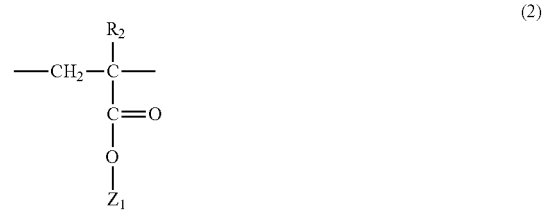

(2)

X represents an alkylene group having 1 to 3 carbon atoms, each of $R_1$ and $R_2$ represents a hydrogen atom or a methyl group, $M^+$ represents an alkali metal ion, an organic ammonium ion or a proton and $Z_1$ represents a hydrocarbon group having 6 to 22 carbon atoms. The alkali metal ion or the organic ammonium ion and the proton may be mixed, and half or more of the $M^+$ are alkali metal ions or the organic ammonium ions.

18 Claims, 4 Drawing Sheets

(56) References Cited

FOREIGN PATENT DOCUMENTS

| WO | WO/2011/067382 | * | 6/2011 | ................ B41C 1/10 |
| WO | WO2012/016125 A2 | | 2/2012 | |
| WO | WO2012/124790 A1 | | 9/2012 | |

OTHER PUBLICATIONS

Database WPI, AN 2013-E24527, XP-002730734, JP 2013 056965 (Ricoh KK), Mar. 28, 2013.
Database WPI, AN 2004-443885, XP-002730735, JP 2004 123904 (SEIKO EPSON Corp), Apr. 22, 2004.

* cited by examiner

INK FOR INKJET RECORDING

CROSS-REFERENCE TO RELATED APPLICATIONS

This patent application is based on and claims priority pursuant to 35 U.S.C. §119 to Japanese Patent Application No. 2013-174231, 2014-089099 and 2014-086159, filed on Aug. 26, 2013, Apr. 23, 2014 and Apr. 18, 2014 in the Japan Patent Office, the entire disclosure of which is hereby incorporated by reference herein.

BACKGROUND

1. Technical Field

The present invention relates to an ink for inkjet recording (hereinafter referred to as an "ink"), an ink cartridge, and an inkjet recorder.

2. Description of the Related Art

Inkjet recording methods have been popular as image forming methods because of having advantages of having simpler process and easier full-colorization than the other recording methods, and producing high-resolution images even with an apparatus having simple composition. The inkjet recording methods have a small amount of ink soar and adhere to recording media such as papers to form images thereon with an inkjet recorder, and applications thereof are expanding, e.g., personal and industrial printers and printings.

In the inkjet recording methods, an aqueous ink using a water-soluble dye is mostly used as a colorant. However, the ink has disadvantages of having poor weatherability and water resistance. Therefore, a pigment ink using a pigment instead of the water-soluble dye has been studied recently. However, the pigment ink is still inferior to the dye ink in colorability, ink discharge stability and preservation stability.

In company with improvement of higher-quality image technology of OA printers, even when recorded on plain papers as recording media with the pigment ink, image density equivalent to that of the dye ink is required. However, the pigment ink penetrates into a plain paper as a recording medium and pigment density at the surface of the paper lowers, resulting in lower image density.

In order to dry the ink adhering to the recording medium quicker to print quicker, a penetrant is added to the ink for water to penetrate into the recording medium. Then, not only water but also pigment penetrates deeper into the recording medium, resulting in lower image density.

When a plain paper is used as a recording medium, the surface of the plain paper swells due to water which is a solvent of the ink and a difference of extension rate between the front side and the back side of the paper becomes large, resulting in curl. This has not been a problem in low-speed printing because of being solved as the paper is dried.

However, in high-speed printing, paper jam may occur because a recording medium is fed with curl unsolved. An organic solvent in the ink is effectively increased to solve curl. However, it becomes difficult to assure storage stability of the ink because of being more hydrophobic.

In order to solve this problem, PCT Japanese published national phase application No. 2009-513802 discloses an inkjet composition including a liquid vehicle, a colorant, and a polymer having at least one functional group having a specific calcium index value. Monomers forming the polymer include 4-methacrylamide-1-hydroxybutane-1,1-diphosphonic acid. The colorant is destabilized by the diphosphonic acid group and Ca salt in a paper when contacting the paper, and the resultant printed image improves in quality.

Japanese published unexamined application No. JP-2012-51357-A discloses an inkjet recording method of applying a receiving liquid including a Ca salt; and an ink including a pigment combined with a group having phosphorus, a resin emulsion and a surfactant thereon. It is disclosed that a bisphosphonic acid is preferably used as the group having phosphorus, which is reacted with the Ca salt in the receiving liquid to improve feathering and fixability. However, a polymer including phosphonic acid group is not used as dispersant or an additive in a pigment dispersion, and a pigment combined with a phosphoric acid is used. Therefore, image density of an image recorded on a plain paper is not sufficiently improved. Further, the surface of a pigment needs chemical decoration, and the selection thereof is limited.

Japanese published unexamined application No. JP-2004-123904-A discloses an aqueous ink including a colorant, water, hydrosoluble organic solvent, a surfactant and a chelate agent. A low-molecular-weight hydroxy ethylidenediphosphonic acid or its salt is used as the chelate agent. The chelate agent removes calcium included in a pigment dispersion to improve discharge stability and storage stability of the ink. However, only the low-molecular-weight hydroxyethylidenediphosphonic acid is disclosed, and a polymer including a phosphonic acid is not disclosed. A relation between the chelate agent and improvement of the image density of an image when recorded on a plain paper is not disclosed, either.

SUMMARY

Accordingly, a need exist for an ink for inkjet recording, forming an image having high image density even on a plain paper, good storage stability even when including a hydrosoluble organic solvent in a large amount, and using a general-use pigment.

Another object of the present invention is to provide an ink cartridge containing the ink.

A further object of the present invention is to provide an inkjet recording method using the ink.

Another object of the present invention is to provide an inkjet recorder using the ink.

A further object of the present invention is to provide a recorded matter recorded by the ink.

These objects and other objects of the present invention, either individually or collectively, have been satisfied by the discovery of an ink for inkjet recording, including water, a hydrosoluble solvent, a pigment, and a copolymer including a salt of a diphosphonic acid group; wherein the copolymer including a salt of a diphosphonic acid group includes structural units having the following formulae (1) and (2):

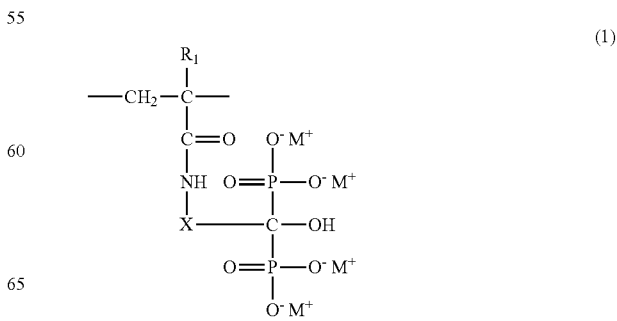

-continued

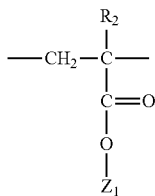
(2)

wherein X represents an alkylene group having 1 to 3 carbon atoms, each of $R_1$ and $R_2$ represents a hydrogen atom or a methyl group, $M^+$ represents an alkali metal ion, an organic ammonium ion or a proton and $Z_1$ represents a hydrocarbon group having 6 to 22 carbon atoms, wherein the alkali metal ion or the organic ammonium ion and the proton may be mixed, and half or more of the $M^+$ are alkali metal ions or the organic ammonium ions.

The copolymer including a salt of a diphosphonic acid group may further include a structural unit having the following formula (3a) or (3b):

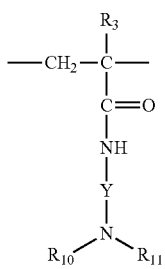
(3a)

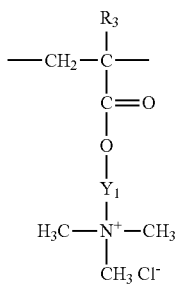
(3b)

wherein $R_3$ represents a hydrogen atom or a methyl group; each of $R_{10}$ and $R_{11}$ represents an alkyl group having 1 to 3 carbon atoms; Y represents an alkylene group having 1 to 4 carbon atoms; and $Y_1$ represents an alkylene group having 1 to 3 carbon atoms.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
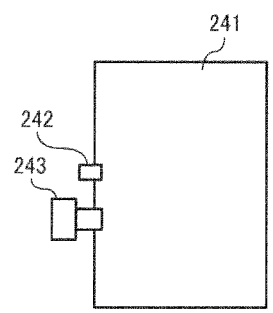
FIG. 1 is a schematic plain view illustrating an embodiment of the ink container of the present invention.

The present invention provides an ink for inkjet recording, forming an image having high image density even when using a pigment without chemical decoration including a phosphorous-containing group on a plain paper and having good storage stability even when including a hydrosoluble organic solvent in a large amount.

Specific examples of the alkali metal in the alkali metal ion of $M^+$ in the formula (1) include, but are not limited to, lithium, sodium and potassium.

Specific examples of the organic amine in the organic ammonium ion of $M^+$ include, but are not limited to, alkyl amines such as mono, di or trimethylamine and mono, di or triethylamine; alcohol amines such as ethanol amine, diethanolamine, triethanolamine, methylethanolamine(2-(methylamine)ethanol), methyldiethanolamine, dimethylethanolamine, monopropanolamine, dipropanolamine, tripropanolamine, isopropanolamine, trishydroxymethylaminomethane and 2-amino-2-ethyl-1,3propanedil (AEPD); and cyclic amine such as choline, morpholine, N-methylmorpholine, N-methyl-2-pyrrolidone and 2-pyrrolidone.

Quaternary organic ammonium ions are preferably used as the organic ammonium ions of $M^+$ as well. Specific examples thereof include, but are not limited to, tetramethylammonium ions, tetraethylammonium ions, tetrapropylammonium ions, tetrabutylammonium ions, tetraamylammonium ions, benzyltrimethylammonium ions, hydroxyethyltrimethylammonium ions, methyltrioctylammonium ions and trimethylstearylammonium ions.

Particularly, the potassium ion, sodium ion and alkyl ammonium ion are preferably used.

In the alkyl ammonium ions, tetraalkylammonium ions having 1 to 5 alkyl groups are more preferably used because of being capable of providing an ink having low viscosity and good storage stability.

Specific examples thereof include, but are not limited to, tetraethylammonium ions, tetrabutylammonium ions, methyltributylammonium ions, methyltriamylammonium ions, triethylmethylammonium ions and ethyltrimethylammonium ions.

Not less than half or all of $M^+$ are preferably alkali metal ions or organic ammonium ions, and the rest is preferably a hydrogen ion (proton).

Specific examples of the alkylene group having 1 to 3 carbon atoms of X in the formula (1) include q methylene group, an ethylene group and a propylene group.

Specific examples of the hydrocarbon group having 6 to 22 carbon atoms used as $Z_1$ in the formula (2) include, but are not limited to, aromatic hydrocarbon groups such as a phenyl group and a naphthyl group; cyclic saturated hydrocarbon groups such as a cyclohexyl group; chain saturated hydrocarbon groups such as a dodecyl group, a stearyl group and an isostearyl group; aralkyl groups such as a benzyl group; and chain unsaturated hydrocarbon groups such as a 9-octadecenyl group.

Particularly, the benzyl group, a phenetyl group and an alkyl group having 12 to 22 carbon atoms are preferably used. Specific examples of the alkyl group having 12 to 22 carbon atoms include, but are not limited to, straight-chain or branched-chain alkyl groups such as a dodecyl group, a tetradecanyl group, a hexadecanyl group, an octadecanyl group and a docosanyl group.

The structural unit having the formula (1) preferably has a weight ratio of from 30 to 70% by weight, more preferably from 40 to 60% by weight, and furthermore preferably from 45 to 55% by weight in terms of high image density, and good dispersion and storage stability of the resultant ink.

The copolymer including a salt of a phosphonic acid group used in the present invention can be prepared by the following method of preparing the polymer of the present invention. The copolymer including the structural units having the formulae (1) and (2) can widely be used in various fields, and is preferably used as a pigment dispersant, a pigment concentration improver, a binder resin for pigment and a viscosity adjustor in an ink for inkjet recording <Method of Preparing Polymer>

The polymer for use in the present invention can be synthesized by radically polymerizing polymeric materials including compounds (monomers) having the following formulae (4) and (5) to prepare a polymer, and neutralizing the polymer with an alkali metal base, an organic amine base or an organic ammonium base:

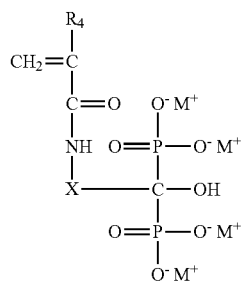

(4)

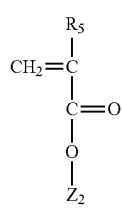

(5)

wherein X represents an alkylene group having 1 to 3 carbon atoms, each of $R_4$ and $R_5$ represents a hydrogen atom or a methyl group, $M^+$ represents an alkali metal ion, an organic ammonium ion or a proton and $Z_2$ represents a hydrocarbon group having 6 to 22 carbon atoms.

The polymeric materials may further include a monomer having the following formula (6a) or (6b):

(6a)

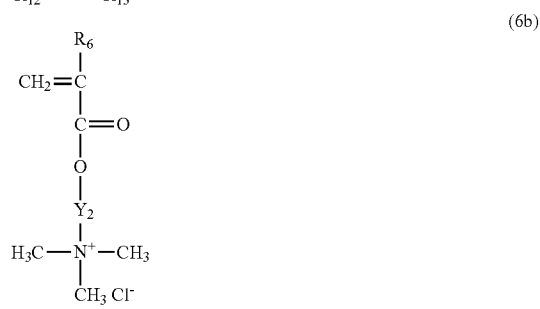

(6b)

wherein $R_6$ represents a hydrogen atom or a methyl group; each of $R_{12}$ and $R_{13}$ represents an alkyl group having 1 to 3 carbon atoms; Y represents an alkylene group having 1 to 4 carbon atoms.

The number of acid groups of from 0 to 4 out of 4 in the formula (1) to be neutralized can be adjusted. The number of the acid groups to be neutralized in the formula (1), i.e. the number of $M^+$ is preferably from 2 to 4, and more preferably 3.

Specific examples of the monomer having the formula (4) include, but are not limited to, sodium hydrogen-1-hydroxy-4-methacrylamide-1-phosphonobutylphosphonate, sodium 1-hydroxy-4-methacrylamidebutane-1,1-diylbis(hydrogenphosphonate), sodium 1-(hydrogenphosphonate)-1-hydroxy-4-methacrylamidebutylphosphonate and sodium 1-hydroxy-4-methacrylamidebutane-1,1-diyldiphosphonate.

These methacryl may be acryl, and sodium may be potassium or an organic ammonium ion.

Even when $M^+$ are all proton, these can be used as a monomer of 1-hydroxy-4-methacrylamidebutane-1,1-diyldiphosphonate.

A monomer having the formula (4), e.g., 1-hydroxy-4-(meth)acrylamidebutane-1,1-diyldiphosphonic acid when X is propylene can be prepared by neutralizing an alendronic acid with an alkali metal base, an organic amine base or an organic ammonium base in a range of from 1 to 3 equivalents, and reacting the neutralized alendronic acid with (meth) acrylic acid chloride.

The number of salts can be adjusted after the reaction.

Specific examples of the hydrocarbon group having 6 to 22 carbon atoms used as $Z_2$ in the formula (5) include, but are not limited to, aromatic hydrocarbon groups such as a phenyl group and a naphthyl group; cyclic saturated hydrocarbon groups such as a cyclohexyl group; chain saturated hydrocarbon groups such as a dodecyl group, a stearyl group and an isostearyl group; aralkyl groups such as a benzyl group; and chain unsaturated hydrocarbon groups such as a 9-octadecenyl group.

Specific examples of monomers of the aromatic hydrocarbon groups such as a phenyl group and a naphthyl group of the hydrocarbon group having 6 to 22 carbon atoms include, but are not limited to, phenyl(meth)acrylate and naphthyl(meth)acrylate. Specific examples of monomers of the cyclic saturated hydrocarbon groups such as a cyclohexyl group of the hydrocarbon group having 6 to 22 carbon atoms include, but are not limited to, cyclohexyl(meth)acrylate.

Specific examples of monomers of the chain saturated hydrocarbon groups such as a dodecyl group, a stearyl group and an isostearyl group of the hydrocarbon group having 6 to 22 carbon atoms include, but are not limited to, hexyl(meth)acrylate, 2-ethyl hexyl(meth)acrylate, octyl(meth)acrylate, nonyl(meth)acrylate, decyl(meth)acrylate, dodecyl(meth)acrylate, hexadecyl(meth)acrylate, oxadecyl(meth)acrylate and dococyl(meth)acrylate.

Specific examples of monomers of the aralkyl groups such as a benzyl group of the hydrocarbon group having 6 to 22 carbon atoms include, but are not limited to, benzyl(meth)acrylate and phenetyl(meth)acrylate.

Specific examples of monomers of the chain unsaturated hydrocarbon groups such as a 9-octadecenyl group of the hydrocarbon group having 6 to 22 carbon atoms include, but are not limited to, oleyl(meth)acrylate.

(Meth)acrylate represents both of methacrylate and acrylate.

Specific examples of the monomer having the formula (5) include, but are not limited to, benzylacrylate, benzyl methacrylate, phenetyl acrylate, phenetyl methacrylate, cyclohexylacrylate, cyclohexylmethacrylate, dodecylacrylate, dodecylmethacrylate, hexadecanyl acrylate, hexadecanyl methacrylate, octadecanyl acrylate, octadecanyl methacrylate, icosanyl acrylate, icosanyl methacrylate, docosanyl acrylate and docosanyl methacrylate.

Specific examples of monomers having the formula (6a) include, but are not limited to, 3-dimethylaminopropylacrylamide, 3-diethylaminopropylacrylamode, 3-fi-n-propylaminopropylacrylamide, 3-di-isopropylaminoprppylacrylamide, 3-ethylmethylaminopropylacrylamide, 3-ethylisopropylaminopropylacrylamide, 2-dimethylaminoethylacrylamide, 2-diethylaminoethylacrylamide, 2-disopropylaminoethylacrylamide, 2-ethylmethylaminopropylacrylamide, dimethylamino methyl acrylamide and diethylamino methyl acrylamide, Specific examples of monomers having the formula (6b) include, but are not limited to, trimethyl(meth)acryloyloxy methylammonium chloride, trimethyl-2-(meth)acryloyloxy methylammonium chloride and trimethyl-3-(meth)acryloyloxy propyl ammonium chloride.

The monomers having the formulae (6a) and (6b) may be combined.

The polymer including the structural units having the formulae (1), (2), (3a) and (3b) is synthesized by known methods such as bulk polymerization methods, solution polymerization methods, suspension polymerization methods and emulsion polymerization methods. A radical polymerization initiator is preferably used because polymerizing operation and molecular weight control are easy. A solution polymerization method of polymerizing in a mixed solution of an organic solvent and water is more preferably used.

A solvent used for radical polymerization by the solution polymerization method is not particularly limited. The monomer having the formula (5) and optionally the monomer having the formula (6a) or (6b) dissolved in an organic solvent is preferably fed to an aqueous solution of the monomer having the formula (4) to be polymerized. Therefore, the organic solvent is preferably hydrosoluble. Specific examples thereof include, but are not limited to, alcohol solvents such as methanol and ethanol; ether solvents such as tetrahydrofuran; and amide solvents such as N,N-dimethylformamide.

Specific examples of radical polymerization initiators include, but are not limited to, such as peroxyketal, hydroperoxide, dialkylperoxide, diacylperoxide, peroxydicarbonate, peroxyester, cyano azobisisobutylonitrile, azobis(2,2'-isovaleronitrile), and non-cyano dimethyl-2,2'-azobisisobutylate. Organic peroxides and azo compounds having an easily-controllable molecular weight and a low decomposition temperature are preferably used, and the azo compounds are more preferably used. The polymerization initiators are preferably used in an amount of from 1 to 20% by weight based on total weight of polymerizable monomers.

In order to control a molecular weight of the polymer, chain transfer agents such as mercaptoacetate, mercaptopropionate, 2-propanethiol, thiophenol, dodecylmercaptane, 1-dodecanethiol and α-thioglycerol may be added in a proper amount.

Typically, the polymerization temperature is preferably from 50 to 150° C., and more preferably from 60 to 100° C.

The polymerization time is preferably from 3 to 48 hrs.

The polymer is neutralized with an alkali metal base or an organic amine base.

The alkali metal base or the organic amine base can neutralize a part or all of phosphonic acid groups of the polymer.

When the neutralization is completed in the process of preparing the monomer having the formula (4), this neutralization process can be omitted. Typically, 1 to 2 equivalents are neutralized in the process of preparing the monomer and the rest acidic groups are neutralized after polymerized.

The neutralization with the alkali metal base or the organic amine base can be made while a pigment and the polymer are mixed in the process of preparing an ink.

Specifically, in a flask equipped with a stirrer, a thermometer, an inactive gas (nitrogen or argon) inlet tube and a condenser, materials such as an aqueous solution including the monomer having the formula (4), an organic solvent solution including the monomer having the formula (5), optionally the monomer having the formula (6a) or (6b), a polymerization initiator and a molecular weight regulator are placed and stirred in a batch or continuously under an inactive gas. After reacted at from 60 to 150° C., the solution is neutralized with the alkali metal base or the organic amine base.

The neutralization can be controlled according to an acid value of the resin.

The acid value of a resin is measured by dissolving or dispersing a weighed resin in water, a hydrosoluble organic solvent or their mixed solvent and subjecting the solution or the dispersion to neutralization titration with a potassium hydroxide methanol solution having a specific concentration and a thymolphthalein as an indicator.

In the present invention, 3 out of 4 acid groups of the bisphosphonic acid compound are neutralized when the thymolphthalein changes in color (pH of from 8 to 9). Therefore, when the acid value is measured with a thymolphthalein as an indicator and a base is placed according thereto, a structure in which 3 acid groups are neutralized is formed.

When synthesized, the monomer having the formula (5) is preferably included in an amount of from 30 to 70% by weight, more preferably from 40 to 60% by weight, and furthermore preferably from 45 to 55% by weight per 100% by weight of the monomer having the formula (4).

The resultant polymer (copolymer) has a molecular weight distribution according to a polymerization degree. Typically, the molecular weight is measured by gel permeation chromatography (GPC) with ease. However, the polymer is a dissociative polymer and difficult to measure due to adsorption to GPC column.

In the present invention, a viscosity of the polymer when being a solution having a specific concentration is a substitutional property instead of the molecular weight. The viscosity is measured as follows. An aqueous solution including the copolymer in an amount of 10% by weight is prepared. According to the viscosity of a sample, the viscosity is measured by viscometer RE500L from TOKI SANGYO CO., LTD. at 50 or 100 rpm.

An aqueous solution (10% by weight at 25° C.) of the copolymer including a salt of the phosphonic acid group of the present invention preferably has a viscosity of from 1.5 to 4.0 mPa·s, and more preferably from 1.7 to 3.0 mPa·s.

When not less than 1.5 mPa·s, the molecular weight is suitable and dispersion stability is good, and deterioration of image density is difficult to occur due to lowering of calcium reactability. When not greater than 4.0 mPa·s, the molecular weight is not too excessive, which prevents the ink from increasing in viscosity, and the inkjet head from clogging and defectively discharging. In addition, deterioration of storageability of a pigment dispersion and an ink are difficult to occur due to deterioration of dispersibility and dispersion stability.

When from 1.7 to 3.0 mPa·s, deterioration of image density and ink storageability are more difficult to occur. Deterioration of ink storageability causes clogged head and defective discharge.

The molecular weight of the polymer including the structural units (1) and (2), and optionally (3a) or (3b) can be controlled rather by the polymerization temperature, an amount of the polymerization initiator and concentrations of the monomers when reacted.

The resultant polymer tends to have a low molecular weight when polymerized at high temperature for a short time, and a high molecular weight when polymerized at low temperature for a long time.

The resultant polymer tends to have a low molecular weight when the content of the polymerization initiator is high, and a high molecular weight when the content of the polymerization initiator is low.

The resultant polymer tends to have a low molecular weight when the concentrations of the monomers are high, and a high molecular weight when concentrations of the monomers are low.

The content of the chain transfer agent can control the molecular weight of the copolymer of the present invention. The chain transfer agent is known to receive a radical from a grown polymer chain to stop the polymer from elongating. The chain transfer agent having received a radical attacks a monomer to resume polymerization, which contributes to control of a molecular weight distribution and an average molecular weight.

(Ink for Inkjet Recording)

The ink for inkjet recording of the present invention includes water, a hydrosoluble solvent, a pigment, and a copolymer including a salt of a diphosphonic acid group including structural units having the formulae (1) and (2), and optionally (3a) or (3b).

<Copolymer Including Structural Units Having Formulae (1) and (2), and Optionally (3a) or (3b)>

The polymer including the structural unit having the formula (1) in the ink for inkjet recording of the present invention has a dibasic acid structure of adjacent phosphonic acids. In contrast to a low-molecular-weight compound, the polymer includes many diphosphonic acid groups in its molecule. As a result, the polymer including the structural unit having the formulae (1) has better hydrophilicity than a monobasic acid because of being capable of including more hydrophilic groups. In addition, the polymer includes a phosphonic acid group readily reactable with Ca ions, and has an effect of chelating Ca ions because of being a dibasic acid. When contacting Ca ions, the polymer more firmly combines therewith to be hydrophobized.

The structural unit having the formula (2) brings hydrophobicity to the polymer, increases wettability and adsorptivity with a pigment to improve dispersion stability. Further, the polymer improves aggregability of a resin when contacting Ca ions because of a balance with the hydrophilic phosphonic acid group having the formula (1). In addition, the reason is not known, but the polymer prevents the phosphonic groups from assembling therein to further improve storage stability in an aqueous ink.

Therefore, the polymer can be used as a dispersant.

An ink for inkjet recording including the polymer including the structural units having the formulae (1) and (2), and optionally (3a) and (3b) has good dispersion and storage stability.

Further, when the ink is used on a paper, Ca ions from the paper (even from a plain paper including Ca ions in a small amount) hydrophobize the copolymer. Further, the structural unit having the formula (2) involves a pigment and agglutinates to retain the pigment on the paper because of having high adsorptivity to the pigment. Therefore, the resultant image has image density.

The structural unit having the formula (3a) is a basic tertiary amine structure and combined with an acidic group present on the surface of a pigment due to acid and base interaction. A hydrosoluble solvent enters an ink vehicle and weakens hydrophobic interaction between a hydrophobic group and the pigment. This prevents a resin from lowering its adsorbability to the pigment and improves pigment dispersibility and storage stability of an ink including a hydrosoluble solvent. For example, a carboxyl group is often present on the surface of carbon black. The basic tertiary amino group of the structure having the formula (3a) is strongly adsorbed to the surface of a pigment due to acid and base interaction.

The structural unit having the formula (3b) has a quaternary ammonium base and combines with an acidic group present on the surface of a pigment due to acid and base interaction. A hydrosoluble solvent enters an ink vehicle and weakens hydrophobic interaction between a hydrophobic group and the pigment. This prevents a resin from lowering its adsorbability to the pigment and improves pigment dispersibility and storage stability of an ink including a hydrosoluble solvent. For example, a carboxyl group is often present on the surface of carbon black. The quaternary ammonium base of the structure having the formula (3b) is strongly adsorbed to the surface of a pigment due to acid and base interaction.

It is not known exactly why, but copolymerization of the structural units having the formulae (1) and (2), and optional (3a) or (3b) prevents phosphonic acid groups from assembling in a polymer to further improve storage stability of an aqueous ink.

The content of the polymer including the structural units having the formulae (1) and (2), and optional (3a) or (3b) in the ink for inkjet recording is not particularly limited. The ink preferably includes the polymer in a solid content of from 0.05 to 10% by weight, more preferably from 0.5 to 5% by weight, and furthermore preferably from 1 to 3% by weight. The image density improves when the content is not less than 0.05% by weight. When not greater than 10% by weight, the ink has suitable viscosity when discharged from the inkjet head.

When the polymer including the structural units having the formulae (1) and (2), and optional (3a) or (3b) is used as a pigment, the image density on a plain paper and storage stability of an ink including a hydrosoluble organic solvent much further improve.

The content of the polymer including the structural units having the formulae (1) and (2), and optional (3a) or (3b) is not particularly limited when used as a pigment dispersant, and preferably from 1 to 100 parts by weight, more preferably from 5 to 80 parts by weight, and furthermore preferably from 10 to 50 parts by weight per 100 parts by weight of the pigment in terms of high image density, and good dispersion and storage stability.

<Water>

As the water, ion-exchanged water, ultrafiltrated water, Mill-Q water, pure water such as distilled water or ultrapure water can be used.

The content of the water used in the ink for inkjet recording is not particularly limited.

<Pigment>

Inorganic pigments and organic pigments can be used as the pigment. These can be used alone or in combination.

Specific examples of the inorganic pigments include, but are not limited to, titanium oxide, iron oxide, calcium carbonate, barium sulfate, aluminum hydroxide, barium yellow, cadmium red, chrome yellow and carbon black. Among them, the carbon black is preferably used. The carbon black is produced by known methods such as a contact method, a furnace method, and a thermal method.

Specific examples of the organic pigment include, but are not limited to, azo pigments, azomethine pigments, polycyclic pigments, dye chelate, a nitro pigment, a nitroso pigment, and aniline black. Among them, the azo pigments and the polycyclic pigments are preferably used.

Specific examples of the azo pigments include, but are not limited to, azo lake, an insoluble azo pigment, a condensed azo pigment, and a chelate azo pigment. Specific examples of the polycyclic pigments include, but are not limited to, a phthalocyanine pigment, a perylene pigment, a perinone pigment, an anthraquinone pigment, a quinacridon pigment, a dioxazine pigment, an indigo pigment, a thioindigo pigment, an iso-indolinone pigment, and a quinophtharone pigment. Specific examples of the dye chelate include, but are not limited to, basic dye chelate, and an acid dye chelate.

Specific examples of the pigment for black ink include carbon black (C.I. Pigment Black 7) such as furnace black, lamp black, acetylene black, and channel black; metals such as copper, iron (C.I. Pigment Black 11); metal oxides such as titanium oxide; and organic pigments such as aniline black (C.I. Pigment Black 1).

The carbon black preferably has an average primary particle diameter of from 15 to 40 nm, a BET specific surface area of from 50 to 300 m$^2$/g, a DBP oil absorption of from 40 to 150 mL/100 g, a volatile matter content of from 0.5 to 10%, and a pH of from 2 to 9.

Specific examples of marketed products of the carbon black include, but are not limited to, Printex 35 and Special Black from Degussa AG.

Specific examples of the pigment for yellow ink include, but are not limited to, C.I. Pigment Yellow 154 and C.I. Pigment Yellow 174.

Specific examples of the pigment for magenta ink include, but are not limited to, C.I. Pigment Red 202 and C.I. Pigment Violet 19.

Specific examples of the pigment for cyan ink include, but are not limited to, C.I. Bat Blue 60.

New pigments may be used in the present invention.

When Pigment Yellow 74 as a yellow pigment, Pigment Red 122 or a Pigment Violet 19 as a magenta pigment and a Pigment Blue 15:3 as a cyan pigment are used, a well-balanced ink having good color tone and light resistance can be obtained.

The pigment preferably has a volume-average particle diameter (D50) not greater than 150 nm, and more preferably not greater than 100 nm to improve discharge stability and prevent the nozzle from clogging and the ink from discharge in a curve.

The volume-average particle diameter (D50) of the pigment us measured by Microtrac UPA from NIKKISO CO., LTD. in an environment of 23° C. and 55% RH.

The ink preferably includes the pigment in an amount of from 0.1 to 20% by weight, and more preferably from 1 to 20% by weight.

It is preferable that water, a pigment, a dispersant and other optional components are mixed and dispersed by a disperser to prepare a pigment dispersion in which a particle diameter thereof is adjusted and that the dispersion is included in the ink.

The pigment dispersion is preferably filtered to remove coarse particles and deaerated when necessary.

The pigment dispersion preferably includes a pigment in an amount of from 0.1 to 50% by weight, and more preferably from 0.1 to 30% by weight.

Specific examples of the dispersant include, but are not limited to, surfactants such as anionic surfactants, cationic surfactant, ampholytic surfactants and nonionic surfactants; sodium naphthalenesulfonate formalin condensates; and polymeric dispersants. These can be used alone or in combination.

Specific examples of the anionic surfactant include, but are not limited to, alkylsulfocarboxylic acid salts, α-olefinsulfonic acid salts, polyoxyethylene alkyl ether acetic acid salts, N-acylamino acids or salts thereof, N-acylmethyltaurine salts, alkylsulfuric acid salts, polyoxyalkyl ether sulfuric acid salts, alkylsulfuric acid salts, polyoxyethylene alkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, and dioctyl sulfosuccinic acid salts.

Specific examples of the cationic surfactant include, but are not limited to, 2-vinylpyridine derivatives and poly-4-vinylpyridine derivatives.

Specific examples of the amphoteric surfactant include, but are not limited to, betaine lauryldimethylamino acetate, 2-alkyl-N-carboxymethyl-N-hydroxyethylimidazolinium betaine, betaine coconut oil fatty acid amidopropyldimethylamino acetate, polyoctylpolyaminoethylglycine, and imidazoline derivatives.

Specific examples of the nonionic surfactant include, but are not limited to, ether based surfactants such as polyoxyethylene nonylphenyl ether, polyoxyethylene octylphenyl ether, polyoxyethylene dodecyl phenyl ether, polyoxyethylene octylphenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene glycol (alcohol) based surfactants such as 2,4,7,9-tetramethyl-5-decyne-4,7-diol, 3,6-dimethyl-4-octyne-3,6-diol and 3,5-dimethyl-1-hexine-3-ol.

Among these, sodium naphthalenesulfonate formalin condensates are preferably used.

The sodium naphthalenesulfonate formalin condensates preferably include dimeric, trimeric and tetrameric naphthalenesulfonate in an amount of from 20 to 80% by weight such that the resultant ink has good viscosity and dispersibility, and improves in storage stability, which prevents the nozzle form clogging.

<Hydrosoluble Organic Solvent>

The hydrosoluble organic solvent has at least an effect of a wetter or s penetrant.

Specific examples thereof include, but are not limited to polyols such as glycerin, ethylene glycol, diethylene glycol, isopropylidene glycerol, 1,3-butane diol, 3-methyl-1,3-butane diol, triethylene glycol, propylene glycol, dipropylene glycol, trimethylol propane, trimethylol ethane, ethylene glycol, diethylene glycol, dipropylene glycol, tripropylene glycol, tetraethylene glycol, hexylene glycol, polyethylene glycol, polypropylene glycol, 1,5-pentane diol, 1,6-hexane diol, glycerol, 1,2,6-hexane triol, 1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether, and ethylene glycol monobenzyl ether; nitrogen-containing heterocyclic compounds such as 2-pyrolidone, N-methyl-2-pyrolidone, N-hydroxyethyl-2-pyrrolidone, 1,3-dimethyl imidazolidinone, $\epsilon$-caprolactone, and $\gamma$-butyllactone; amides such as formamide, N-methylformamide, N,N-dimethylformamide, N,N-dimethyl-$\beta$-methoxy propion amide, and N,N-dimethyl-$\beta$-butoxy propion amide; amines such as monoethanol amine, diethanol amine, triethanol amine, monoethyl amine, diethyl amine, and triethyl amine; sulfur-containing compounds such as dimethyl sulfoxide, sulfolane, and thiodiethanol; 3-ethyl-3-hydroxymethyl oxetane, propylene carbonate, and ethylene carbonate.

Among these solvents, 3-ethyl-3-hydroxymethyloxetane, isopropylidene glycerol, N,N-dimethyl-$\beta$-methoxy propion amide, and N,N-dimethyl-$\beta$-butoxy propion amide are particularly preferable. These effectively prevent plain papers from curling.

In addition, 1,3-butane diol, diethylene glycol, 2,2,4-trimethyl-1. 3-pentanediol, triethyleneglycol and glycerin are effectively used to prevent defective discharge due to moisture evaporation.

Specific examples of the hydrosoluble organic solvent having penetrance more than wettability include, but are not limited to, 2-ethyl-1,3-hexanediol [solubility: 4.2%)(25°)] and 2,2,4-trimethyl-1,3-pentanediol [solubility: 2.0%)(25°)].

Specific examples of other polyol compounds include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1, 2-diol.

Other penetrants can be used in combination with the above-mentioned penetrants as long as the penetrants can be dissolved in the ink, and the properties of the ink can be controlled so as to fall in the desired ranges. Specific examples thereof include alkyl or aryl ethers of polyalcohols such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; and lower alcohols such as ethanol.

Saccharides are also preferable as other solid hydrosoluble organic materials.

Specific examples of the saccharides include, but are not limited to, monosaccharides, disaccharides, oligosaccharides (including trisaccharides and tetrasaccharides), and polysaccharides. Specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and are materials that are present widely in nature, for example, $\alpha$-cyclodextrine and cellulose. In addition, specific examples of derivatives of these saccharides include, but are not limited to, reducing sugars (for example, sugar alcohols (represented by $HOCH_2(CHOH)_nCH_2OH$, where n represents an integer of from 2 to 5) of the sugar groups specified above, oxidized sugars (e.g., aldonic acid and uronic acid), amino acid, and thio acid. Among these, sugar alcohols are preferable and specific examples thereof include, but are not limited to, maltitol and sorbit.

The blend ratio of the pigment and the wetter has a large impact on the discharging stability of ink injected from a head. If the blending amount of the wetter is too small while the ratio of the solid pigment portion is high, water evaporation around ink meniscus of nozzles tends to be accelerated, resulting in bad discharging performance.

The blending ratio of the wetter is preferably from 10 to 60% by weight and more preferably from 20 to 60% by weight based on the ink. The ink having such a content ratio is extremely good about the test for drying, preservation, and reliability.

<Other Components>

The ink of the present invention can include other components when necessary. Specific examples thereof include, but are not limited to, a dispersant, a pH adjuster, a water-dispersible resin, an antiseptic and antifungal agent, a chelate reagent, an antirust agent, an antioxidant, an UV absorber, an oxygen absorber, and a light stabilizer.

—Surfactant—

Specific examples the surfactant include, but are not limited to, anionic surfactants, cationic surfactants, nonionic surfactants, ampholytic surfactants and fluorine-containing surfactants. Among these, the nonionic surfactants and the fluorine-containing surfactants are preferably used.

Specific examples of the anionic surfactants include, but are not limited to, alkyl allyl, alkylnaphthalene sulfonate, alkyl phosphate, alkyl sulfate, alkyl sulfonate, alkylether sulfate, alkylsulfosuccinate, alkyl ester sulfate, alkylbenzene sulfonate, alkyl diphenylether disulfonate, alkyl aryl ether phosphate, alkyl aryl ether sulfate, alkyl aryl ether ester sulfate, olefin sulfonate, alkane olefin sulfonate, polyoxyethylenealkylether phosphate, polyoxyethylenealkylether ester salt sulfate, ether carboxylate, sulfosuccinate, $\alpha$-sulfofatty acid ester, fatty acid salts, condensates of higher fatty acid and amino acid, and naphthenate.

Specific examples of the cationic surfactants include, but are not limited to, alkylamine salts, dialkylamine salts, aliphatic amine salts, benzalkonium salts, quaternary ammonium salts, alkyl pyridinium slats, imidazolinium salts, sulfonium salts, and phosphonium salts.

Specific examples of the nonionic surfactants include, but are not limited to, acetylene glycol surfactants, polyoxyethylenealkylether, polyoxyethylenealkylphenylether, polyoxyethylenealkylester, and polyoxyethylene sorbitan fatty acid ester.

Specific examples of the ampholytic surfactants include, but are not limited to, imidazoline derivatives such as imidazolinium betaine, dimethyl alkyl lauryl betaine, alkyl glycine, and alkyl di(aminoethyl)glycin.

Specific examples of the fluorine-containing surfactants include, but are not limited to, surfactants having the following formulae (I) to (III):

$$CF_3CF_2(CF_2CF_2)_m—CH_2CH_2O(CH_2CH_2O)_nH$$

wherein each of m represents 0 or an integer of from 1 to 10 and n represents 0 or an integer of from 1 to 40.

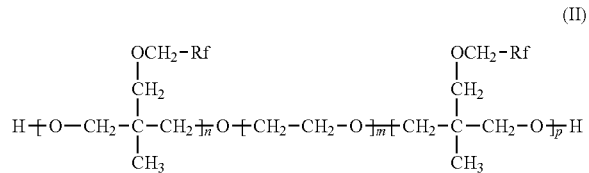

(II)

wherein Rf represents a fluorine-containing group; m, n and p represent integers of from 6 to 25, 1 to 4 and 1 to 4, respectively.

The fluorine containing group is preferably a perfluoroalkyl group. The perfluoroalkyl group preferably has 1 to 10, and more preferably 1 to 3 carbon atoms. Specific examples thereof include, but are not limited to, $—C_nF_{2n-1}$ (n is an integer of from 1 to 10) such as $—CF_3$, $—CF_2CF_3$, $—C_3F_7$ and $—C_4F_9$. Among these, $—CF_3$ and $—CF_2CF_3$ are preferable.

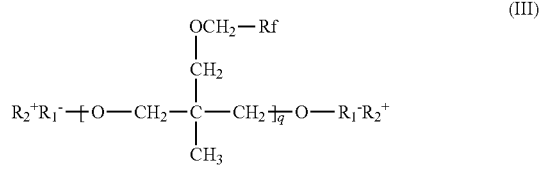

(III)

wherein Rf represents a fluorine-containing group; $R_2^+$ represents a cationic group; $R_1$ represents an anionic group; and q is an integer of form 1 to 6.

The fluorine containing group is preferably a perfluoroalkyl group such as $—CF_3$, $—CF_2CF_3$, $—C_3F_7$ and $—C_4F_9$. Specific examples of the cationic group include, but are not limited to, a quaternary ammonium group, alkali metal ions such as sodium and potassium, triethylamine and triethanolamine Among these, the quaternary ammonium group is preferable. Specific examples of the anionic group include, but are not limited to, $COO^-$, $SO_3^-$, $SO_4^-$ and $PO_4^-$.

Synthesized or marketed fluorine-containing surfactants can be used.

Specific examples of such marketed fluorine-containing surfactants include SARFRONs S-111, S-112, S-113, S-121, S-131, S-132, S-141 and S-145, which are manufactured by Asahi Glass Co., Ltd.; FLUORADs FC-93, FC-95, FC-98, FC-129, FC-135, FC-170C, FC-430 and FC-431, which are manufactured by Sumitomo 3M Ltd.; MEGAFACEs F-470, F-1405 and F-474, which are manufactured by DIC Corp.; ZONYLs TBS, FSP, FSA, FSN-100, FSN, FSO-100, FSO, FS-300 and UR, which are manufactured by Du Pont; FT-110, FT-250, FT-251, FT-400S, FT-150 and FT-400SW, which are manufactured by Neos Co., Ltd.; and POLYFOX PF-151N, which is manufactured by Om Nova Solutions, Inc. Among these products, FS-300 (Du Pont); FT-110, FT-250, FT-251, FT-400S, FT-150, and FT-400SW (Neos Co., Ltd.); and POLYFOX PF-151N (Om Nova Solutions, Inc.) are preferable in terms of reliability and colorability.

—pH Adjustor—

The pH adjuster is not particularly limited as long as it may adjust a pH of the aqueous ink being prepared to 8.5 to 11 without adversely affecting the ink. Specific examples of the pH adjuster include, but are not limited to, alcohol amines, hydroxides of an alkali metal element, hydroxides of ammonium, hydroxides of phosphonium, and carbonates of an alkali metal.

Specific examples the alcohol amines include, but are not limited to, diethanolamine, triethanolamine, and 2-amino-2-ethyl-1,3-propanediol.

Specific examples the hydroxides of an alkali metal element include, but are not limited to, lithium hydroxide, sodium hydroxide and potassium hydroxide.

Specific examples of the hydroxides of ammonium include, but are not limited to, ammonium hydroxide and quaternary ammonium hydroxide.

Specific examples of the hydroxides of phosphonium include, but are not limited to, quaternary phosphonium hydroxide.

Specific examples of the carbonates of an alkali metal include, but are not limited to, lithium carbonate, sodium carbonate and potassium carbonate.

—Water-Dispersible Resin—

The water-dispersible resin preferably has good film formability (image formability), high repellency and high weatherablity to form an image having high repellency and high image density (high colorability).

Specific examples of the water-dispersible resin include, but are not limited to, condensed synthetic resins such as polyester resins, polyurethane resins, epoxy resins, polyamide resins, polyether resins, (meth)acrylic resins, acrylic-silicone resins and fluorine-containing resins; additional synthetic resins such as polyolefin, polystyrene resins, polyvinylalcohol resins, polyvinyl ester resins, polyacrylic resins and unsaturated carboxylic resins; and natural polymers such as celluloses, rosins and natural rubbers, which may be used in combination. Among these, polyurethane resin fine particles, acrylic-silicone resin fine particles and fluorine-containing resin fine particles are preferably used.

A volume-average particle diameter (D50) of the water-dispersible resin is related with a viscosity of a dispersion liquid. The smaller the particle diameter, the larger the viscosity when the composition is the same. The volume-average particle diameter (D50) of the water-dispersible resin is preferably not less than 50 nm so that the ink may not have too high a viscosity. When the particle diameter is some ten μm, the resin cannot be used because of being larger than the nozzle of inkjet head. Even when smaller than the nozzle, the large-size particles in the ink deteriorates discharge stability thereof. Therefore, the volume-average particle diameter (D50) of the water-dispersible resin is more preferably not greater than 200 nm so as not to impair discharge stability of the ink.

The water-dispersible resin preferably fixes a pigment dispersion on a paper and films it at normal temperature to improve fixability of the pigment.

Therefore, the water-dispersible resin preferably has a minimum filming temperature (MFT) not greater than 30° C.

The water-dispersible resin preferably has a glass transition temperature not less than −30° C. because the resin film has higher viscosity otherwise, which causes tack of the printed matter.

The ink preferably includes the water-dispersible resin in an amount of from 1 to 15% by weight, and more preferably from 2 to 7% by weight.

—Antiseptic and Antifungal Agent—

Specific examples the antiseptic and antifungal agent include, but are not limited to, sodium dehydroacetate, sodium sorbate, 2-pyridinethiol 1-oxide sodium, sodium benzoate, and sodium pentachlorophenol.

—Antirust Agent—

Specific examples the antirust agent include, but are not limited to, acid sulfite, sodium thiosulfate, ammonium thiodiglycolate, diisopropyl ammonium nitrite, pentaerythritol tetranitrate, and dicyclohexylammonium nitrite.

—Antioxidant—

Specific examples of the antioxidant include, but are not limited to, a phenol-based antioxidant (including a hindered phenol-based antioxidant), an amine-based antioxidant, a sulfur-based antioxidant, and a phosphorus-based antioxidant.

—UV Absorber—

Specific examples of the UV absorber include, but are not limited to, a benzophenone-based UV absorber, a benzotriazole UV absorber, a salicylate-based UV absorber, a cyanoacrylate-based UV absorber, and a nickel complex salt-based UV absorber.

<Method of Preparing Ink for Inkjet Recording>

A method of preparing the ink for inkjet recording of the present invention includes dispersing or dissolving water, a hydrosoluble organic solvent, a pigment, a polymer including structural units having the formulae (1) and (2), and other optional components in an aqueous medium to prepare a mixture; and stirring the mixture.

The ink is preferably filtered to remove coarse particles by a filter or a centrifugal separator and deaerated when necessary.

Dispersion can be made by using a sand mill, a homogenizer, a ball mill, a paint shaker, an ultrasonic disperser, and the stirring and mixing can be made by using ordinary stirring blades, a magnetic stirrer, and a high-speed disperser, for example.

<Ink Properties>

Physical properties of the ink of the present invention are not particularly limited and may be appropriately selected according to purpose.

A viscosity of the aqueous ink at 25° C. is preferably 3 to 20 mPa·s. An effect of improved print density and letter quality may be obtained with the viscosity being 3 mPa·s or greater. At the same time, discharge property may be ensured with the viscosity suppressed to 20 mPa·s or less. The viscosity is measured by a viscometer RE-500L from Toki Sangyo Co., Ltd. at 25° C.

(Inkjet Recording Method and Inkjet Recorder)

The inkjet recorder of the present invention records information or an image on a recording medium with the ink of the present invention using an inkjet head. The recorder has least an ink flight means discharging, and other means such as a stimulation generator and a controller when necessary.

The ink flight means is a means of applying a stimulation to the ink of the present invention to fly to form a an image. The ink flight means include, but are not limited to, various nozzles for discharging inks.

The stimulation is generated by, e.g., a stimulation generator. Specific examples of the stimulation include, but are not limited to, heat (temperature), pressure, oscillation and light. These can be used alone or in combination. Among these, heat and pressure are preferably used. Specific examples of the stimulation generator include, but are not limited to, heaters, pressurizers, piezo elements, oscillators, ultrasonic oscillators, and lights. For example, piezo actuator such as piezo element, thermal actuator using a phase variation due to film boiling of a liquid using electric heat conversion element such as heating resistant, shape-memory alloy actuator using metal phase variation due to variation of temperature, electrostatic actuator using electrostatic force are used.

The controller is not particularly limited as long as it is capable of controlling operation of each of the means, and includes a sequencer, a computer, etc.

(Ink Container)

The ink container of the present invention contains the inkjet ink of the present invention and may include any other suitable members in combination.

There is no specific limit to the container. Any form, any structure, any size, and any material can be suitably selected. For example, an ink bag formed of aluminum laminate film, a resin film, etc. can be suitably used as a container.

Figure 2:
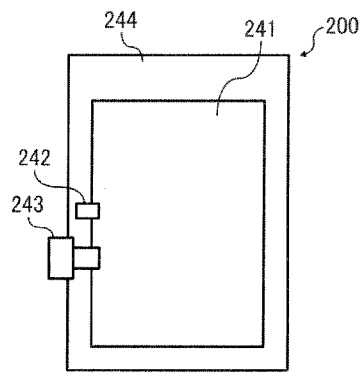
FIG. 2 is a schematic plain view illustrating the ink container of the present invention including a case (outer package) in FIG. 1.

FIG. 1 is a schematic plain view illustrating an embodiment of the ink container 200 of the present invention. FIG. 2 is a schematic plain view illustrating the embodiment of the ink container 200 including a case (outer package) in FIG. 1.

Figure 4:
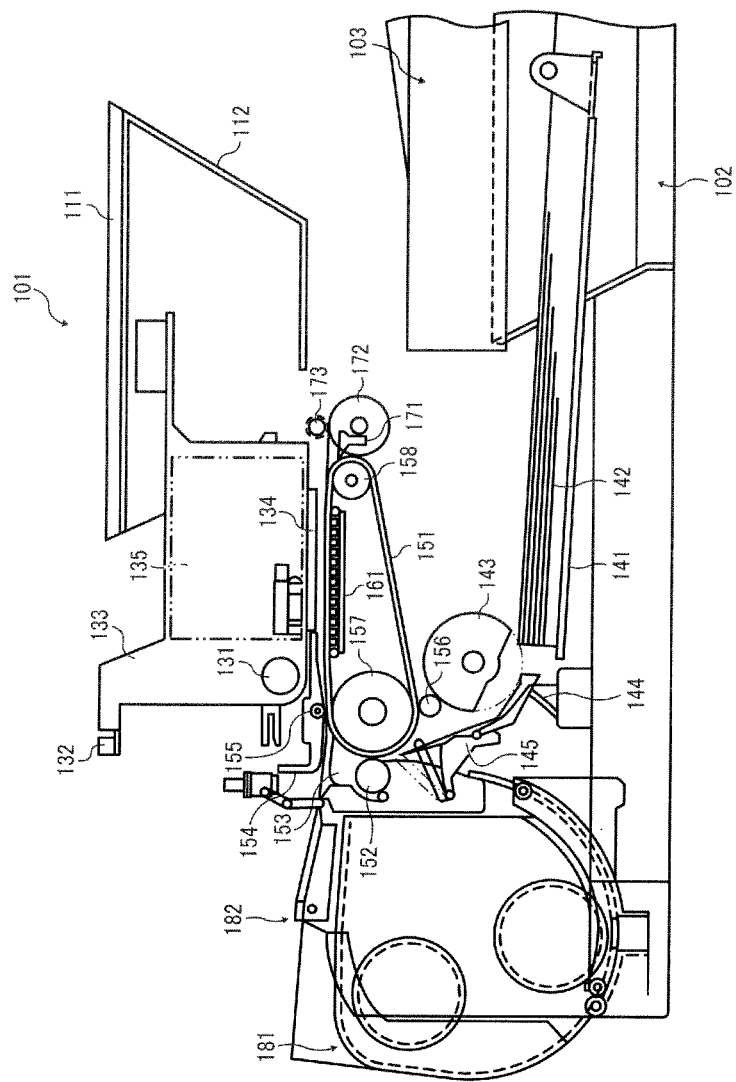
FIG. 4 is a schematic view illustrating an overall structure of the inkjet recorder in FIG. 3.

As illustrated in FIG. 1, an ink bag 241 is filled with the ink from an ink inlet 242. Subsequent to evacuation of air, the ink inlet 242 is closed by fusion. When in use, the ink is supplied by piercing the needle attached to the inkjet recorder into an ink outlet 243 made of rubber. The ink bag 241 is formed of a packaging material such as aluminum laminate film having no air permeability. The ink bag 241 is accommodated in a cartridge case 244 made of plastic as illustrated in FIG. 4 and detachably attachable to various inkjet recorders.

Inkjet recorders include inkjet printers, facsimile machines, photocopiers, multi-functional machines (serving as a printer, a facsimile machine, and a photocopier), etc.

Specific examples of recording media recorded by the inkjet recorder include, but are not limited to, plain papers, coated papers for printing, glossy paper, special papers, clothes, films and OHP sheets.

Figure 3:
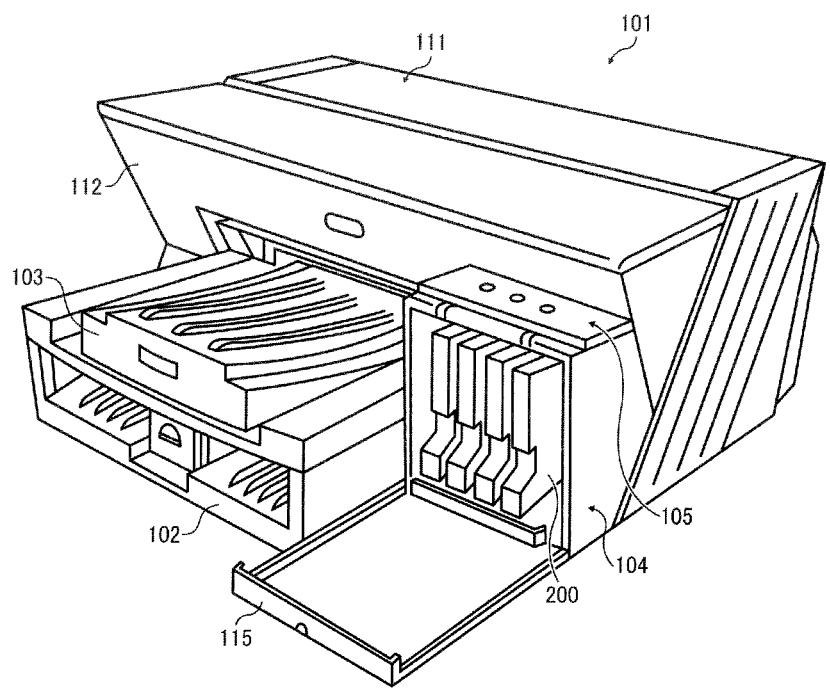
FIG. 3 is a perspective view illustrating an embodiment of the inkjet recorder of the present invention.

FIG. 3 is a perspective view illustrating an embodiment of the inkjet recorder of the present invention.

An inkjet recorder 101 illustrated in FIG. 3 has a sheet feeder tray 102 to feed recording media placed in the inkjet recorder 101, a discharging tray 103 installed in the inkjet recorder 101, which stores the recording media on which images are recorded (formed), and an ink cartridge installation unit 104. On the upper surface of the ink cartridge installation unit 104 is arranged an operating portion 105 including operation keyboard, a display, etc. The ink cartridge installation unit 104 has a front cover 115 that is openable and closable to detach and attach an ink container 200. 111 represents the upper cover of the inkjet recorder 101 and 112 represents the front surface thereof.

Figure 5:
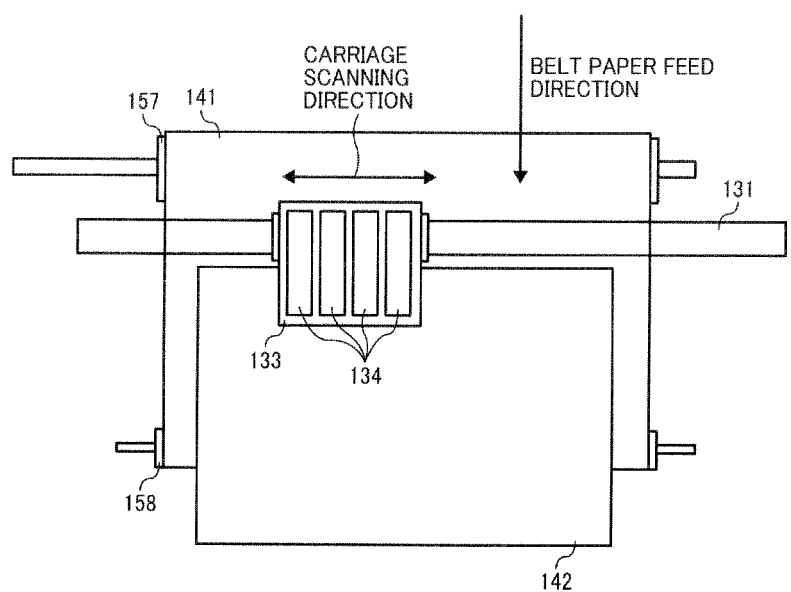
FIG. 5 is an enlarged partial view of the inkjet recorder in FIG. 3.

Inside the inkjet recorder 101, as illustrated in FIGS. 4 and 5, a guide rod 131 and a stay 132 serving as guiding members that laterally bridge side plates provided on the right side and left side hold a carriage 133 slidably movable in the main scanning direction. A main scanning motor moves the carriage 133 for scanning in an arrow direction in FIG. 5.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force. The carriage 133 has a sub tank 135 for each color to supply each color ink to the recording head 134. The ink is supplied and replenished to the sub-tank 135 from the ink container 200 mounted onto the ink cartridge inserting installation unit 104 via a tube for supplying ink.

A sheet feeding unit to feed a sheet 142 loaded on a sheet loader (pressure plate) 141 of the sheet feeder tray 103 includes a roller (sheet feeding roller 143) having a half-moon like form to separate and feed the sheet 142 one by one from the sheet loader 141 and a separation pad 144 that is made of a material having a large friction index and arranged facing the sheet feeding roller 143 while biased to the side of the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 track on the transfer belt 151 by changing the transfer direction of the sheet 142 being sent substantially vertically upward by substantially 90°, a front head pressure roller 155 biased towards the transfer belt 151 by a pressure member 154, and a charging roller 156 to charge the surface of the transfer belt 151.

The transfer belt 151 is an endless form belt, stretched between a transfer roller 157 and a tension roller 158 and rotatable in the belt transfer direction. This transfer belt 151 include, for example, a top layer serving as a sheet adsorption surface made of a resin material such as a copolymer (ETFE) of tetrafluoroethylene and ethylene with no resistance control treatment while having a thickness about 40 µm, and a bottom layer (moderate resistance layer, earth layer) made of the same material as the top layer with resistance control treatment with carbon. On the rear side of the transfer belt 151, a guiding member 161 is arranged corresponding to the printing area by the recording head 134.

A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 172.

A duplex printing sheet feeding unit 181 is detachably attached to the rear side of the inkjet recorder 101. The duplex printing sheet feeding unit 181 takes in and reverses the sheet 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181.

In this inkjet recorder, the sheet 142 is separated and fed from the sheet feeding unit one by one substantially vertically upward, guided by the guide 145, and transferred while being pinched between the transfer belt 151 and the counter roller 152. Furthermore, the front end of the sheet 142 is guided by the transfer guide 153 and pressed against the transfer belt 151 by the front head pressure roller 155 to change the transfer direction by substantially 90°. Since the transfer belt 157 is charged by the charging roller 156 at this point in time, the sheet 142 is electrostatically adsorbed to the transfer belt 151 and transferred. By driving the recording head 134 according to the image signal while moving the carriage 133, the ink droplet is discharged to the sheet 142 not in motion to record an image for an amount corresponding to one line and thereafter the sheet 142 is transferred in a predetermined amount to conduct recording for the next line.

On receiving a signal indicating that the recording has completed or the rear end of the sheet 142 has reached the image recording area, the recording operation stops and the sheet 142 is discharged to the discharging tray 103. When the amount of ink for inkjet recording remaining in the sub-tank 135 is detected as "approaching to empty", a predetermined amount of the ink is replenished to the sub tank 135 from the ink container 200.

In this inkjet recorder, it is possible to dissemble the chassis of the ink container 200 and replace the ink bags therein when the ink for inkjet is used up in the ink container 200. In addition, the ink cartridge 200 stably supplies the ink even when the ink cartridge 200 is placed upright (on its side) and installed by front loading. Therefore, even when the upside of the main part 101 is blocked, for example, it is accommodated in a rack or something is placed on the upper surface of the main part 101, the ink cartridge 200 is easily exchanged.

A serial type (shuttle type) in which the carriage scans is used in this description but this is true in a line-type inkjet recorder having a line type head.

The inkjet recorder is applicable to various inkjet recordings such as inkjet recording printers, facsimiles, copiers and their combination machines.

The recorded matter of the present invention is recorded by the inkjet recording method of the present invention, and has an image recorded by the inkjet ink of the present invention on a recording medium.

The recording media are not particularly limited, as long as the inkjet recording ink of the present invention lands thereon to form an image thereon. Specific examples thereof includes plain papers, coated papers for printing, glossy papers, special papers, etc. They include calcium carbonate, talc, kaolin or aluminum sulfate, etc., and divalent or trivalent ions such as calcium, magnesium and aluminum elute when the inkjet recording ink of the present invention lands thereon.

Plain papers are preferably used in the present invention. The plain papers are whole paper media supporting images, having feedability and transferability in image forming apparatuses for office use, home use or personal use using hard copy forming technologies such as electrophotographic copiers, simple offset printers, printers or old diazo copiers. Plain papers are mostly quality papers recently. Therefore, quality papers are often called plain papers, and a typical image medium for electrophotographic method as an image forming technology is familiarly known as PPC (plain paper copy).

The ink of the present invention reacts with the metallic ions to agglutinate a pigment and produces images having high image density. However, the plain papers are difficult to have high image density.

Most of loading materials and size fixers included in the plain papers are metallic salts having poor water solubility. Even when a water-soluble metallic salt is included, the content there of is low. Therefore, the plain papers do not improve in image density so much as papers including water-soluble multivalent metallic salts.

However, the inkjet recording ink of the present invention reacts with a pigment to produce images having high image density even when the multivalent metallic ions elute less. Specific examples of the marketed plain papers include quality paper My Paper from Ricoh Company, Ltd., Xerox 4024 from Fuji Xerox Co, Ltd., etc.

The ink of the present invention is effectively used on a paper eluting Ca ion in an amount of from $1.0 \times 10^{-4}$ to $5.0 \times 10^{-4}$ g/g. When less than $1.0 \times 10^{-4}$ g/g, improvement of the image density due to reaction agglomeration with the pigment dispersant deteriorates. When greater than $5.0\times10^{-4}$ g/g, an ink noticeably becomes difficult to penetrate a paper and poorly dried, resulting in deterioration of scratch resistance and marker resistance.

Ca ion amount eluted from a paper is calculated by the following method.

Namely, a paper is cut to paper slips of 2.5 cm (±0.5 cm)×3.5 cm (±0.5 cm), and 16 g thereof are dipped in 200 g of high-purity water (25° C.) for 40 hrs. The high-purity water after the paper slips are dipped therein is filtered with a 0.8 μm cellulose acetate filter (from Advantech Co., Ltd.) to remove foreign particles such as paper dusts, and Ca ion included therein is determined by an ICP emission spectrometer. The resultant Ca ion concentration [ppm] is multiplied by 200 g which is the weight of the high-purity water, and further divided by 16 g which is the weight of the paper dipped to determine an amount of Ca ion [g/g] eluted from the paper.

For example, My Paper from Ricoh Company, Ltd. includes Ca ion in an amount of $4.3\times10^{-4}$ g/g, and Xerox 4024 from Fuji Xerox Co, Ltd. includes Ca ion in an amount of $1.7\times10^{-4}$ g/g.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Synthesis of Monomer

Monomer No. I-1: Sodium 1-hydroxy-4-methacryla-midebutane-1,1-diylbis(hydrogenphosphonate)

In a flask, 25 parts of alendronic acid from Tokyo Chemical Industry Co., Ltd. were placed, and an aqueous solution including 17.1 parts of sodium hydroxide and 200 parts of ion-exchanged water was placed therein to be completely dissolved while stirred. Next, 13.32 parts of methacrylic acid chloride from Tokyo Chemical Industry Co., Ltd. were slowly dropped therein while cooled at 5° C. After stirred for 30 min, 14.53 parts of concentrated hydrochloric acid were dropped therein while cooled. The reacted liquid was extracted and washed for 3 times with methylene chloride, and the remaining aqueous solution was dropped in 800 parts of methanol and filtered to extract 35 parts of an object.

One point seven (1.7) parts of the object were dissolved in 176 parts of ion-exchanged water to prepare a solution, and the solution was subjected to neutralization titration in 0.1 N of KOH methanol solution with thymolphthalein from Kanto Chemical Co., Inc. as an indicator to determine an acid value. The acid value was 155 mg KOH/g. Compared with the titration result of the alendronic acid, the acid value was the same when 2 OH groups were replaced with Na salts.

Monomer No. I-2: Potassium 1-hydroxy-4-methacrylamidebutane-1,1-diylbis(hydrogenphosphonate)

The procedure for preparation of the object in synthesis of Monomer No. 1 was repeated except for replacing 17.1 parts of sodium hydroxide with 24 parts of potassium hydroxide to prepare 40 parts of an object.

Monomer No. I-3: Sodium 4-acrylamide-1-hydroxybutane-1,1-diylbis(hydrogenphosphonate)

The procedure for preparation of the object in synthesis of Monomer No. 1 was repeated except for replacing 13.32 parts of methacrylic acid chloride with 11.53 parts of acrylic acid chloride from Tokyo Chemical Industry Co., Ltd. to prepare 33 parts of an object.

Monomer No. I-4: Triethylammonium 4-acrylamide-1-hydroxybutane-1,1-diylbis(hydrogenphosphonate)

The procedure for preparation of the object in synthesis of Monomer No. 1 was repeated except for replacing 13.32 parts of methacrylic acid chloride with 11.53 parts of acrylic acid chloride, and 17.1 parts of sodium hydroxide with 43.3 parts of triethylamine from Kanto Chemical Co., Inc. to prepare 44 parts of an object.

Monomer No. I-5: Tetraethylammonium 1-hydroxy-4-methacrylamidebutane 1,1-diylbis(hydrogenphosphonate)

The procedure for preparation of the object in synthesis of Monomer No. 1 was repeated except for replacing 17.1 parts of sodium hydroxide with 179.8 parts of tetraethylammonium hydroxide (35% aqueous solution) from Kanto Chemical Co., Inc., and 200 parts of ion-exchanged water with 83.1 parts thereof to prepare 55 parts of an object.

Monomer No. I-6: Tetraethylammonium 1-hydroxy-4-methacrylamidebutane 1,1-diylbis(hydrogenphosphonate)

The procedure for preparation of the object in synthesis of Monomer No. 1 was repeated except for replacing 17.1 parts of sodium hydroxide with 277.2 parts of tetraethylammonium hydroxide (40% aqueous solution) from Kanto Chemical Co., Inc., and 200 parts of ion-exchanged water with 33.7 parts thereof to prepare 76 parts of an object.

Synthesis Example I-1

Copolymer (Polymer 1) Including a Salt of Phosphonic Acid Group

In a reaction container including a gas inlet tube, a thermometer and a reflux condenser, in an argon atmosphere, 450 parts of N-dimethylformamide (DMF) were placed and heated at 75° C. In the container, 558 parts of aqueous solution including 75 parts of the monomer No. I-1 as the monomer having the formula (4), 525 parts of a DMF solution including 75 parts of cyclohexylmethacrylate as the monomer having the formula (5), and 464 parts of a DMF solution including 4.5 parts of 2,2'-azobisisobutylonitrile (AIBN) and 9 parts of α-thioglycerol were added in 12 batches every 30 min. After these were all added therein, the mixture was further stirred for 4 hrs, cooled and the polymerization was completed.

The extract was filtered, washed with hexane, and dried to obtain 136 parts of a copolymer (polymer I-1).

One (1) part of the resin (copolymer) was dissolved in 120 parts of ion-exchanged water to prepare a solution, and the solution was subjected to neutralization titration in 0.1 N of KOH methanol solution with thymolphthalein as an indicator to determine an acid value. The acid value was 78 mg KOH/g. This was almost same as 77.7 mg KOH/g determined from the acid value of the monomer No. I-1 assuming copolymerization had been made in proportion to the place-in quantity.

Based on the acid value, the copolymer was neutralized with sodium hydroxide to prepare an aqueous solution including 10% by weight of the resin. The solution had a viscosity of 1.84 mPa·s at 25° C.

The aqueous solution including 10% by weight of the resin was used for preparing a pigment dispersion. From the titration result of the alendronic acid (monomer material), 3 OH groups out of 4 of the phosphonic acid were proved to be neutralized by sodium ion. The results are shown in Table I-1.

Synthesis Examples I-2

Polymer I-2

The procedure for preparation of the polymer I-1 in Synthesis Example I-1 was repeated except for changing the monomers having the formulae (4) and (5) and the conditions as shown in Table I-1 to prepare polymer I-2. The copolymer was neutralized with potassium hydroxide to prepare an aqueous solution including 10% by weight of the resin. The solution had a viscosity of 1.82 mPa·s at 25° C. Three (3) OH groups out of 4 of the phosphonic acid were proved to be neutralized by sodium ion. The results are shown in Table I-1.

Synthesis Examples I-3 (Polymer I-3) to I-31 (Polymer I-33) and Comparative Synthesis Examples I-1 (Polymer I-34) to I-2 (Polymer I-35)

The procedure for preparation of the polymer I-1 in Synthesis Example I-1 was repeated except for changing the monomers having the formulae (4) and (5) and the conditions as shown in Table I-1 to prepare polymers I-3 to I-33.

Comparative Synthesis Example I-3

Preparation of Neutralization Salt of 2-hydroxyethylidenediphosphonic Acid 2-hydroxyethylidene-1,1-diphosphonic acid was neutralized by 2 equivalents of potassium hydroxide in methanol, and the methanol was removed.

An aqueous solution including 10% by weight of a salt of the 2-hydroxyethylidene-1,1-diphosphonic acid had a viscosity of 1.9 mPa·s at 25° C.

TABLE I-1

(1)

| | | Polymer Structural Unit | | | |
|---|---|---|---|---|---|
| | | Monomer (4) | | Monomer (5) | |
| Syn. Ex. No. | Polymer No. | Name | % by weight | Name | % by weight |
| Syn. Ex. I-1 | Polymer I-1 | Monomer No. I-1 | 50 | Cyclohexyl MA | 50 |
| Syn. Ex. I-2 | Polymer I-2 | Monomer No. I-2 | 50 | Cyclohexyl MA | 50 |
| Syn. Ex. I-3 | Polymer I-3 | Monomer No. I-1 | 50 | Dodecyl Ma | 50 |
| Syn. Ex. I-4 | Polymer I-4 | Monomer No. I-2 | 50 | Dodecyl Ma | 50 |
| Syn. Ex. I-5 | Polymer I-5 | Monomer No. I-1 | 50 | Hexadecanyl Ma | 50 |
| Syn. Ex. I-6 | Polymer I-6 | Monomer No. I-2 | 50 | Hexadecanyl Ma | 50 |
| Syn. Ex. I-7 | Polymer I-7 | Monomer No. I-1 | 50 | Octadecanyl MA | 50 |
| Syn. Ex. I-8 | Polymer I-8 | Monomer No. I-2 | 50 | Octadecanyl MA | 50 |
| Syn. Ex. I-9 | Polymer I-9 | Monomer No. I-1 | 50 | Docosanyl MA | 50 |
| Syn. Ex. I-10 | Polymer I-10 | Monomer No. I-2 | 50 | Docosanyl MA | 50 |
| Syn. Ex. I-11 | Polymer I-11 | Monomer No. I-1 | 25 | Benzyl MA | 75 |
| Syn. Ex. I-12 | Polymer I-12 | Monomer No. I-1 | 30 | Benzyl MA | 70 |
| Syn. Ex. I-13 | Polymer I-13 | Monomer No. I-1 | 40 | Benzyl MA | 60 |
| Syn. Ex. I-14 | Polymer I-14 | Monomer No. I-1 | 50 | Benzyl MA | 50 |
| Syn. Ex. I-15 | Polymer I-15 | Monomer No. I-1 | 60 | Benzyl MA | 40 |
| Syn. Ex. I-16 | Polymer I-16 | Monomer No. I-1 | 70 | Benzyl MA | 30 |
| Syn. Ex. I-17 | Polymer I-17 | Monomer No. I-1 | 75 | Benzyl MA | 25 |
| Syn. Ex. I-18 | Polymer I-18 | Monomer No. I-1 | 50 | Benzyl A | 50 |
| Syn. Ex. I-19 | Polymer I-19 | Monomer No. I-1 | 60 | Dodecyl A | 40 |
| Syn. Ex. I-20 | Polymer I-20 | Monomer No. I-1 | 60 | Hexadecanyl A | 40 |
| Syn. Ex. I-21 | Polymer I-21 | Monomer No. I-1 | 60 | Octadecanyl A | 40 |

TABLE I-1-continued

| Syn. Ex. No. | Polymer No. | Monomer | (amount) | Other Monomer | (amount) |
|---|---|---|---|---|---|
| Syn. Ex. I-22 | Polymer I-22 | Monomer No. I-3 | 60 | Benzyl MA | 40 |
| Syn. Ex. I-23 | Polymer I-23 | Monomer No. I-3 | 50 | Dodecyl MA | 50 |
| Syn. Ex. I-24 | Polymer I-24 | Monomer No. I-3 | 60 | Octadecanyl MA | 40 |
| Syn. Ex. I-25 | Polymer I-25 | Monomer No. I-3 | 40 | Benzyl A | 60 |
| Syn. Ex. I-26 | Polymer I-26 | Monomer No. I-4 | 50 | Benzyl A | 50 |
| Syn. Ex. I-27 | Polymer I-27 | Monomer No. I-3 | 60 | Benzyl A | 40 |
| Syn. Ex. I-28 | Polymer I-28 | Monomer No. I-3 | 50 | Benzyl A | 50 |
| Syn. Ex. I-29 | Polymer I-29 | Monomer No. I-3 | 50 | Benzyl A | 50 |
| Syn. Ex. I-30 | Polymer I-30 | Monomer No. I-3 | 50 | Benzyl A | 50 |
| Syn. Ex. I-31 | Polymer I-31 | Monomer No. I-3 | 50 | Benzyl A | 50 |
| Syn. Ex. I-32 | Polymer I-32 | Monomer No. I-5 | 50 | Benzyl A | 50 |
| Syn. Ex. I-33 | Polymer I-33 | Monomer No. I-6 | 50 | Benzyl A | 50 |
| Com. Syn. Ex. I-1 | Polymer I-34 | Monomer No. I-1 | 100 | — | 0 |
| Com. Syn. Ex. I-2 | Polymer I-35 | Monomer No. I-2 | 50 | 2-hydroxypropylacrylamide | 50 |

(2)

| | | | | DMF | |
|---|---|---|---|---|---|
| | Polymer | Viscosity | M in | placement | Monomer (1) |
| Syn. Ex. No. | Polymer No. | (mPa·s) | formula (1) | Parts by Wt. | Parts by Wt. |
| Syn. Ex. I-1 | Polymer I-1 | 1.84 | 3Na, 1H | 450 | 75 |
| Syn. Ex. I-2 | Polymer I-2 | 1.82 | 3K, 1H | 450 | 75 |
| Syn. Ex. I-3 | Polymer I-3 | 1.86 | 2Na, 2H | 450 | 75 |
| Syn. Ex. I-4 | Polymer I-4 | 1.84 | 2K, 2H | 450 | 75 |
| Syn. Ex. I-5 | Polymer I-5 | 2.18 | 3Na, 1H | 450 | 75 |
| Syn. Ex. I-6 | Polymer I-6 | 2.16 | 3K, 1H | 450 | 75 |
| Syn. Ex. I-7 | Polymer I-7 | 2.20 | 3Na, 1H | 450 | 75 |
| Syn. Ex. I-8 | Polymer I-8 | 2.17 | 3K, 1H | 450 | 75 |
| Syn. Ex. I-9 | Polymer I-9 | 3.87 | 3Na, 1H | 200 | 75 |
| Syn. Ex. I-10 | Polymer I-10 | 3.85 | 3K, 1H | 200 | 75 |
| Syn. Ex. I-11 | Polymer I-11 | 2.12 | 3Na, 1H | 450 | 375 |
| Syn. Ex. I-12 | Polymer I-12 | 2.13 | 3Na, 1H | 450 | 45 |
| Syn. Ex. I-13 | Polymer I-13 | 2.16 | 3Na, 1H | 450 | 60 |
| Syn. Ex. I-14 | Polymer I-14 | 2.18 | 3Na, 1H | 450 | 75 |
| Syn. Ex. I-15 | Polymer I-15 | 2.21 | 3Na, 1H | 450 | 90 |
| Syn. Ex. I-16 | Polymer I-16 | 2.23 | 3Na, 1H | 450 | 105 |
| Syn. Ex. I-17 | Polymer I-17 | 2.24 | 3Na, 1H | 450 | 112.5 |
| Syn. Ex. I-18 | Polymer I-18 | 1.90 | 3Na, 1H | 450 | 75 |
| Syn. Ex. I-19 | Polymer I-19 | 1.90 | 3Na, 1H | 450 | 90 |
| Syn. Ex. I-20 | Polymer I-20 | 1.92 | 3Na, 1H | 450 | 90 |
| Syn. Ex. I-21 | Polymer I-21 | 1.94 | 3Na, 1H | 450 | 90 |
| Syn. Ex. I-22 | Polymer I-22 | 1.93 | 3Na, 1H | 450 | 90 |
| Syn. Ex. I-23 | Polymer I-23 | 2.51 | 3Na, 1H | 450 | 75 |
| Syn. Ex. I-24 | Polymer I-24 | 2.56 | 3Na, 1H | 450 | 90 |
| Syn. Ex. I-25 | Polymer I-25 | 2.55 | 3Na, 1H | 450 | 60 |
| Syn. Ex. I-26 | Polymer I-26 | 2.50 | 2TEtA, 2H | 450 | 75 |
| Syn. Ex. I-27 | Polymer I-27 | 1.67 | 3Na, 1H | 450 | 90 |
| Syn. Ex. I-28 | Polymer I-28 | 1.42 | 3Na, 1H | 450 | 75 |
| Syn. Ex. I-29 | Polymer I-29 | 1.50 | 3Na, 1H | 450 | 75 |
| Syn. Ex. I-30 | Polymer I-30 | 4.00 | 3Na, 1H | 200 | 75 |
| Syn. Ex. I-31 | Polymer I-31 | 4.27 | 3Na, 1H | 200 | 75 |
| Syn. Ex. I-32 | Polymer I-32 | 2.13 | 3TetraEtA, 1H | 450 | 75 |
| Syn. Ex. I-33 | Polymer I-33 | 2.11 | 3TetraBuA, 1H | 450 | 75 |
| Com. Syn. Ex. I-1 | Polymer I-34 | 3.50 | 3Na, 1H | 900 | 150 |
| Com. Syn. Ex. I-2 | Polymer I-35 | 3.96 | 2K, 2H | 200 | 75 |

TABLE I-1-continued

| | | (3) | | | |
|---|---|---|---|---|---|
| Polymer | | Monomer (1) Aqueous Solution | Monomer (2) | Monomer (2) DMF solution | AIBN |
| Syn. Ex. No. | Polymer No. | Parts by Wt. | Parts by Wt. | Parts by Wt. | Parts by Wt. |
| Syn. Ex. I-1 | Polymer I-1 | 558 | 75 | 525 | 4.5 |
| Syn. Ex. I-2 | Polymer I-2 | 558 | 75 | 525 | 4.5 |
| Syn. Ex. I-3 | Polymer I-3 | 558 | 75 | 525 | 4.5 |
| Syn. Ex. I-4 | Polymer I-4 | 558 | 75 | 525 | 4.5 |
| Syn. Ex. I-5 | Polymer I-5 | 558 | 75 | 525 | 4.5 |
| Syn. Ex. I-6 | Polymer I-6 | 558 | 75 | 525 | 4.5 |
| Syn. Ex. I-7 | Polymer I-7 | 558 | 75 | 525 | 4.5 |
| Syn. Ex. I-8 | Polymer I-8 | 558 | 75 | 525 | 4.5 |
| Syn. Ex. I-9 | Polymer I-9 | 275 | 75 | 259 | 4.5 |
| Syn. Ex. I-10 | Polymer I-10 | 275 | 75 | 259 | 4.5 |
| Syn. Ex. I-11 | Polymer I-11 | 521 | 112.5 | 563 | 13.5 |
| Syn. Ex. I-12 | Polymer I-12 | 528 | 105 | 555 | 13.5 |
| Syn. Ex. I-13 | Polymer I-13 | 543 | 90 | 540 | 13.5 |
| Syn. Ex. I-14 | Polymer I-14 | 558 | 75 | 525 | 13.5 |
| Syn. Ex. I-15 | Polymer I-15 | 573 | 60 | 510 | 13.5 |
| Syn. Ex. I-16 | Polymer I-16 | 588 | 45 | 495 | 13.5 |
| Syn. Ex. I-17 | Polymer I-17 | 596 | 37.5 | 488 | 13.5 |
| Syn. Ex. I-18 | Polymer I-18 | 558 | 75 | 525 | 18 |
| Syn. Ex. I-19 | Polymer I-19 | 573 | 60 | 510 | 18 |
| Syn. Ex. I-20 | Polymer I-20 | 573 | 60 | 510 | 18 |
| Syn. Ex. I-21 | Polymer I-21 | 573 | 60 | 510 | 18 |
| Syn. Ex. I-22 | Polymer I-22 | 573 | 60 | 510 | 18 |
| Syn. Ex. I-23 | Polymer I-23 | 558 | 75 | 525 | 4.5 |
| Syn. Ex. I-24 | Polymer I-24 | 573 | 60 | 510 | 4.5 |
| Syn. Ex. I-25 | Polymer I-25 | 543 | 90 | 540 | 4.5 |
| Syn. Ex. I-26 | Polymer I-26 | 558 | 75 | 525 | 4.5 |
| Syn. Ex. I-27 | Polymer I-27 | 573 | 60 | 510 | 9 |
| Syn. Ex. I-28 | Polymer I-28 | 558 | 75 | 525 | 13.5 |
| Syn. Ex. I-29 | Polymer I-29 | 558 | 75 | 525 | 9 |
| Syn. Ex. I-30 | Polymer I-30 | 275 | 75 | 259 | 4.5 |
| Syn. Ex. I-31 | Polymer I-31 | 275 | 75 | 259 | 3 |
| Syn. Ex. I-32 | Polymer I-32 | 558 | 75 | 525 | 14 |
| Syn. Ex. I-33 | Polymer I-33 | 558 | 75 | 525 | 14 |
| Com. Syn. Ex. I-1 | Polymer I-34 | 633 | 0 | 0 | 13.5 |
| Com. Syn. Ex. I-2 | Polymer I-35 | 275 | 75 | 259 | 4.5 |

| | | (4) | | | |
|---|---|---|---|---|---|
| Polymer | | Thioglycerol | AIBN DMF solution | Polymerization Temperature | Polymer |
| Syn. Ex. No. | Polymer No. | Parts by Wt. | Parts by Wt. | (° C.) | Parts by Wt. |
| Syn. Ex. I-1 | Polymer I-1 | 9 | 464 | 75 | 136 |
| Syn. Ex. I-2 | Polymer I-2 | 9 | 464 | 75 | 136 |
| Syn. Ex. I-3 | Polymer I-3 | 9 | 464 | 75 | 136 |
| Syn. Ex. I-4 | Polymer I-4 | 9 | 464 | 75 | 136 |
| Syn. Ex. I-5 | Polymer I-5 | 4.5 | 459 | 75 | 138 |
| Syn. Ex. I-6 | Polymer I-6 | 4.5 | 459 | 75 | 138 |
| Syn. Ex. I-7 | Polymer I-7 | 4.5 | 459 | 75 | 138 |
| Syn. Ex. I-8 | Polymer I-8 | 4.5 | 459 | 75 | 138 |
| Syn. Ex. I-9 | Polymer I-9 | 0 | 194 | 75 | 147 |
| Syn. Ex. I-10 | Polymer I-10 | 0 | 194 | 75 | 147 |
| Syn. Ex. I-11 | Polymer I-11 | 0 | 464 | 75 | 142 |
| Syn. Ex. I-12 | Polymer I-12 | 0 | 464 | 75 | 142 |
| Syn. Ex. I-13 | Polymer I-13 | 0 | 464 | 75 | 142 |
| Syn. Ex. I-14 | Polymer I-14 | 0 | 464 | 75 | 142 |
| Syn. Ex. I-15 | Polymer I-15 | 0 | 464 | 75 | 142 |
| Syn. Ex. I-16 | Polymer I-16 | 0 | 464 | 75 | 142 |
| Syn. Ex. I-17 | Polymer I-17 | 0 | 464 | 75 | 142 |
| Syn. Ex. I-18 | Polymer I-18 | 0 | 468 | 75 | 140 |
| Syn. Ex. I-19 | Polymer I-19 | 0 | 468 | 75 | 140 |
| Syn. Ex. I-20 | Polymer I-20 | 0 | 468 | 75 | 140 |
| Syn. Ex. I-21 | Polymer I-21 | 0 | 468 | 75 | 140 |
| Syn. Ex. I-22 | Polymer I-22 | 0 | 468 | 75 | 140 |
| Syn. Ex. I-23 | Polymer I-23 | 1.5 | 456 | 75 | 142 |
| Syn. Ex. I-24 | Polymer I-24 | 1.5 | 456 | 75 | 142 |
| Syn. Ex. I-25 | Polymer I-25 | 1.5 | 456 | 75 | 142 |
| Syn. Ex. I-26 | Polymer I-26 | 1.5 | 456 | 75 | 142 |
| Syn. Ex. I-27 | Polymer I-27 | 12 | 471 | 90 | 130 |

TABLE I-1-continued

| | | | | | |
|---|---|---|---|---|---|
| Syn. Ex. I-28 | Polymer I-28 | 12 | 476 | 90 | 123 |
| Syn. Ex. I-29 | Polymer I-29 | 12 | 471 | 90 | 130 |
| Syn. Ex. I-30 | Polymer I-30 | 0 | 194 | 75 | 147 |
| Syn. Ex. I-31 | Polymer I-31 | 0 | 192 | 75 | 148 |
| Syn. Ex. I-32 | Polymer I-32 | 0 | 464 | 75 | 140 |
| Syn. Ex. I-33 | Polymer I-33 | 0 | 464 | 75 | 142 |
| Com. Syn. Ex. I-1 | Polymer I-34 | 0 | 464 | 75 | 142 |
| Com. Syn. Ex. I-2 | Polymer I-35 | 0 | 194 | 75 | 147 |

3Na. 1H represents M+ includes 3 Na ions and 1 proton. 2K, 2H represents 2 K ions and 2 protons. TEtA represents trimethylammonium ion. TetraEtA represents tetraethylammonium ion and TetraBuA represents tetrabutylammonium ion. MA represents methacrylate and A represents acrylate.

Preparation of Pigment Dispersion

Pigment Dispersion Preparation Example I-1

The following materials were premixed, subjected to a circulation dispersion by a disc type beads mill (KDL type from Shinmaru Enterprises Corp., using zirconia beads having a diameter of 0.1 mm) at a peripheral speed of 10 m/s for 10 min, and filtered with a membrane filter having an aperture of 1.2 μm to prepare a pigment dispersion I-1.

[Mixture I-1]

| | |
|---|---|
| Carbon black (NIPEX160 from Degussa AG) | 20.0 |
| Naphthalene sulfonic acid Na formalin condensate (including a solid content of 10% by weight) | 13.0 |
| Pure water | 67.0 |

Pigment Dispersion Preparation Example I-2

The procedure for preparation of the pigment dispersion 1 in Pigment Dispersion Preparation Example 1 was repeated except for replacing the [Mixture I-1] with the following [Mixture I-2] to prepare a pigment dispersion I-2.

[Mixture I-2]

| | |
|---|---|
| Carbon black (NIPEX150 from Degussa AG) | 20.0 |
| Polymer 1 (including a solid content of 10% by weight) | 50.0 |
| Pure water | 30.0 |

Pigment Dispersion Preparation Examples I-3 to I-40

The procedure for preparation of the pigment dispersion I-1 in Pigment Dispersion Preparation Example 1 was repeated except for replacing the [Mixture I-1] with the mixtures shown in Table I-2 to prepare pigment dispersions I-3 to I-40. The pigment dispersion 1 includes naphthalene sulfonic acid Na formalin condensate, but the pigment dispersions I-2 to I-40 do not. The pigment dispersion 38 does not include a copolymer (polymer) including a salt of phosphonic acid group, and includes a low-molecular-weight bisphosphonic acid.

TABLE I-2

(1)

| | Solid Content (%) | Pigment Dispersion | | | | |
|---|---|---|---|---|---|---|
| | | I-1 | I-2 | I-3 | I-4 | I-5 |
| Naphthalene sulfonic acid Na formalin condensate | 10 | 13 | | | | |
| Polymer I-1 | 10 | | 50 | | | |
| Polymer I-2 | 10 | | | 50 | | |
| Polymer I-3 | 10 | | | | 50 | |
| Polymer I-4 | 10 | | | | | 50 |
| Polymer I-5 | 10 | | | | | |
| Polymer I-6 | 10 | | | | | |
| Polymer I-7 | 10 | | | | | |
| Polymer I-8 | 10 | | | | | |
| Polymer I-9 | 10 | | | | | |
| Polymer I-10 | 10 | | | | | |
| Polymer I-11 | 10 | | | | | |
| Polymer I-12 | 10 | | | | | |
| Polymer I-13 | 10 | | | | | |
| Polymer I-14 | 10 | | | | | |
| Polymer I-15 | 10 | | | | | |
| Polymer I-16 | 10 | | | | | |
| Polymer I-17 | 10 | | | | | |
| Polymer I-18 | 10 | | | | | |
| Polymer I-19 | 10 | | | | | |
| Polymer I-20 | 10 | | | | | |
| Polymer I-21 | 10 | | | | | |

TABLE I-2-continued

| | Solid Content (%) | | | | | |
|---|---|---|---|---|---|---|
| Polymer I-22 | 10 | | | | | |
| Polymer I-23 | 10 | | | | | |
| Polymer I-24 | 10 | | | | | |
| Polymer I-25 | 10 | | | | | |
| Polymer I-26 | 10 | | | | | |
| Polymer I-27 | 10 | | | | | |
| Polymer I-28 | 10 | | | | | |
| Polymer I-29 | 10 | | | | | |
| Polymer I-30 | 10 | | | | | |
| Polymer I-31 | 10 | | | | | |
| Polymer I-32 | 10 | | | | | |
| Polymer I-33 | 10 | | | | | |
| Polymer I-34 | 10 | | | | | |
| Polymer I-35 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | | | | | | |
| Pure water | — | 67 | 30 | 30 | 30 | 30 |
| Total | — | 100 | 100 | 100 | 100 | 100 |

(2)

| | Solid Content (%) | Pigment Dispersion | | | | |
|---|---|---|---|---|---|---|
| | | I-6 | I-7 | I-8 | I-9 | I-10 |
| Naphthalene sulfonic acid Na formalin condensate | 10 | | | | | |
| Polymer I-1 | 10 | | | | | |
| Polymer I-2 | 10 | | | | | |
| Polymer I-3 | 10 | | | | | |
| Polymer I-4 | 10 | | | | | |
| Polymer I-5 | 10 | 50 | | | | |
| Polymer I-6 | 10 | | 50 | | | |
| Polymer I-7 | 10 | | | 50 | | |
| Polymer I-8 | 10 | | | | 50 | |
| Polymer I-9 | 10 | | | | | 50 |
| Polymer I-10 | 10 | | | | | |
| Polymer I-11 | 10 | | | | | |
| Polymer I-12 | 10 | | | | | |
| Polymer I-13 | 10 | | | | | |
| Polymer I-14 | 10 | | | | | |
| Polymer I-15 | 10 | | | | | |
| Polymer I-16 | 10 | | | | | |
| Polymer I-17 | 10 | | | | | |
| Polymer I-18 | 10 | | | | | |
| Polymer I-19 | 10 | | | | | |
| Polymer I-20 | 10 | | | | | |
| Polymer I-21 | 10 | | | | | |
| Polymer I-22 | 10 | | | | | |
| Polymer I-23 | 10 | | | | | |
| Polymer I-24 | 10 | | | | | |
| Polymer I-25 | 10 | | | | | |
| Polymer I-26 | 10 | | | | | |
| Polymer I-27 | 10 | | | | | |
| Polymer I-28 | 10 | | | | | |
| Polymer I-29 | 10 | | | | | |
| Polymer I-30 | 10 | | | | | |
| Polymer I-31 | 10 | | | | | |
| Polymer I-32 | 10 | | | | | |
| Polymer I-33 | 10 | | | | | |
| Polymer I-34 | 10 | | | | | |
| Polymer I-35 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | | | | | | |
| Pure water | — | 30 | 30 | 30 | 30 | 30 |
| Total | — | 100 | 100 | 100 | 100 | 100 |

TABLE I-2-continued (3)

| | Solid Content (%) | Pigment Dispersion | | | | |
|---|---|---|---|---|---|---|
| | | I-11 | I-12 | I-13 | I-14 | I-15 |
| Naphthalene sulfonic acid Na formalin condensate | 10 | | | | | |
| Polymer I-1 | 10 | | | | | |
| Polymer I-2 | 10 | | | | | |
| Polymer I-3 | 10 | | | | | |
| Polymer I-4 | 10 | | | | | |
| Polymer I-5 | 10 | | | | | |
| Polymer I-6 | 10 | | | | | |
| Polymer I-7 | 10 | | | | | |
| Polymer I-8 | 10 | | | | | |
| Polymer I-9 | 10 | | | | | |
| Polymer I-10 | 10 | 50 | | | | |
| Polymer I-11 | 10 | | 50 | | | |
| Polymer I-12 | 10 | | | 50 | | |
| Polymer I-13 | 10 | | | | 50 | |
| Polymer I-14 | 10 | | | | | 50 |
| Polymer I-15 | 10 | | | | | |
| Polymer I-16 | 10 | | | | | |
| Polymer I-17 | 10 | | | | | |
| Polymer I-18 | 10 | | | | | |
| Polymer I-19 | 10 | | | | | |
| Polymer I-20 | 10 | | | | | |
| Polymer I-21 | 10 | | | | | |
| Polymer I-22 | 10 | | | | | |
| Polymer I-23 | 10 | | | | | |
| Polymer I-24 | 10 | | | | | |
| Polymer I-25 | 10 | | | | | |
| Polymer I-26 | 10 | | | | | |
| Polymer I-27 | 10 | | | | | |
| Polymer I-28 | 10 | | | | | |
| Polymer I-29 | 10 | | | | | |
| Polymer I-30 | 10 | | | | | |
| Polymer I-31 | 10 | | | | | |
| Polymer I-32 | 10 | | | | | |
| Polymer I-33 | 10 | | | | | |
| Polymer I-34 | 10 | | | | | |
| Polymer I-35 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

(4)

| | Solid Content (%) | Pigment Dispersion | | | |
|---|---|---|---|---|---|
| | | I-16 | I-17 | I-18 | I-19 |
| Naphthalene sulfonic acid Na formalin condensate | 10 | | | | |
| Polymer I-1 | 10 | | | | |
| Polymer I-2 | 10 | | | | |
| Polymer I-3 | 10 | | | | |
| Polymer I-4 | 10 | | | | |
| Polymer I-5 | 10 | | | | |
| Polymer I-6 | 10 | | | | |
| Polymer I-7 | 10 | | | | |
| Polymer I-8 | 10 | | | | |
| Polymer I-9 | 10 | | | | |
| Polymer I-10 | 10 | | | | |
| Polymer I-11 | 10 | | | | |
| Polymer I-12 | 10 | | | | |
| Polymer I-13 | 10 | | | | |

TABLE I-2-continued

| | Solid Content (%) | | | | |
|---|---|---|---|---|---|
| Polymer I-14 | 10 | 50 | 50 | 50 | |
| Polymer I-15 | 10 | | | | 50 |
| Polymer I-16 | 10 | | | | |
| Polymer I-17 | 10 | | | | |
| Polymer I-18 | 10 | | | | |
| Polymer I-19 | 10 | | | | |
| Polymer I-20 | 10 | | | | |
| Polymer I-21 | 10 | | | | |
| Polymer I-22 | 10 | | | | |
| Polymer I-23 | 10 | | | | |
| Polymer I-24 | 10 | | | | |
| Polymer I-25 | 10 | | | | |
| Polymer I-26 | 10 | | | | |
| Polymer I-27 | 10 | | | | |
| Polymer I-28 | 10 | | | | |
| Polymer I-29 | 10 | | | | |
| Polymer I-30 | 10 | | | | |
| Polymer I-31 | 10 | | | | |
| Polymer I-32 | 10 | | | | |
| Polymer I-33 | 10 | | | | |
| Polymer I-34 | 10 | | | | |
| Polymer I-35 | 10 | | | | |
| 1-hydroxyethylidene-1,1-bisphosphonic acid | 10 | | | | |
| Carbon black (*1) | — | | | | 20 |
| Pigment Blue 15:3 (*2) | — | 20 | | | |
| Pigment Red 122 (*3) | — | | 20 | | |
| Pigment Yellow 74 (*4) | — | | | 20 | |
| Pure water | — | 30 | 30 | 30 | 30 |
| Total | — | 100 | 100 | 100 | 100 |

(5)

| | Solid Content (%) | Pigment Dispersion | | | | |
|---|---|---|---|---|---|---|
| | | I-20 | I-21 | I-22 | I-23 | I-24 |
| Naphthalene sulfonic acid Na formalin condensate | 10 | | | | | |
| Polymer I-1 | 10 | | | | | |
| Polymer I-2 | 10 | | | | | |
| Polymer I-3 | 10 | | | | | |
| Polymer I-4 | 10 | | | | | |
| Polymer I-5 | 10 | | | | | |
| Polymer I-6 | 10 | | | | | |
| Polymer I-7 | 10 | | | | | |
| Polymer I-8 | 10 | | | | | |
| Polymer I-9 | 10 | | | | | |
| Polymer I-10 | 10 | | | | | |
| Polymer I-11 | 10 | | | | | |
| Polymer I-12 | 10 | | | | | |
| Polymer I-13 | 10 | | | | | |
| Polymer I-14 | 10 | | | | | |
| Polymer I-15 | 10 | | | | | |
| Polymer I-16 | 10 | 50 | | | | |
| Polymer I-17 | 10 | | 50 | | | |
| Polymer I-18 | 10 | | | 50 | | |
| Polymer I-19 | 10 | | | | 50 | |
| Polymer I-20 | 10 | | | | | 50 |
| Polymer I-21 | 10 | | | | | |
| Polymer I-22 | 10 | | | | | |
| Polymer I-23 | 10 | | | | | |
| Polymer I-24 | 10 | | | | | |
| Polymer I-25 | 10 | | | | | |
| Polymer I-26 | 10 | | | | | |
| Polymer I-27 | 10 | | | | | |
| Polymer I-28 | 10 | | | | | |
| Polymer I-29 | 10 | | | | | |
| Polymer I-30 | 10 | | | | | |
| Polymer I-31 | 10 | | | | | |
| Polymer I-32 | 10 | | | | | |
| Polymer I-33 | 10 | | | | | |
| Polymer I-34 | 10 | | | | | |
| Polymer I-35 | 10 | | | | | |
| 1-hydroxyethylidene-1,1-bisphosphonic acid | 10 | | | | | |

TABLE I-2-continued

| | Solid Content (%) | I-25 | I-26 | I-27 | I-28 | I-29 |
|---|---|---|---|---|---|---|
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

(6)

| | Solid Content (%) | Pigment Dispersion | | | | |
|---|---|---|---|---|---|---|
| | | I-25 | I-26 | I-27 | I-28 | I-29 |
| Naphthalene sulfonic acid Na formalin condensate | 10 | | | | | |
| Polymer I-1 | 10 | | | | | |
| Polymer I-2 | 10 | | | | | |
| Polymer I-3 | 10 | | | | | |
| Polymer I-4 | 10 | | | | | |
| Polymer I-5 | 10 | | | | | |
| Polymer I-6 | 10 | | | | | |
| Polymer I-7 | 10 | | | | | |
| Polymer I-8 | 10 | | | | | |
| Polymer I-9 | 10 | | | | | |
| Polymer I-10 | 10 | | | | | |
| Polymer I-11 | 10 | | | | | |
| Polymer I-12 | 10 | | | | | |
| Polymer I-13 | 10 | | | | | |
| Polymer I-14 | 10 | | | | | |
| Polymer I-15 | 10 | | | | | |
| Polymer I-16 | 10 | | | | | |
| Polymer I-17 | 10 | | | | | |
| Polymer I-18 | 10 | | | | | |
| Polymer I-19 | 10 | | | | | |
| Polymer I-20 | 10 | | | | | |
| Polymer I-21 | 10 | 50 | | | | |
| Polymer I-22 | 10 | | 50 | | | |
| Polymer I-23 | 10 | | | 50 | | |
| Polymer I-24 | 10 | | | | 50 | |
| Polymer I-25 | 10 | | | | | 50 |
| Polymer I-26 | 10 | | | | | |
| Polymer I-27 | 10 | | | | | |
| Polymer I-28 | 10 | | | | | |
| Polymer I-29 | 10 | | | | | |
| Polymer I-30 | 10 | | | | | |
| Polymer I-31 | 10 | | | | | |
| Polymer I-32 | 10 | | | | | |
| Polymer I-33 | 10 | | | | | |
| Polymer I-34 | 10 | | | | | |
| Polymer I-35 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

(7)

| | Solid Content (%) | Pigment Dispersion | | | | |
|---|---|---|---|---|---|---|
| | | I-30 | I-31 | I-32 | I-33 | I-34 |
| Naphthalene sulfonic acid Na formalin condensate | 10 | | | | | |
| Polymer I-1 | 10 | | | | | |
| Polymer I-2 | 10 | | | | | |
| Polymer I-3 | 10 | | | | | |
| Polymer I-4 | 10 | | | | | |
| Polymer I-5 | 10 | | | | | |

TABLE I-2-continued

| | | | | | | |
|---|---|---|---|---|---|---|
| Polymer I-6 | 10 | | | | | |
| Polymer I-7 | 10 | | | | | |
| Polymer I-8 | 10 | | | | | |
| Polymer I-9 | 10 | | | | | |
| Polymer I-10 | 10 | | | | | |
| Polymer I-11 | 10 | | | | | |
| Polymer I-12 | 10 | | | | | |
| Polymer I-13 | 10 | | | | | |
| Polymer I-14 | 10 | | | | | |
| Polymer I-15 | 10 | | | | | |
| Polymer I-16 | 10 | | | | | |
| Polymer I-17 | 10 | | | | | |
| Polymer I-18 | 10 | | | | | |
| Polymer I-19 | 10 | | | | | |
| Polymer I-20 | 10 | | | | | |
| Polymer I-21 | 10 | | | | | |
| Polymer I-22 | 10 | | | | | |
| Polymer I-23 | 10 | | | | | |
| Polymer I-24 | 10 | | | | | |
| Polymer I-25 | 10 | | | | | |
| Polymer I-26 | 10 | 50 | | | | |
| Polymer I-27 | 10 | | 50 | | | |
| Polymer I-28 | 10 | | | 50 | | |
| Polymer I-29 | 10 | | | | 50 | |
| Polymer I-30 | 10 | | | | | 50 |
| Polymer I-31 | 10 | | | | | |
| Polymer I-32 | 10 | | | | | |
| Polymer I-33 | 10 | | | | | |
| Polymer I-34 | 10 | | | | | |
| Polymer I-35 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

(8)

| | Solid Content (%) | Pigment Dispersion | | | |
|---|---|---|---|---|---|
| | | I-35 | I-36 | I-37 | I-38 |
| Naphthalene sulfonic acid Na formalin condensate | 10 | | | | |
| Polymer I-1 | 10 | | | | |
| Polymer I-2 | 10 | | | | |
| Polymer I-3 | 10 | | | | |
| Polymer I-4 | 10 | | | | |
| Polymer I-5 | 10 | | | | |
| Polymer I-6 | 10 | | | | |
| Polymer I-7 | 10 | | | | |
| Polymer I-8 | 10 | | | | |
| Polymer I-9 | 10 | | | | |
| Polymer I-10 | 10 | | | | |
| Polymer I-11 | 10 | | | | |
| Polymer I-12 | 10 | | | | |
| Polymer I-13 | 10 | | | | |
| Polymer I-14 | 10 | | | | |
| Polymer I-15 | 10 | | | | |
| Polymer I-16 | 10 | | | | |
| Polymer I-17 | 10 | | | | |
| Polymer I-18 | 10 | | | | |
| Polymer I-19 | 10 | | | | |
| Polymer I-20 | 10 | | | | |
| Polymer I-21 | 10 | | | | |
| Polymer I-22 | 10 | | | | |
| Polymer I-23 | 10 | | | | |
| Polymer I-24 | 10 | | | | |
| Polymer I-25 | 10 | | | | |
| Polymer I-26 | 10 | | | | |
| Polymer I-27 | 10 | | | | |
| Polymer I-28 | 10 | | | | |
| Polymer I-29 | 10 | | | | |

TABLE I-2-continued

| | | | | | |
|---|---|---|---|---|---|
| Polymer I-30 | 10 | | | | |
| Polymer I-31 | 10 | 50 | | | |
| Polymer I-32 | 10 | | 50 | | |
| Polymer I-33 | 10 | | | 50 | |
| Polymer I-34 | 10 | | | | 50 |
| Polymer I-35 | 10 | | | | |
| 1-hydroxyethylidene-1,1-bisphosphonic acid | 10 | | | | |
| Carbon black (*1) | — | 20 | 20 | 20 | 20 |
| Pigment Blue 15:3 (*2) | | | | | |
| Pigment Red 122 (*3) | — | | | | |
| Pigment Yellow 74 (*4) | — | | | | |
| Pure water | — | 30 | 30 | 30 | 30 |
| Total | — | 100 | 100 | 100 | 100 |

(9)

| | Solid Content (%) | Pigment Dispersion | |
|---|---|---|---|
| | | I-39 | I-40 |
| Naphthalene sulfonic acid Na formalin condensate | 10 | | |
| Polymer I-1 | 10 | | |
| Polymer I-2 | 10 | | |
| Polymer I-3 | 10 | | |
| Polymer I-4 | 10 | | |
| Polymer I-5 | 10 | | |
| Polymer I-6 | 10 | | |
| Polymer I-7 | 10 | | |
| Polymer I-8 | 10 | | |
| Polymer I-9 | 10 | | |
| Polymer I-10 | 10 | | |
| Polymer I-11 | 10 | | |
| Polymer I-12 | 10 | | |
| Polymer I-13 | 10 | | |
| Polymer I-14 | 10 | | |
| Polymer I-15 | 10 | | |
| Polymer I-16 | 10 | | |
| Polymer I-17 | 10 | | |
| Polymer I-18 | 10 | | |
| Polymer I-19 | 10 | | |
| Polymer I-20 | 10 | | |
| Polymer I-21 | 10 | | |
| Polymer I-22 | 10 | | |
| Polymer I-23 | 10 | | |
| Polymer I-24 | 10 | | |
| Polymer I-25 | 10 | | |
| Polymer I-26 | 10 | | |
| Polymer I-27 | 10 | | |
| Polymer I-28 | 10 | | |
| Polymer I-29 | 10 | | |
| Polymer I-30 | 10 | | |
| Polymer I-31 | 10 | | |
| Polymer I-32 | 10 | | |
| Polymer I-33 | 10 | | |
| Polymer I-34 | 10 | | |
| Polymer I-35 | 10 | 50 | |
| 1-hydroxyethylidene-1,1-bisphosphonic acid | 10 | | 50 |
| Carbon black (*1) | — | 20 | 20 |
| Pigment Blue 15:3 (*2) | | | |
| Pigment Red 122 (*3) | — | | |
| Pigment Yellow 74 (*4) | — | | |
| Pure water | — | 30 | 30 |
| Total | — | 100 | 100 |

(*1) = NIPEX 160  
(*2) = CHROMOFINE BLUE A-220J from Dainichiseika Color & Chemicals Mfg. Co., Ltd.  
(*3) = Toner Magenta E-0002 from Clariant  
(*4) = FAST YELLOW 531 from Dainichiseika Color & Chemicals Mfg. Co., Ltd.

Preparation of Ink for Inkjet Recording

Example I-1

The following materials were mixed, stirred for 1.5 hrs and filtered with a membrane filter having an aperture of 1.2 nm to prepare an ink.

| | |
|---|---|
| Pigment Dispersion 1 (including a solid content of pigment in an amount of 20% by weight) | 40.0 |
| 1,3-butanediol (hydrosoluble solvent) | 20.0 |
| Glycerin (hydrosoluble solvent) | 10.0 |
| 2-ethyl-1,3-hexanediol (hydrosoluble solvent) | 1.0 |
| 2,2,4-trimethyl-1,3-pentadiol (hydrosoluble solvent) | 1.0 |
| Fluorine surfactant (Zonyl FS-300 from DuPont including a solid content in an amount of 40% by weight) | 2.0 |
| Aqueous solution of polymer I-14 (including a solid content in an amount of 10% by weight) | 20.0 |
| Distilled water | 6.0 |

Example I-2

The procedure for preparation of the ink in Example I-1 was repeated except for replacing the pigment dispersion I-1 with the pigment dispersion I-2 (Bk dispersion including polymer I-1) without the aqueous solution of polymer I-14 and using 26.0 parts of distilled water instead of 6.0 parts thereof to prepare an ink.

Example I-3

The procedure for preparation of the ink in Example I-2 was repeated except for replacing the pigment dispersion I-2 with the pigment dispersion I-3 (Bk dispersion including polymer I-2).

Example I-4

The procedure for preparation of the ink in Example I-2 was repeated except for replacing the pigment dispersion I-2 with the pigment dispersion I-4 (Bk dispersion including polymer I-3).

Example I-5

The procedure for preparation of the ink in Example I-2 was repeated except for replacing the pigment dispersion I-2 with the pigment dispersion I-5 (Bk dispersion including polymer I-4).

Example I-6

The procedure for preparation of the ink in Example I-2 was repeated except for replacing the pigment dispersion I-2 with the pigment dispersion I-6 (Bk dispersion including polymer I-5).

Example I-7

The procedure for preparation of the ink in Example I-2 was repeated except for replacing the pigment dispersion I-2 with the pigment dispersion I-7 (Bk dispersion including polymer I-6).

Example I-8

The procedure for preparation of the ink in Example I-2 was repeated except for replacing the pigment dispersion I-2 with the pigment dispersion I-8 (Bk dispersion including polymer I-7).

Example I-9

The procedure for preparation of the ink in Example I-2 was repeated except for replacing the pigment dispersion I-2 with the pigment dispersion I-9 (Bk dispersion including polymer I-8).

Example I-10

The procedure for preparation of the ink in Example I-2 was repeated except for replacing the pigment dispersion I-2 with the pigment dispersion I-10 (Bk dispersion including polymer I-9).

Example I-11

The procedure for preparation of the ink in Example I-2 was repeated except for replacing the pigment dispersion I-2 with the pigment dispersion I-11 (Bk dispersion including polymer I-10).

Example I-12

The procedure for preparation of the ink in Example I-2 was repeated except for replacing the pigment dispersion I-2 with the pigment dispersion I-12 (Bk dispersion including polymer I-11).

Example I-13

The procedure for preparation of the ink in Example I-2 was repeated except for replacing the pigment dispersion I-2 with the pigment dispersion I-13 (Bk dispersion including polymer I-12).

Example I-14

The procedure for preparation of the ink in Example I-2 was repeated except for replacing the pigment dispersion I-2 with the pigment dispersion I-14 (Bk dispersion including polymer I-13).

Example I-15

The procedure for preparation of the ink in Example I-2 was repeated except for replacing the pigment dispersion I-2 with the pigment dispersion I-15 (Bk dispersion including polymer I-14).

Example I-16

The procedure for preparation of the ink in Example I-2 was repeated except for replacing the pigment dispersion I-2 with the pigment dispersion I-16 (Cy dispersion including polymer I-14).

Example I-17

The procedure for preparation of the ink in Example I-2 was repeated except for replacing the pigment dispersion I-2 with the pigment dispersion I-17 (Ma dispersion including polymer I-14).

Example I-18

The procedure for preparation of the ink in Example I-2 was repeated except for replacing the pigment dispersion I-2 with the pigment dispersion I-18 (Ye dispersion including polymer I-14).

Example I-19

The procedure for preparation of the ink in Example I-2 was repeated except for replacing the pigment dispersion I-2 with the pigment dispersion I-19 (Bk dispersion including polymer I-15).

Example I-20

The procedure for preparation of the ink in Example I-2 was repeated except for replacing the pigment dispersion I-2 with the pigment dispersion I-20 (Bk dispersion including polymer I-16).

Example I-21

The procedure for preparation of the ink in Example I-2 was repeated except for replacing the pigment dispersion I-2 with the pigment dispersion I-21 (Bk dispersion including polymer I-17).

Example I-22

The procedure for preparation of the ink in Example I-2 was repeated except for replacing the pigment dispersion I-2 with the pigment dispersion I-22 (Bk dispersion including polymer I-18).

Example I-23

The procedure for preparation of the ink in Example I-2 was repeated except for replacing the pigment dispersion I-2 with the pigment dispersion I-23 (Bk dispersion including polymer I-19) and using 26.0 parts of distilled water instead of 6.0 parts thereof to prepare an ink.

Example I-24

The procedure for preparation of the ink in Example I-2 was repeated except for replacing the pigment dispersion I-2 with the pigment dispersion I-24 (Bk dispersion including polymer I-20).

Example I-25

The procedure for preparation of the ink in Example I-2 was repeated except for replacing the pigment dispersion I-2 with the pigment dispersion I-25 (Bk dispersion including polymer I-21).

Example I-26

The procedure for preparation of the ink in Example I-2 was repeated except for replacing the pigment dispersion I-2 with the pigment dispersion I-26 (Bk dispersion including polymer I-22).

Example I-27

The procedure for preparation of the ink in Example I-2 was repeated except for replacing the pigment dispersion I-2 with the pigment dispersion I-27 (Bk dispersion including polymer I-23).

Example I-28

The procedure for preparation of the ink in Example I-2 was repeated except for replacing the pigment dispersion I-2 with the pigment dispersion I-28 (Bk dispersion including polymer I-24).

Example I-29

The procedure for preparation of the ink in Example I-2 was repeated except for replacing the pigment dispersion I-2 with the pigment dispersion I-29 (Bk dispersion including polymer I-25).

Example I-30

The procedure for preparation of the ink in Example I-2 was repeated except for replacing the pigment dispersion I-2 with the pigment dispersion I-30 (Bk dispersion including polymer I-26).

Example I-31

The procedure for preparation of the ink in Example I-2 was repeated except for replacing the pigment dispersion I-2 with the pigment dispersion I-31 (Bk dispersion including polymer I-27).

Example I-32

The procedure for preparation of the ink in Example I-2 was repeated except for replacing the pigment dispersion I-2 with the pigment dispersion I-32 (Bk dispersion including polymer I-28).

Example I-33

The procedure for preparation of the ink in Example I-2 was repeated except for replacing the pigment dispersion I-2 with the pigment dispersion I-33 (Bk dispersion including polymer I-29).

Example I-34

The procedure for preparation of the ink in Example I-2 was repeated except for replacing the pigment dispersion I-2 with the pigment dispersion I-34 (Bk dispersion including polymer I-30).

Example I-35

The procedure for preparation of the ink in Example I-2 was repeated except for replacing the pigment dispersion I-2 with the pigment dispersion I-35 (Bk dispersion including polymer I-31).

Example I-36

The procedure for preparation of the ink in Example I-2 was repeated except for replacing the pigment dispersion I-2 with the pigment dispersion I-36 (Bk dispersion including polymer I-32).

Example I-37

The procedure for preparation of the ink in Example I-2 was repeated except for replacing the pigment dispersion I-2 with the pigment dispersion I-37 (Bk dispersion including polymer I-33).

Comparative Example I-1

The procedure for preparation of the ink in Example I-2 was repeated except for replacing the pigment dispersion I-2 with the pigment dispersion I-38 (Bk dispersion including polymer I-34).

Comparative Example I-2

The procedure for preparation of the ink in Example I-2 was repeated except for replacing the pigment dispersion I-2 with the pigment dispersion I-39 (Bk dispersion including polymer I-35).

Comparative Example I-3

The procedure for preparation of the ink in Example I-2 was repeated except for replacing the pigment dispersion I-2 with the pigment dispersion I-40 (Bk dispersion including 1-hydroxyethylidene-1,1-bisphosphonic acid salt).

These formulations are summarized in Table I-3.

Bk represents black, Cy represents cyan, Ma represents magenta and Ye represents yellow therein.

TABLE I-3

| | | (1) | | | | |
|---|---|---|---|---|---|---|
| | | Example | | | | |
| | Material | I-1 | I-2 | I-3 | I-4 | I-5 |
| Pigment dispersion I-1 | Naphthalene sulfonic acid Na | 40 | | | | |
| Pigment dispersion I-2 | Bk dispersion including polymer I-1 | | 40 | | | |
| Pigment dispersion I-3 | Bk dispersion including polymer I-2 | | | 40 | | |
| Pigment dispersion I-4 | Bk dispersion including polymer I-3 | | | | 40 | |
| Pigment dispersion I-5 | Bk dispersion including polymer I-4 | | | | | 40 |
| Pigment dispersion I-6 | Bk dispersion including polymer I-5 | | | | | |
| Pigment dispersion I-7 | Bk dispersion including polymer I-6 | | | | | |
| Pigment dispersion I-8 | Bk dispersion including polymer I-7 | | | | | |
| Pigment dispersion I-9 | Bk dispersion including polymer I-8 | | | | | |
| Pigment dispersion I-10 | Bk dispersion including polymer I-9 | | | | | |
| Pigment dispersion I-11 | Bk dispersion including polymer I-10 | | | | | |
| Pigment dispersion I-12 | Bk dispersion including polymer I-11 | | | | | |
| Pigment dispersion I-13 | Bk dispersion including polymer I-12 | | | | | |
| Pigment dispersion I-14 | Bk dispersion including polymer I-13 | | | | | |
| Pigment dispersion I-15 | Bk dispersion including polymer I-14 | | | | | |

TABLE I-3-continued

| | |
|---|---|
| Pigment dispersion I-16 | Cy dispersion including polymer I-14 |
| Pigment dispersion I-17 | Ma dispersion including polymer I-14 |
| Pigment dispersion I-18 | Ye dispersion including polymer I-14 |
| Pigment dispersion I-19 | Bk dispersion including polymer I-15 |
| Pigment dispersion I-20 | Bk dispersion including polymer I-16 |
| Pigment dispersion I-21 | Bk dispersion including polymer I-17 |
| Pigment dispersion I-22 | Bk dispersion including polymer I-18 |
| Pigment dispersion I-23 | Bk dispersion including polymer I-19 |
| Pigment dispersion I-24 | Bk dispersion including polymer I-20 |
| Pigment dispersion I-25 | Bk dispersion including polymer I-21 |
| Pigment dispersion I-26 | Bk dispersion including polymer I-22 |
| Pigment dispersion I-27 | Bk dispersion including polymer I-23 |
| Pigment dispersion I-28 | Bk dispersion including polymer I-24 |
| Pigment dispersion I-29 | Bk dispersion including polymer I-25 |
| Pigment dispersion I-30 | Bk dispersion including polymer I-26 |
| Pigment dispersion I-31 | Bk dispersion including polymer I-27 |
| Pigment dispersion I-32 | Bk dispersion including polymer I-28 |
| Pigment dispersion I-33 | Bk dispersion including polymer I-29 |
| Pigment dispersion I-34 | Bk dispersion including polymer I-30 |
| Pigment dispersion I-35 | Bk dispersion including polymer I-31 |
| Pigment dispersion I-36 | Bk dispersion including polymer I-32 |
| Pigment dispersion I-37 | Bk dispersion including polymer I-33 |
| Pigment dispersion I-38 | Bk dispersion including polymer I-34 |
| Pigment dispersion I-39 | Bk dispersion including polymer I-35 |

TABLE I-3-continued

| | | | | | | |
|---|---|---|---|---|---|---|
| Pigment dispersion I-40 | Bk dispersion including 1-hydroxyethylidene-1,1-bisphosphonic acid salt | | | | | |
| Aqueous solution of polymer I-14 including a solid content in an amount of 10% by weight | | 20 | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 6 | 26 | 26 | 26 | 26 |
| Total | | 100 | 100 | 100 | 100 | 100 |

(2)

| | | Example | | | | |
|---|---|---|---|---|---|---|
| | Material | I-6 | I-7 | I-8 | I-9 | I-10 |
| Pigment dispersion I-1 | Naphthalene sulfonic acid Na | | | | | |
| Pigment dispersion I-2 | Bk dispersion including polymer I-1 | | | | | |
| Pigment dispersion I-3 | Bk dispersion including polymer I-2 | | | | | |
| Pigment dispersion I-4 | Bk dispersion including polymer I-3 | | | | | |
| Pigment dispersion I-5 | Bk dispersion including polymer I-4 | | | | | |
| Pigment dispersion I-6 | Bk dispersion including polymer I-5 | 40 | | | | |
| Pigment dispersion I-7 | Bk dispersion including polymer I-6 | | 40 | | | |
| Pigment dispersion I-8 | Bk dispersion including polymer I-7 | | | 40 | | |
| Pigment dispersion I-9 | Bk dispersion including polymer I-8 | | | | 40 | |
| Pigment dispersion I-10 | Bk dispersion including polymer I-9 | | | | | 40 |
| Pigment dispersion I-11 | Bk dispersion including polymer I-10 | | | | | |
| Pigment dispersion I-12 | Bk dispersion including polymer I-11 | | | | | |
| Pigment dispersion I-13 | Bk dispersion including polymer I-12 | | | | | |
| Pigment dispersion I-14 | Bk dispersion including polymer I-13 | | | | | |
| Pigment dispersion I-15 | Bk dispersion including polymer I-14 | | | | | |
| Pigment dispersion I-16 | Cy dispersion including polymer I-14 | | | | | |

TABLE I-3-continued

| | |
|---|---|
| Pigment dispersion I-17 | Ma dispersion including polymer I-14 |
| Pigment dispersion I-18 | Ye dispersion including polymer I-14 |
| Pigment dispersion I-19 | Bk dispersion including polymer I-15 |
| Pigment dispersion I-20 | Bk dispersion including polymer I-16 |
| Pigment dispersion I-21 | Bk dispersion including polymer I-17 |
| Pigment dispersion I-22 | Bk dispersion including polymer I-18 |
| Pigment dispersion I-23 | Bk dispersion including polymer I-19 |
| Pigment dispersion I-24 | Bk dispersion including polymer I-20 |
| Pigment dispersion I-25 | Bk dispersion including polymer I-21 |
| Pigment dispersion I-26 | Bk dispersion including polymer I-22 |
| Pigment dispersion I-27 | Bk dispersion including polymer I-23 |
| Pigment dispersion I-28 | Bk dispersion including polymer I-24 |
| Pigment dispersion I-29 | Bk dispersion including polymer I-25 |
| Pigment dispersion I-30 | Bk dispersion including polymer I-26 |
| Pigment dispersion I-31 | Bk dispersion including polymer I-27 |
| Pigment dispersion I-32 | Bk dispersion including polymer I-28 |
| Pigment dispersion I-33 | Bk dispersion including polymer I-29 |
| Pigment dispersion I-34 | Bk dispersion including polymer I-30 |
| Pigment dispersion I-35 | Bk dispersion including polymer I-31 |
| Pigment dispersion I-36 | Bk dispersion including polymer I-32 |
| Pigment dispersion I-37 | Bk dispersion including polymer I-33 |
| Pigment dispersion I-38 | Bk dispersion including polymer I-34 |
| Pigment dispersion I-39 | Bk dispersion including polymer I-35 |

TABLE I-3-continued

| Pigment dispersion I-40 | Bk dispersion including 1-hydroxyethylidene-1,1-bisphosphonic acid salt | | | | | |
|---|---|---|---|---|---|---|
| Aqueous solution of polymer I-14 including a solid content in an amount of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

(3)

| | | Example | | | | |
|---|---|---|---|---|---|---|
| | Material | I-11 | I-12 | I-13 | I-14 | I-15 |
| Pigment dispersion I-1 | Naphthalene sulfonic acid Na | | | | | |
| Pigment dispersion I-2 | Bk dispersion including polymer I-1 | | | | | |
| Pigment dispersion I-3 | Bk dispersion including polymer I-2 | | | | | |
| Pigment dispersion I-4 | Bk dispersion including polymer I-3 | | | | | |
| Pigment dispersion I-5 | Bk dispersion including polymer I-4 | | | | | |
| Pigment dispersion I-6 | Bk dispersion including polymer I-5 | | | | | |
| Pigment dispersion I-7 | Bk dispersion including polymer I-6 | | | | | |
| Pigment dispersion I-8 | Bk dispersion including polymer I-7 | | | | | |
| Pigment dispersion I-9 | Bk dispersion including polymer I-8 | | | | | |
| Pigment dispersion I-10 | Bk dispersion including polymer I-9 | | | | | |
| Pigment dispersion I-11 | Bk dispersion including polymer I-10 | 40 | | | | |
| Pigment dispersion I-12 | Bk dispersion including polymer I-11 | | 40 | | | |
| Pigment dispersion I-13 | Bk dispersion including polymer I-12 | | | 40 | | |
| Pigment dispersion I-14 | Bk dispersion including polymer I-13 | | | | 40 | |
| Pigment dispersion I-15 | Bk dispersion including polymer I-14 | | | | | 40 |
| Pigment dispersion I-16 | Cy dispersion including polymer I-14 | | | | | |

TABLE I-3-continued

| | |
|---|---|
| Pigment dispersion I-17 | Ma dispersion including polymer I-14 |
| Pigment dispersion I-18 | Ye dispersion including polymer I-14 |
| Pigment dispersion I-19 | Bk dispersion including polymer I-15 |
| Pigment dispersion I-20 | Bk dispersion including polymer I-16 |
| Pigment dispersion I-21 | Bk dispersion including polymer I-17 |
| Pigment dispersion I-22 | Bk dispersion including polymer I-18 |
| Pigment dispersion I-23 | Bk dispersion including polymer I-19 |
| Pigment dispersion I-24 | Bk dispersion including polymer I-20 |
| Pigment dispersion I-25 | Bk dispersion including polymer I-21 |
| Pigment dispersion I-26 | Bk dispersion including polymer I-22 |
| Pigment dispersion I-27 | Bk dispersion including polymer I-23 |
| Pigment dispersion I-28 | Bk dispersion including polymer I-24 |
| Pigment dispersion I-29 | Bk dispersion including polymer I-25 |
| Pigment dispersion I-30 | Bk dispersion including polymer I-26 |
| Pigment dispersion I-31 | Bk dispersion including polymer I-27 |
| Pigment dispersion I-32 | Bk dispersion including polymer I-28 |
| Pigment dispersion I-33 | Bk dispersion including polymer I-29 |
| Pigment dispersion I-34 | Bk dispersion including polymer I-30 |
| Pigment dispersion I-35 | Bk dispersion including polymer I-31 |
| Pigment dispersion I-36 | Bk dispersion including polymer I-32 |
| Pigment dispersion I-37 | Bk dispersion including polymer I-33 |
| Pigment dispersion I-38 | Bk dispersion including polymer I-34 |
| Pigment dispersion I-39 | Bk dispersion including polymer I-35 |

TABLE I-3-continued

| | | | | | | |
|---|---|---|---|---|---|---|
| Pigment dispersion I-40 | Bk dispersion including 1-hydroxyethylidene-1,1-bisphosphonic acid salt | | | | | |
| Aqueous solution of polymer I-14 including a solid content in an amount of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

(4)

| | | Example | | | | |
|---|---|---|---|---|---|---|
| | Material | I-16 | I-17 | I-18 | I-19 | I-20 |
| Pigment dispersion I-1 | Naphthalene sulfonic acid Na | | | | | |
| Pigment dispersion I-2 | Bk dispersion including polymer I-1 | | | | | |
| Pigment dispersion I-3 | Bk dispersion including polymer I-2 | | | | | |
| Pigment dispersion I-4 | Bk dispersion including polymer I-3 | | | | | |
| Pigment dispersion I-5 | Bk dispersion including polymer I-4 | | | | | |
| Pigment dispersion I-6 | Bk dispersion including polymer I-5 | | | | | |
| Pigment dispersion I-7 | Bk dispersion including polymer I-6 | | | | | |
| Pigment dispersion I-8 | Bk dispersion including polymer I-7 | | | | | |
| Pigment dispersion I-9 | Bk dispersion including polymer I-8 | | | | | |
| Pigment dispersion I-10 | Bk dispersion including polymer I-9 | | | | | 40 |
| Pigment dispersion I-11 | Bk dispersion including polymer I-10 | | | | | |
| Pigment dispersion I-12 | Bk dispersion including polymer I-11 | | | | | |
| Pigment dispersion I-13 | Bk dispersion including polymer I-12 | | | | | |
| Pigment dispersion I-14 | Bk dispersion including polymer I-13 | | | | | |
| Pigment dispersion I-15 | Bk dispersion including polymer I-14 | | | | | |
| Pigment dispersion I-16 | Cy dispersion including polymer I-14 | 40 | | | | |
| Pigment dispersion I-17 | Ma dispersion including polymer I-14 | | 40 | | | |

TABLE I-3-continued

| | | | | | | |
|---|---|---|---|---|---|---|
| Pigment dispersion I-18 | Ye dispersion including polymer I-14 | 40 | | | | |
| Pigment dispersion I-19 | Bk dispersion including polymer I-15 | | 40 | | | |
| Pigment dispersion I-20 | Bk dispersion including polymer I-16 | | | | | 40 |
| Pigment dispersion I-21 | Bk dispersion including polymer I-17 | | | | | |
| Pigment dispersion I-22 | Bk dispersion including polymer I-18 | | | | | |
| Pigment dispersion I-23 | Bk dispersion including polymer I-19 | | | | | |
| Pigment dispersion I-24 | Bk dispersion including polymer I-20 | | | | | |
| Pigment dispersion I-25 | Bk dispersion including polymer I-21 | | | | | |
| Pigment dispersion I-26 | Bk dispersion including polymer I-22 | | | | | |
| Pigment dispersion I-27 | Bk dispersion including polymer I-23 | | | | | |
| Pigment dispersion I-28 | Bk dispersion including polymer I-24 | | | | | |
| Pigment dispersion I-29 | Bk dispersion including polymer I-25 | | | | | |
| Pigment dispersion I-30 | Bk dispersion including polymer I-26 | | | | | |
| Pigment dispersion I-31 | Bk dispersion including polymer I-27 | | | | | |
| Pigment dispersion I-32 | Bk dispersion including polymer I-28 | | | | | |
| Pigment dispersion I-33 | Bk dispersion including polymer I-29 | | | | | |
| Pigment dispersion I-34 | Bk dispersion including polymer I-30 | | | | | |
| Pigment dispersion I-35 | Bk dispersion including polymer I-31 | | | | | |
| Pigment dispersion I-36 | Bk dispersion including polymer I-32 | | | | | |
| Pigment dispersion I-37 | Bk dispersion including polymer I-33 | | | | | |
| Pigment dispersion I-38 | Bk dispersion including polymer I-34 | | | | | |
| Pigment dispersion I-39 | Bk dispersion including polymer I-35 | | | | | |
| Pigment dispersion I-40 | Bk dispersion including 1-hydroxyethylidene-1,1-bisphosphonic acid salt | | | | | |
| Aqueous solution of polymer I-14 including a solid content in an amount of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |

TABLE I-3-continued

| | | | | | | |
|---|---|---|---|---|---|---|
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

(5)

| | | Example | | | | |
|---|---|---|---|---|---|---|
| | Material | I-21 | I-22 | I-23 | I-24 | I-25 |
| Pigment dispersion I-1 | Naphthalene sulfonic acid Na | | | | | |
| Pigment dispersion I-2 | Bk dispersion including polymer I-1 | | | | | |
| Pigment dispersion I-3 | Bk dispersion including polymer I-2 | | | | | |
| Pigment dispersion I-4 | Bk dispersion including polymer I-3 | | | | | |
| Pigment dispersion I-5 | Bk dispersion including polymer I-4 | | | | | |
| Pigment dispersion I-6 | Bk dispersion including polymer I-5 | | | | | |
| Pigment dispersion I-7 | Bk dispersion including polymer I-6 | | | | | |
| Pigment dispersion I-8 | Bk dispersion including polymer I-7 | | | | | |
| Pigment dispersion I-9 | Bk dispersion including polymer I-8 | | | | | |
| Pigment dispersion I-10 | Bk dispersion including polymer I-9 | | | | | |
| Pigment dispersion I-11 | Bk dispersion including polymer I-10 | | | | | |
| Pigment dispersion I-12 | Bk dispersion including polymer I-11 | | | | | |
| Pigment dispersion I-13 | Bk dispersion including polymer I-12 | | | | | |
| Pigment dispersion I-14 | Bk dispersion including polymer I-13 | | | | | |
| Pigment dispersion I-15 | Bk dispersion including polymer I-14 | | | | | |
| Pigment dispersion I-16 | Cy dispersion including polymer I-14 | | | | | |
| Pigment dispersion I-17 | Ma dispersion including polymer I-14 | | | | | |
| Pigment dispersion I-18 | Ye dispersion including polymer I-14 | | | | | |
| Pigment dispersion I-19 | Bk dispersion including polymer I-15 | | | | | |
| Pigment dispersion I-20 | Bk dispersion including polymer I-16 | | | | | |
| Pigment dispersion I-21 | Bk dispersion including polymer I-17 | 40 | | | | |
| Pigment dispersion I-22 | Bk dispersion including polymer I-18 | | 40 | | | |

TABLE I-3-continued

| | | | | | | |
|---|---|---|---|---|---|---|
| Pigment dispersion I-23 | Bk dispersion including polymer I-19 | | | 40 | | |
| Pigment dispersion I-24 | Bk dispersion including polymer I-20 | | | | 40 | |
| Pigment dispersion I-25 | Bk dispersion including polymer I-21 | | | | | 40 |
| Pigment dispersion I-26 | Bk dispersion including polymer I-22 | | | | | |
| Pigment dispersion I-27 | Bk dispersion including polymer I-23 | | | | | |
| Pigment dispersion I-28 | Bk dispersion including polymer I-24 | | | | | |
| Pigment dispersion I-29 | Bk dispersion including polymer I-25 | | | | | |
| Pigment dispersion I-30 | Bk dispersion including polymer I-26 | | | | | |
| Pigment dispersion I-31 | Bk dispersion including polymer I-27 | | | | | |
| Pigment dispersion I-32 | Bk dispersion including polymer I-28 | | | | | |
| Pigment dispersion I-33 | Bk dispersion including polymer I-29 | | | | | |
| Pigment dispersion I-34 | Bk dispersion including polymer I-30 | | | | | |
| Pigment dispersion I-35 | Bk dispersion including polymer I-31 | | | | | |
| Pigment dispersion I-36 | Bk dispersion including polymer I-32 | | | | | |
| Pigment dispersion I-37 | Bk dispersion including polymer I-33 | | | | | |
| Pigment dispersion I-38 | Bk dispersion including polymer I-34 | | | | | |
| Pigment dispersion I-39 | Bk dispersion including polymer I-35 | | | | | |
| Pigment dispersion I-40 | Bk dispersion including 1-hydroxyethylidene-1,1-bisphosphonic acid salt | | | | | |
| Aqueous solution of polymer I-14 including a solid content in an amount of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE I-3-continued

| | | (6) Example | | | | |
|---|---|---|---|---|---|---|
| | Material | I-26 | I-27 | I-28 | I-29 | I-30 |
| Pigment dispersion I-1 | Naphthalene sulfonic acid Na | | | | | |
| Pigment dispersion I-2 | Bk dispersion including polymer I-1 | | | | | |
| Pigment dispersion I-3 | Bk dispersion including polymer I-2 | | | | | |
| Pigment dispersion I-4 | Bk dispersion including polymer I-3 | | | | | |
| Pigment dispersion I-5 | Bk dispersion including polymer I-4 | | | | | |
| Pigment dispersion I-6 | Bk dispersion including polymer I-5 | | | | | |
| Pigment dispersion I-7 | Bk dispersion including polymer I-6 | | | | | |
| Pigment dispersion I-8 | Bk dispersion including polymer I-7 | | | | | |
| Pigment dispersion I-9 | Bk dispersion including polymer I-8 | | | | | |
| Pigment dispersion I-10 | Bk dispersion including polymer I-9 | | | | | |
| Pigment dispersion I-11 | Bk dispersion including polymer I-10 | | | | | |
| Pigment dispersion I-12 | Bk dispersion including polymer I-11 | | | | | |
| Pigment dispersion I-13 | Bk dispersion including polymer I-12 | | | | | |
| Pigment dispersion I-14 | Bk dispersion including polymer I-13 | | | | | |
| Pigment dispersion I-15 | Bk dispersion including polymer I-14 | | | | | |
| Pigment dispersion I-16 | Cy dispersion including polymer I-14 | | | | | |
| Pigment dispersion I-17 | Ma dispersion including polymer I-14 | | | | | |
| Pigment dispersion I-18 | Ye dispersion including polymer I-14 | | | | | |
| Pigment dispersion I-19 | Bk dispersion including polymer I-15 | | | | | |
| Pigment dispersion I-20 | Bk dispersion including polymer I-16 | | | | | |
| Pigment dispersion I-21 | Bk dispersion including polymer I-17 | | | | | |
| Pigment dispersion I-22 | Bk dispersion including polymer I-18 | | | | | |
| Pigment dispersion I-23 | Bk dispersion including polymer I-19 | | | | | |
| Pigment dispersion I-24 | Bk dispersion including polymer I-20 | | | | | |
| Pigment dispersion I-25 | Bk dispersion including polymer I-21 | | | | | |

TABLE I-3-continued

| Material | | | | | | |
|---|---|---|---|---|---|---|
| Pigment dispersion I-26 | Bk dispersion including polymer I-22 | 40 | | | | |
| Pigment dispersion I-27 | Bk dispersion including polymer I-23 | | 40 | | | |
| Pigment dispersion I-28 | Bk dispersion including polymer I-24 | | | 40 | | |
| Pigment dispersion I-29 | Bk dispersion including polymer I-25 | | | | 40 | |
| Pigment dispersion I-30 | Bk dispersion including polymer I-26 | | | | | 40 |
| Pigment dispersion I-31 | Bk dispersion including polymer I-27 | | | | | |
| Pigment dispersion I-32 | Bk dispersion including polymer I-28 | | | | | |
| Pigment dispersion I-33 | Bk dispersion including polymer I-29 | | | | | |
| Pigment dispersion I-34 | Bk dispersion including polymer I-30 | | | | | |
| Pigment dispersion I-35 | Bk dispersion including polymer I-31 | | | | | |
| Pigment dispersion I-36 | Bk dispersion including polymer I-32 | | | | | |
| Pigment dispersion I-37 | Bk dispersion including polymer I-33 | | | | | |
| Pigment dispersion I-38 | Bk dispersion including polymer I-34 | | | | | |
| Pigment dispersion I-39 | Bk dispersion including polymer I-35 | | | | | |
| Pigment dispersion I-40 | Bk dispersion including 1-hydroxyethylidene-1,1-bisphosphonic acid salt | | | | | |
| Aqueous solution of polymer I-14 including a solid content in an amount of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

(7)

| | | Example | | | | |
|---|---|---|---|---|---|---|
| | Material | I-31 | I-32 | I-33 | I-34 | I-35 |
| Pigment dispersion I-1 | Naphthalene sulfonic acid Na | | | | | |
| Pigment dispersion I-2 | Bk dispersion including polymer I-1 | | | | | |
| Pigment dispersion I-3 | Bk dispersion including polymer I-2 | | | | | |

TABLE I-3-continued

| | |
|---|---|
| Pigment dispersion I-4 | Bk dispersion including polymer I-3 |
| Pigment dispersion I-5 | Bk dispersion including polymer I-4 |
| Pigment dispersion I-6 | Bk dispersion including polymer I-5 |
| Pigment dispersion I-7 | Bk dispersion including polymer I-6 |
| Pigment dispersion I-8 | Bk dispersion including polymer I-7 |
| Pigment dispersion I-9 | Bk dispersion including polymer I-8 |
| Pigment dispersion I-10 | Bk dispersion including polymer I-9 |
| Pigment dispersion I-11 | Bk dispersion including polymer I-10 |
| Pigment dispersion I-12 | Bk dispersion including polymer I-11 |
| Pigment dispersion I-13 | Bk dispersion including polymer I-12 |
| Pigment dispersion I-14 | Bk dispersion including polymer I-13 |
| Pigment dispersion I-15 | Bk dispersion including polymer I-14 |
| Pigment dispersion I-16 | Cy dispersion including polymer I-14 |
| Pigment dispersion I-17 | Ma dispersion including polymer I-14 |
| Pigment dispersion I-18 | Ye dispersion including polymer I-14 |
| Pigment dispersion I-19 | Bk dispersion including polymer I-15 |
| Pigment dispersion I-20 | Bk dispersion including polymer I-16 |
| Pigment dispersion I-21 | Bk dispersion including polymer I-17 |
| Pigment dispersion I-22 | Bk dispersion including polymer I-18 |
| Pigment dispersion I-23 | Bk dispersion including polymer I-19 |
| Pigment dispersion I-24 | Bk dispersion including polymer I-20 |
| Pigment dispersion I-25 | Bk dispersion including polymer I-21 |
| Pigment dispersion I-26 | Bk dispersion including polymer I-22 |
| Pigment dispersion I-27 | Bk dispersion including polymer I-23 |
| Pigment dispersion I-28 | Bk dispersion including polymer I-24 |
| Pigment dispersion I-29 | Bk dispersion including polymer I-25 |

TABLE I-3-continued

| | | | | | | |
|---|---|---|---|---|---|---|
| Pigment dispersion I-30 | Bk dispersion including polymer I-26 | | | | | |
| Pigment dispersion I-31 | Bk dispersion including polymer I-27 | 40 | | | | |
| Pigment dispersion I-32 | Bk dispersion including polymer I-28 | | 40 | | | |
| Pigment dispersion I-33 | Bk dispersion including polymer I-29 | | | 40 | | |
| Pigment dispersion I-34 | Bk dispersion including polymer I-30 | | | | 40 | |
| Pigment dispersion I-35 | Bk dispersion including polymer I-31 | | | | | 40 |
| Pigment dispersion I-36 | Bk dispersion including polymer I-32 | | | | | |
| Pigment dispersion I-37 | Bk dispersion including polymer I-33 | | | | | |
| Pigment dispersion I-38 | Bk dispersion including polymer I-34 | | | | | |
| Pigment dispersion I-39 | Bk dispersion including polymer I-35 | | | | | |
| Pigment dispersion I-40 | Bk dispersion including 1-hydroxyethylidene-1,1-bisphosphonic acid salt | | | | | |
| Aqueous solution of polymer I-14 including a solid content in an amount of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 2 | 26 | 26 | 26 | 26 |
| Total | | 100 | 100 | 100 | 100 | 100 |

(8)

| | | Example | | Com. Example | | |
|---|---|---|---|---|---|---|
| | Material | I-36 | I-37 | I-1 | I-2 | I-3 |
| Pigment dispersion I-1 | Naphthalene sulfonic acid Na | | | | | |
| Pigment dispersion I-2 | Bk dispersion including polymer I-1 | | | | | |
| Pigment dispersion I-3 | Bk dispersion including polymer I-2 | | | | | |
| Pigment dispersion I-4 | Bk dispersion including polymer I-3 | | | | | |
| Pigment dispersion I-5 | Bk dispersion including polymer I-4 | | | | | |
| Pigment dispersion I-6 | Bk dispersion including polymer I-5 | | | | | |
| Pigment dispersion I-7 | Bk dispersion including polymer I-6 | | | | | |

TABLE I-3-continued

| | |
|---|---|
| Pigment dispersion I-8 | Bk dispersion including polymer I-7 |
| Pigment dispersion I-9 | Bk dispersion including polymer I-8 |
| Pigment dispersion I-10 | Bk dispersion including polymer I-9 |
| Pigment dispersion I-11 | Bk dispersion including polymer I-10 |
| Pigment dispersion I-12 | Bk dispersion including polymer I-11 |
| Pigment dispersion I-13 | Bk dispersion including polymer I-12 |
| Pigment dispersion I-14 | Bk dispersion including polymer I-13 |
| Pigment dispersion I-15 | Bk dispersion including polymer I-14 |
| Pigment dispersion I-16 | Cy dispersion including polymer I-14 |
| Pigment dispersion I-17 | Ma dispersion including polymer I-14 |
| Pigment dispersion I-18 | Ye dispersion including polymer I-14 |
| Pigment dispersion I-19 | Bk dispersion including polymer I-15 |
| Pigment dispersion I-20 | Bk dispersion including polymer I-16 |
| Pigment dispersion I-21 | Bk dispersion including polymer I-17 |
| Pigment dispersion I-22 | Bk dispersion including polymer I-18 |
| Pigment dispersion I-23 | Bk dispersion including polymer I-19 |
| Pigment dispersion I-24 | Bk dispersion including polymer I-20 |
| Pigment dispersion I-25 | Bk dispersion including polymer I-21 |
| Pigment dispersion I-26 | Bk dispersion including polymer I-22 |
| Pigment dispersion I-27 | Bk dispersion including polymer I-23 |
| Pigment dispersion I-28 | Bk dispersion including polymer I-24 |
| Pigment dispersion I-29 | Bk dispersion including polymer I-25 |
| Pigment dispersion I-30 | Bk dispersion including polymer I-26 |
| Pigment dispersion I-31 | Bk dispersion including polymer I-27 |
| Pigment dispersion I-32 | Bk dispersion including polymer I-28 |
| Pigment dispersion I-33 | Bk dispersion including polymer I-29 |

TABLE I-3-continued

| | | | | | | |
|---|---|---|---|---|---|---|
| Pigment dispersion I-34 | Bk dispersion including polymer I-30 | | | | | |
| Pigment dispersion I-35 | Bk dispersion including polymer I-31 | | | | | |
| Pigment dispersion I-36 | Bk dispersion including polymer I-32 | 40 | | | | |
| Pigment dispersion I-37 | Bk dispersion including polymer I-33 | | 40 | | | |
| Pigment dispersion I-38 | Bk dispersion including polymer I-34 | | | 40 | | |
| Pigment dispersion I-39 | Bk dispersion including polymer I-35 | | | | 40 | |
| Pigment dispersion I-40 | Bk dispersion including 1-hydroxyethylidene-1,1-bisphosphonic acid salt | | | | | 40 |
| Aqueous solution of polymer I-14 including a solid content in an amount of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 2 | 26 | 26 | 26 | 26 |
| Total | | 100 | 100 | 100 | 100 | 100 |

The inks for inkjet recording of Examples I-1 to I-37 and Comparative Examples I-1 to I-3 were evaluated by the following methods. The results are shown in Table I-4.

<Image Density (ID)>

In an environment of 23° C. and 50 RH, the ink was filled in an inkjet printer IPSiO GX5000 from Ricoh Company, Ltd. After a chart on which general marks "■" of JIS X 0208 (1997), 2223 having 64 points are described by Microsoft Word 2003 was printed on a plain paper 1 (XEROX 4200 from XEROX, Inc.) and a plain paper 2 (My Paper from Ricoh Company, Ltd.), the image density of "■" was evaluated using X-Rite938 from X-Rite, Inc. Then, the printing mode was "plain paper-fast" mode by a driver of the printer without color calibration.

Image density was evaluated under the following standard.
(Black)
A: not less than 1.25
B: not less than 1.20 and less than 1.25
C: not less than 1.10 and less than 1.20
D: less than 1.10
E: Unprintable as pigment was gelated and undispersible
(Yellow)
A: not less than 0.80
B: not less than 0.75 and less than 0.80
C: not less than 0.70 and less than 0.75
D: less than 0.70
E: Unprintable as pigment was gelated and undispersible
(Magenta)
A: not less than 0.95
B: not less than 0.85 and less than 0.95
C: not less than 0.75 and less than 0.85
D: less than 0.75
E: Unprintable as pigment was gelated and undispersible
(Cyan)
A: not less than 1.05
B: not less than 0.95 and less than 1.05
C: not less than 0.85 and less than 0.95
D: less than 0.85
E: Unprintable as pigment was gelated and undispersible <Storage Stability of Pigment Dispersion>

Each of the pigment dispersions was placed in a polyethylene container and sealed. The viscosity after stored at 60° C. for 1 week was measured to evaluate under the following standard, compared with the initial viscosity.

Viscosity Variation(%)=(Viscosity after Stored/Viscosity before Stored)×100

The viscosity was measured by a viscometer RE500L from TOKI SANGYO CO., LTD. at 25° C., adjusting the rotational number at from 50 to 100 rpm according the viscosity.

A: Viscosity variation was not greater than ±5%
B: Viscosity variation was greater than ±5% and not greater than ±8%
C: Viscosity variation was greater than ±8% and not greater than ±10%
D: Viscosity variation was greater than ±10% and not greater than ±30%
E: Viscosity variation was greater than ±30% (Unevaluable as pigment was gelated)

<Storage Stability of Ink>

Each of the inks was filled in an ink cartridge. The viscosity after stored at 60° C. for 1 week was measured to evaluate under the following standard, compared with the initial viscosity.

Viscosity Variation(%)=(Viscosity after Stored/Viscosity before Stored)×100

The viscosity was measured by a viscometer RE500L from TOKI SANGYO CO., LTD. at 25° C., adjusting the rotational number at from 50 to 100 rpm according the viscosity.

A: Viscosity variation was not greater than ±5%
B: Viscosity variation was greater than ±5% and not greater than ±8%
C: Viscosity variation was greater than ±8% and not greater than ±10%
D: Viscosity variation was greater than ±10% and not greater than ±30%
E: Viscosity variation was greater than ±30% (Unevaluable as pigment was gelated)

TABLE I-4

| | | Evaluation Results | | | |
|---|---|---|---|---|---|
| | Pigment Dispersion | ID Plain Paper 1 | ID Plain Paper 2 | Storage Stability of Pigment Dispersion | Storage Stability of Ink |
| Example I-1 | Pigment Dispersion I-1 | B | B | B | B |
| Example I-2 | Pigment Dispersion I-2 | B | B | A | B |
| Example I-3 | Pigment Dispersion I-3 | B | B | A | B |
| Example I-4 | Pigment Dispersion I-4 | A | A | A | A |
| Example I-5 | Pigment Dispersion I-5 | A | A | A | A |
| Example I-6 | Pigment Dispersion I-6 | A | A | A | A |
| Example I-7 | Pigment Dispersion I-7 | A | A | A | A |
| Example I-8 | Pigment Dispersion I-8 | A | A | A | A |
| Example I-9 | Pigment Dispersion I-9 | A | A | A | A |
| Example I-10 | Pigment Dispersion I-10 | A | A | A | A |
| Example I-11 | Pigment Dispersion I-11 | A | A | A | A |
| Example I-12 | Pigment Dispersion I-12 | B | B | A | A |
| Example I-13 | Pigment Dispersion I-13 | A | B | A | A |
| Example I-14 | Pigment Dispersion I-14 | A | A | A | A |
| Example I-15 | Pigment Dispersion I-15 | A | A | A | A |
| Example I-16 | Pigment Dispersion I-16 | A | A | A | A |
| Example I-17 | Pigment Dispersion I-17 | A | A | A | A |
| Example I-18 | Pigment Dispersion I-18 | A | A | A | A |
| Example I-19 | Pigment Dispersion I-19 | A | A | A | A |
| Example I-20 | Pigment Dispersion I-20 | A | A | B | A |
| Example I-21 | Pigment Dispersion I-21 | A | A | B | B |
| Example I-22 | Pigment Dispersion I-22 | A | A | A | A |
| Example I-23 | Pigment Dispersion I-23 | A | A | A | A |
| Example I-24 | Pigment Dispersion I-24 | A | A | A | A |
| Example I-25 | Pigment Dispersion I-25 | A | A | A | A |
| Example I-26 | Pigment Dispersion I-26 | A | A | A | A |
| Example I-27 | Pigment Dispersion I-27 | A | A | A | A |
| Example I-28 | Pigment Dispersion I-28 | A | A | A | A |
| Example I-29 | Pigment Dispersion I-29 | A | A | A | A |
| Example I-30 | Pigment Dispersion I-30 | A | A | A | A |
| Example I-31 | Pigment Dispersion I-31 | A | A | A | A |
| Example I-32 | Pigment Dispersion I-32 | B | B | A | A |
| Example I-33 | Pigment Dispersion I-33 | A | A | A | A |
| Example I-34 | Pigment Dispersion I-34 | A | A | A | A |
| Example I-35 | Pigment Dispersion I-35 | A | A | B | B |
| Example I-36 | Pigment Dispersion I-36 | A | A | A | A |
| Example I-37 | Pigment Dispersion I-37 | A | A | A | A |
| Comparative Example I-1 | Pigment Dispersion I-38 | E | C | E | E |
| Comparative Example I-2 | Pigment Dispersion I-39 | E | C | E | E |
| Comparative Example I-3 | Pigment Dispersion I-40 | E | E | E | E |

Table I-4 shows the inks of Examples produce images having higher image density than those produced by the inks of Comparative Examples even on typical plain papers, and have good storage stability even when including the hydro-soluble organic solvent in an amount greater than 20% by weight.

Synthesis of Monomer

Monomer No. II-1:
4-methacrylamide-1-hydroxybutane-1,1-diphosphonic acid di sodium salt In a flask, 25 parts of alendronic acid from Tokyo Chemical Industry Co., Ltd. were placed, and an aqueous solution including 17.1 parts of sodium hydroxide from Kanto Chemical Co., Inc. and 200 parts of ion-exchanged water was placed therein to be completely dissolved while stirred. Next, 13.32 parts of methacrylic acid chloride from Tokyo Chemical Industry Co., Ltd. were slowly dropped therein while cooled at 5° C. After stirred for 30 min, 14.53 parts of concentrated hydrochloric acid from Wako Pure Chemical Industries, Ltd. were dropped therein while cooled. The reacted liquid was extracted and washed for 3 times with methylene chloride, and the remaining aqueous solution was dropped in 800 parts of methanol and filtered to extract 35 parts of an object.

One point seven (1.7) parts of the object were dissolved in 176 parts of ion-exchanged water to prepare a solution, and the solution was subjected to neutralization titration in 0.1 N of KOH methanol solution with thymolphthalein from Kanto Chemical Co., Inc. as an indicator to determine an acid value. The acid value was 155 mg KOH/g. Compared with the titration result of the alendronic acid, the acid value was the same when 2 OH groups were replaced with Na salts.

Monomer No. II-2:
4-methacrylamide-hydroxybutane-1,1-diphosphonic acid di potassium salt The procedure for preparation of the object in synthesis of Monomer No. II-1 was repeated except for replacing 17.1 parts of sodium hydroxide with 24 parts of potassium hydroxide from Wako Pure Chemical Industries, Ltd. to prepare 40 parts of an object.

Monomer No. II-3:
4-acrylamide-1-hydroxybutane-1,1-diphosphonic acid di sodium salt The procedure for preparation of the object in synthesis of Monomer No. II-1 was repeated except for replacing 13.32 parts of methacrylic acid chloride with 11.53 parts of acrylic acid chloride from Tokyo Chemical Industry Co., Ltd. to prepare 33 parts of an object.

Monomer No. II-4:
4-acrylamide-1-hydroxybutane-1,1-diphosphonic acid di(triethyl ammonium)salt The procedure for preparation of the object in synthesis of Monomer No. II-1 was repeated except for replacing 13.32 parts of methacrylic acid chloride with 11.53 parts of acrylic acid chloride, and 17.1 parts of sodium hydroxide with 43.3 parts of triethylamine from Kanto Chemical Co., Inc. to prepare 44 parts of an object.

Monomer No. II-5:
4-methacrylamide-1-hydroxybutane 1,1-diphosphoic acid di(tetraethylammonium)salt)

The procedure for preparation of the object in synthesis of Monomer No. 1 was repeated except for replacing 17.1 parts of sodium hydroxide with 179.8 parts of tetraethylammonium hydroxide (35% aqueous solution) from Kanto Chemical Co., Inc., and 200 parts of ion-exchanged water with 83.1 parts thereof to prepare 55 parts of an object.

Monomer No. II-6:
4-methacrylamide-1-hydroxybutane 1,1-diphosphoic acid di(tetrabutylammonium)salt)

The procedure for preparation of the object in synthesis of Monomer No. 1 was repeated except for replacing 17.1 parts of sodium hydroxide with 277.2 parts of tetraethylammonium hydroxide (40% aqueous solution) from Kanto Chemical Co., Inc., and 200 parts of ion-exchanged water with 33.7 parts thereof to prepare 76 parts of an object.

Synthesis Example II-1

Copolymer (Polymer II-1) Including a Salt of Phosphonic Acid Group

In a reaction container including a gas inlet tube, a thermometer and a reflux condenser, in an argon atmosphere, 450 parts of N-dimethylformamide (DMF) were placed and heated at 75° C. In the container, 223 parts of aqueous solution including 30 parts of the monomer No. II-1 as the monomer having the formula (4) and 193 parts of water, 212 parts of a DMF solution including 27 parts of cyclohexylmethacrylate from Tokyo Chemical Industry Co., Ltd. as the monomer having the formula (5), 3 parts of N-[3-(dimethylamino)propyl]acrylamide (DMAPAA) from Tokyo Chemical Industry Co., Ltd. as the monomer having the formula (6a) and 182 parts of DMF, and 187.4 parts of a DMF solution including 5.4 parts of 2,2'-azobisisobutylonitrile (AIBN) and 182 parts of DMF were added in 12 batches every 30 min. After these were all added therein, the mixture was further stirred for 4 hrs at 75° C., cooled and the polymerization was completed.

The extract was filtered, washed with hexane, and vacuum-dried at 50° C. to obtain 62 parts of a copolymer (polymer II-1).

One (1) part of the resin (copolymer) was dissolved in 100 parts of ion-exchanged water to prepare a solution, and the solution was subjected to neutralization titration in 0.1 N of KOH methanol solution with thymolphthalein as an indicator to determine an acid value. The acid value was 77 mg KOH/g. This was almost same as 77 mg KOH/g determined from the acid value of the monomer No. II-1 assuming copolymerization had been made in proportion to the place-in quantity.

Based on the acid value, the copolymer was neutralized with sodium hydroxide to prepare an aqueous solution including 10% by weight of the resin. The solution had a viscosity of 1.7 mPa·s at 25° C.

The aqueous solution including 10% by weight of the resin was used for preparing a pigment dispersion. From the titration result of the alendronic acid (monomer material), 3 OH groups out of 4 of the phosphonic acid were proved to be neutralized by sodium ion. The results are shown in Table II-1.

Synthesis Example II-2

Synthesis of Polymer II-2

The procedure for preparation of the polymer II-1 in Synthesis Example II-1 was repeated except for replacing 27 parts of cyclohexylmethacrylate with 24 parts of dodecylmethacrylate (45% by weight) and changing 3 parts of DMAPAA into 6 parts thereof to prepare a polymer II-2.

Synthesis Examples II-3 (Polymer II-3) to II-39 (Polymer II-39) and Comparative Synthesis Examples II-1 (Polymer II-40) and II-2 (Polymer II-41)

The procedure for preparation of the polymer II-1 in Synthesis Example II-1 was repeated except for changing the monomers having the formulae (4), (5) and (6a), and the conditions as shown in Table II-1 to prepare polymers II-3 to II-41.

Comparative Synthesis Example II-3

Preparation of Salt of Low-Molecular-Weight Diphosphonic Acid with Alkali Metal

A low-molecular-weight 1-hydroxyethylidene-1,1-diphosphonic acid from Strem Chemicals, Inc. was neutralized by 2 equivalents of potassium hydroxide in methanol, and the methanol was removed. An aqueous solution including 10% by weight of a salt of the 1-hydroxyethylidene-1,1-diphosphonic acid had a viscosity of 2.0 mPa·s at 25° C.

TABLE II-1

| | | Monomers | | | | | |
|---|---|---|---|---|---|---|---|
| | | Monomer (4) | % by weight | Monomer (5) | % by weight | Monomer (6a) | % by weight |
| Syn. Ex. II-1 | Polymer II-1 | Monomer No. II-1 | 50 | Cyclohexyl MA | 45 | DMAPAA | 5 |
| Syn. Ex. II-2 | Polymer II-2 | Monomer No. II-1 | 50 | Dodecyl MA | 40 | DMAPAA | 10 |
| Syn. Ex. II-3 | Polymer II-3 | Monomer No. II-1 | 50 | Hexadecyl MA | 30 | DMAPAA | 20 |
| Syn. Ex. II-4 | Polymer II-4 | Monomer No. II-1 | 50 | Octadecyl MA | 30 | DMAPAA | 20 |
| Syn. Ex. II-5 | Polymer II-5 | Monomer No. II-1 | 50 | Docosyl A | 30 | DMAPAA | 20 |
| Syn. Ex. II-6 | Polymer II-6 | Monomer No. II-1 | 25 | Benzyl A | 55 | DMAPAA | 20 |
| Syn. Ex. II-7 | Polymer II-7 | Monomer No. II-1 | 30 | Benzyl A | 60 | DMAPAA | 10 |
| Syn. Ex. II-8 | Polymer II-8 | Monomer No. II-1 | 40 | Benzyl A | 50 | DMAPAA | 10 |
| Syn. Ex. II-9 | Polymer II-9 | Monomer No. II-1 | 50 | Benzyl A | 40 | DMAPAA | 10 |
| Syn. Ex. II-10 | Polymer II-10 | Monomer No. II-1 | 60 | Benzyl A | 30 | DMAPAA | 10 |
| Syn. Ex. II-11 | Polymer II-11 | Monomer No. II-1 | 70 | Benzyl A | 20 | DMAPAA | 10 |
| Syn. Ex. II-12 | Polymer II-12 | Monomer No. II-1 | 75 | Benzyl A | 15 | DMAPAA | 10 |
| Syn. Ex. II-13 | Polymer II-13 | Monomer No. II-1 | 60 | Benzyl MA | 30 | DMAPAA | 10 |
| Syn. Ex. II-14 | Polymer II-14 | Monomer No. II-1 | 50 | Benzyl MA | 30 | DMAPAA | 20 |
| Syn. Ex. II-15 | Polymer II-15 | Monomer No. II-1 | 40 | Benzyl MA | 50 | DMAPAA | 10 |
| Syn. Ex. II-16 | Polymer II-16 | Monomer No. II-1 | 60 | Dodecyl A | 30 | DMAPAA | 10 |
| Syn. Ex. II-17 | Polymer II-17 | Monomer No. II-1 | 50 | Octadecyl A | 40 | DMAPAA | 10 |
| Syn. Ex. II-18 | Polymer II-18 | Monomer No. II-1 | 50 | Benzyl MA | 40 | DMAPAA | 10 |
| Syn. Ex. II-19 | Polymer II-19 | Monomer No. II-2 | 60 | Benzyl MA | 30 | DMAPAA | 10 |
| Syn. Ex. II-20 | Polymer II-20 | Monomer No. II-2 | 50 | Benzyl MA | 40 | DMAPAA | 10 |
| Syn. Ex. II-21 | Polymer II-21 | Monomer No. II-2 | 50 | Benzyl MA | 40 | DMAPAA | 10 |
| Syn. Ex. II-22 | Polymer II-22 | Monomer No. II-3 | 50 | Benzyl MA | 40 | DMAPAA | 10 |
| Syn. Ex. II-23 | Polymer II-23 | Monomer No. II-3 | 40 | Benzyl MA | 40 | DMAPAA | 20 |
| Syn. Ex. II-24 | Polymer II-24 | Monomer No. II-4 | 50 | Benzyl MA | 40 | DMAPAA | 10 |
| Syn. Ex. II-25 | Polymer II-25 | Monomer No. II-3 | 60 | Octadecyl MA | 30 | DMAPAA | 10 |
| Syn. Ex. II-26 | Polymer II-26 | Monomer No. II-3 | 50 | Benzyl MA | 40 | DMAPAA | 10 |
| Syn. Ex. II-27 | Polymer II-27 | Monomer No. II-1 | 50 | Benzyl A | 47 | DMAPAA | 3 |
| Syn. Ex. II-28 | Polymer II-28 | Monomer No. II-1 | 50 | Benzyl A | 45 | DMAPAA | 5 |
| Syn. Ex. II-29 | Polymer II-29 | Monomer No. II-1 | 40 | Benzyl A | 30 | DMAPAA | 30 |
| Syn. Ex. II-30 | Polymer II-30 | Monomer No. II-1 | 50 | Benzyl A | 40 | DEAEAA | 10 |
| Syn. Ex. II-31 | Polymer II-31 | Monomer No. II-1 | 60 | Benzyl A | 30 | DEAEAA | 10 |
| Syn. Ex. II-32 | Polymer II-32 | Monomer No. II-1 | 50 | Benzyl MA | 40 | DMAPMAA | 10 |
| Syn. Ex. II-33 | Polymer II-33 | Monomer No. II-3 | 50 | Benzyl A | 40 | DMAPMAA | 10 |
| Syn. Ex. II-34 | Polymer II-34 | Monomer No. II-3 | 40 | Benzyl MA | 40 | DMAPMAA | 20 |
| Syn. Ex. II-35 | Polymer II-35 | Monomer No. II-1 | 50 | Benzyl A | 40 | DMAPAA | 10 |
| Syn. Ex. II-36 | Polymer II-36 | Monomer No. II-1 | 50 | Benzyl A | 40 | DMAPAA | 10 |

TABLE II-1-continued

| | | | | | | | |
|---|---|---|---|---|---|---|---|
| Syn. Ex. II-37 | Polymer II-37 | Monomer No. II-1 | 50 | Benzyl A | 40 | DMAPAA | 10 |
| Syn. Ex. II-38 | Polymer II-38 | Monomer No. II-1 | 50 | Benzyl A | 40 | DMAPAA | 10 |
| Syn. Ex. II-39 | Polymer II-39 | Monomer No. II-5 | 50 | Benzyl A | 40 | DMAPAA | 10 |
| Com. Syn. Ex. II-1 | Polymer II-40 | Monomer No. II-1 | 100 | — | | 0 | |
| Com. Syn. Ex. II-2 | Polymer II-41 | Monomer No. II-2 | 30 | 2-hydoxypropyl acrylamide | 70 | | |
| Com. Syn. Ex. II-3 | Low-molecular-weight diphosphonic acid salt | colspan="6" | Neutralization of 1-hydroxyethylidene-1,1-diphosphonic acid by KOH |

(2)

| | | Viscosity (mPa·s) | M in formula (1) |
|---|---|---|---|
| Syn. Ex. II-1 | Polymer II-1 | 1.7 | 3Na, H |
| Syn. Ex. II-2 | Polymer II-2 | 1.9 | 3Na, H |
| Syn. Ex. II-3 | Polymer II-3 | 2.2 | 3Na, H |
| Syn. Ex. II-4 | Polymer II-4 | 2.1 | 3Na, H |
| Syn. Ex. II-5 | Polymer II-5 | 2.2 | 3Na, H |
| Syn. Ex. II-6 | Polymer II-6 | 1.7 | 3Na, H |
| Syn. Ex. II-7 | Polymer II-7 | 1.8 | 3Na, H |
| Syn. Ex. II-8 | Polymer II-8 | 1.9 | 3Na, H |
| Syn. Ex. II-9 | Polymer II-9 | 1.8 | 3Na, H |
| Syn. Ex. II-10 | Polymer II-10 | 2.5 | 3Na, H |
| Syn. Ex. II-11 | Polymer II-11 | 2.5 | 3Na, H |
| Syn. Ex. II-12 | Polymer II-12 | 2.6 | 3Na, H |
| Syn. Ex. II-13 | Polymer II-13 | 2.5 | 3Na, H |
| Syn. Ex. II-14 | Polymer II-14 | 2.2 | 3Na, H |
| Syn. Ex. II-15 | Polymer II-15 | 2.0 | 3Na, H |
| Syn. Ex. II-16 | Polymer II-16 | 2.3 | 3Na, H |
| Syn. Ex. II-17 | Polymer II-17 | 2.4 | 3Na, H |
| Syn. Ex. II-18 | Polymer II-18 | 1.7 | 2Na, 2H |
| Syn. Ex. II-19 | Polymer II-19 | 2.4 | 3K, H |
| Syn. Ex. II-20 | Polymer II-20 | 1.8 | 3K, H |
| Syn. Ex. II-21 | Polymer II-21 | 1.8 | 3K, H |
| Syn. Ex. II-22 | Polymer II-22 | 2.0 | 3Na, H |
| Syn. Ex. II-23 | Polymer II-23 | 2.1 | 3Na, H |
| Syn. Ex. II-24 | Polymer II-24 | 2.0 | 3TEtA, H |
| Syn. Ex. II-25 | Polymer II-25 | 2.5 | 3Na, H |
| Syn. Ex. II-26 | Polymer II-26 | 2.1 | 3Na, H |
| Syn. Ex. II-27 | Polymer II-27 | 2.0 | 3Na, H |
| Syn. Ex. II-28 | Polymer II-28 | 2.1 | 3Na, H |
| Syn. Ex. II-29 | Polymer II-29 | 1.9 | 3Na, H |
| Syn. Ex. II-30 | Polymer II-30 | 1.9 | 3Na, H |
| Syn. Ex. II-31 | Polymer II-31 | 2.6 | 3Na, H |
| Syn. Ex. II-32 | Polymer II-32 | 2.0 | 3Na, H |
| Syn. Ex. II-33 | Polymer II-33 | 1.8 | 3Na, H |
| Syn. Ex. II-34 | Polymer II-34 | 2.1 | 3Na, H |
| Syn. Ex. II-35 | Polymer II-35 | 1.3 | 3Na, H |
| Syn. Ex. II-36 | Polymer II-36 | 1.5 | 3Na, H |
| Syn. Ex. II-37 | Polymer II-37 | 4.0 | 3Na, H |
| Syn. Ex. II-38 | Polymer II-38 | 4.2 | 3Na, H |
| Syn. Ex. II-39 | Polymer II-39 | 1.7 | 3TetraEtA, H, H |
| Com. Syn. Ex. II-1 | Polymer II-40 | 3.2 | 2Na, 2H |
| Com. Syn. Ex. II-2 | Polymer II-41 | 9.5 | 2K, 2H |
| Com. Syn. Ex. II-3 | Low-molecular-weight diphosphonic acid salt | 2.0 | 2K, 2H |

3Na. H represents M+ includes 3 Na ions and 1 proton. 2K, 2H represents 2 K ions and 2 protons. TEtA represents trimethylammonium ion. MA represents methacrylate and A represents acrylate. DEAEAA represents diethylamino ethyl acrylamide. DMAPMAA represents dimethylaminopropyl methacrylamide. TetraEtA represents a tetraethylammonium ion and TetraBuA represents a tetrabutylammonium ion.

Synthesis Example II-42

Copolymer (Polymer II-42) Including a Salt of Phosphonic Acid Group

In a reaction container including a gas inlet tube, a thermometer and a reflux condenser, in an argon atmosphere, 193 parts of N-dimethylformamide (DMF) were placed and heated at 75° C. In the container, 223 parts of aqueous solution including 30 parts of the monomer No. II-1 as the monomer having the formula (4) and 193 parts of water, 212 parts of a DMF solution including 27 parts of cyclohexylmethacrylate from Tokyo Chemical Industry Co., Ltd. as the monomer having the formula (5), 3 parts of trimethyl-2-methacryloyloxyethyl ammonium (TMMEAC) from Tokyo Chemical Industry Co., Ltd. as the monomer having the formula (6b) and 182 parts of DMF, and 187.4 parts of a DMF solution including 5.4 parts of 2,2'-azobisisobutylonitrile (AIBN) and 182 parts of DMF were added in 12 batches every 30 min. After these were all added therein, the mixture was further stirred for 4 hrs at 75° C., cooled and the polymerization was completed.

The extract was filtered, washed with hexane, and vacuum-dried at 50° C. to obtain 61 parts of a copolymer (polymer II-41).

One (1) part of the resin (copolymer) was dissolved in 100 parts of ion-exchanged water to prepare a solution, and the solution was subjected to neutralization titration in 0.1 N of KOH methanol solution with thymolphthalein as an indicator to determine an acid value. The acid value was 77 mg KOH/g. This was almost same as 77 mg KOH/g determined from the acid value of the monomer No. II-1 assuming copolymerization had been made in proportion to the place-in quantity.

Based on the acid value, the copolymer was neutralized with sodium hydroxide to prepare an aqueous solution including 10% by weight of the resin. The solution had a viscosity of 1.8 mPa·s at 25° C.

The aqueous solution including 10% by weight of the resin was used for preparing a pigment dispersion. From the titration result of the alendronic acid (monomer material), 3 OH groups out of 4 of the phosphonic acid were proved to be neutralized by sodium ion. The results are shown in Table II-2.

Synthesis Example II-43

Synthesis of Polymer II-43

The procedure for preparation of the polymer II-42 in Synthesis Example II-42 was repeated except for replacing 27 parts of cyclohexylmethacrylate with 24 parts of dodecylmethacrylate (45% by weight) and changing 3 parts of TMMEAC into 6 parts thereof to prepare a polymer II-43.

Synthesis Examples II-44 (Polymer II-44) to II-73 (Polymer II-75)

The procedure for preparation of the polymer II-42 in Synthesis Example II-42 was repeated except for changing the monomers having the formulae (4), (5) and (6b), and the conditions as shown in Table II-2 to prepare polymers II-44 to II-75.

Comparative Synthesis Example II-76 to II-78

The polymer II-40 in Comparative Synthesis Example II-1 was used as a polymer in Comparative Synthesis Example II-76, the polymer II-41 in Comparative Synthesis Example II-2 was used as a polymer in Comparative Synthesis Example II-77, and the low-molecular-weight diphosphonic acid alkali metal salt in Comparative Synthesis Example II-3 was used as a diphosphonic acid alkali metal salt in Comparative Synthesis Example II-78.

TABLE II-2

| | | (1) | | | | | |
|---|---|---|---|---|---|---|---|
| | | Monomers | | | | | |
| | | Monomer (4) | % by weight | Monomer (5) | % by weight | Monomer (6b) | % by weight |
| Syn. Ex. II-42 | Polymer II-42 | Monomer No. II-1 | 50 | Cyclohexyl MA | 45 | TMMEAC | 5 |
| Syn. Ex. II-43 | Polymer II-43 | Monomer No. II-1 | 50 | Dodecyl MA | 40 | TMMEAC | 10 |
| Syn. Ex. II-44 | Polymer II-44 | Monomer No. II-1 | 50 | Hexadecyl MA | 30 | TMMEAC | 20 |
| Syn. Ex. II-45 | Polymer II-45 | Monomer No. II-1 | 50 | Octadecyl MA | 30 | TMMEAC | 10 |
| Syn. Ex. II-46 | Polymer II-46 | Monomer No. II-1 | 50 | Docosyl A | 30 | TMMEAC | 20 |
| Syn. Ex. II-47 | Polymer II-47 | Monomer No. II-1 | 25 | Benzyl A | 55 | TMMEAC | 20 |
| Syn. Ex. II-48 | Polymer II-48 | Monomer No. II-1 | 30 | Benzyl A | 60 | TMMEAC | 10 |
| Syn. Ex. II-49 | Polymer II-49 | Monomer No. II-1 | 40 | Benzyl A | 50 | TMMEAC | 10 |
| Syn. Ex. II-50 | Polymer II-50 | Monomer No. II-1 | 50 | Benzyl A | 40 | TMMEAC | 10 |
| Syn. Ex. II-51 | Polymer II-51 | Monomer No. II-1 | 60 | Benzyl A | 30 | TMMEAC | 10 |

TABLE II-2-continued

| | | | | | | | |
|---|---|---|---|---|---|---|---|
| Syn. Ex. II-52 | Polymer II-52 | Monomer No. II-1 | 70 | Benzyl A | 20 | TMMEAC | 10 |
| Syn. Ex. II-53 | Polymer II-53 | Monomer No. II-1 | 75 | Benzyl A | 15 | TMMEAC | 10 |
| Syn. Ex. II-54 | Polymer II-54 | Monomer No. II-1 | 60 | Benzyl MA | 30 | TMMEAC | 10 |
| Syn. Ex. II-55 | Polymer II-55 | Monomer No. II-1 | 50 | Benzyl MA | 30 | TMMEAC | 10 |
| Syn. Ex. II-56 | Polymer II-56 | Monomer No. II-1 | 40 | Benzyl MA | 50 | TMMEAC | 20 |
| Syn. Ex. II-57 | Polymer II-57 | Monomer No. II-1 | 60 | Dodecyl A | 30 | TMMEAC | 10 |
| Syn. Ex. II-58 | Polymer II-58 | Monomer No. II-1 | 50 | Octadecyl A | 40 | TMMEAC | 10 |
| Syn. Ex. II-59 | Polymer II-59 | Monomer No. II-1 | 50 | Benzyl MA | 40 | TMMEAC | 10 |
| Syn. Ex. II-60 | Polymer II-60 | Monomer No. II-2 | 60 | Benzyl MA | 30 | TMMEAC | 10 |
| Syn. Ex. II-61 | Polymer II-61 | Monomer No. II-2 | 50 | Benzyl MA | 40 | TMMEAC | 10 |
| Syn. Ex. II-62 | Polymer II-62 | Monomer No. II-2 | 50 | Benzyl MA | 40 | TMMEAC | 10 |
| Syn. Ex. II-63 | Polymer II-63 | Monomer No. II-3 | 50 | Benzyl MA | 40 | TMMEAC | 10 |
| Syn. Ex. II-64 | Polymer II-64 | Monomer No. II-3 | 40 | Benzyl MA | 40 | TMMEAC | 20 |
| Syn. Ex. II-65 | Polymer II-65 | Monomer No. II-4 | 50 | Benzyl MA | 40 | TMMEAC | 10 |
| Syn. Ex. II-66 | Polymer II-66 | Monomer No. II-3 | 60 | Octadecyl MA | 30 | TMMEAC | 10 |
| Syn. Ex. II-67 | Polymer II-67 | Monomer No. II-3 | 50 | Benzyl MA | 40 | TMMEAC | 10 |
| Syn. Ex. II-68 | Polymer II-68 | Monomer No. II-1 | 50 | Benzyl A | 47 | TMMEAC | 3 |
| Syn. Ex. II-69 | Polymer II-69 | Monomer No. II-1 | 50 | Benzyl A | 45 | TMMEAC | 5 |
| Syn. Ex. II-70 | Polymer II-70 | Monomer No. II-1 | 40 | Benzyl A | 30 | TMMEAC | 30 |
| Syn. Ex. II-71 | Polymer II-71 | Monomer No. II-1 | 50 | Benzyl A | 40 | TMMEAC | 10 |
| Syn. Ex. II-72 | Polymer II-72 | Monomer No. II-1 | 60 | Benzyl A | 30 | TMMEAC | 10 |
| Syn. Ex. II-73 | Polymer II-73 | Monomer No. II-1 | 50 | Benzyl MA | 40 | TMMEAC | 10 |
| Syn. Ex. II-74 | Polymer II-74 | Monomer No. II-3 | 50 | Benzyl A | 40 | TMMEAC | 10 |
| Syn. Ex. II-75 | Polymer II-75 | Monomer No. II-6 | 50 | Benzyl A | 40 | TMMEAC | 10 |

(2)

| | | Viscosity (mPa · s) | M in formula (1) |
|---|---|---|---|
| Syn. Ex. II-42 | Polymer II-42 | 1.8 | 3Na, H |
| Syn. Ex. II-43 | Polymer II-43 | 1.8 | 3Na, H |
| Syn. Ex. II-44 | Polymer II-44 | 1.9 | 3Na, H |
| Syn. Ex. II-45 | Polymer II-45 | 2.1 | 3Na, H |
| Syn. Ex. II-46 | Polymer II-46 | 2.1 | 3Na, H |
| Syn. Ex. II-47 | Polymer II-47 | 1.8 | 3Na, H |
| Syn. Ex. II-48 | Polymer II-48 | 1.8 | 3Na, H |
| Syn. Ex. II-49 | Polymer II-49 | 2.0 | 3Na, H |
| Syn. Ex. II-50 | Polymer II-50 | 2.0 | 3Na, H |
| Syn. Ex. II-51 | Polymer II-51 | 2.5 | 3Na, H |
| Syn. Ex. II-52 | Polymer II-52 | 2.6 | 3Na, H |
| Syn. Ex. II-53 | Polymer II-53 | 2.6 | 3Na, H |
| Syn. Ex. II-54 | Polymer II-54 | 2.5 | 3Na, H |
| Syn. Ex. II-55 | Polymer II-55 | 2.3 | 3Na, H |
| Syn. Ex. II-56 | Polymer II-56 | 2.1 | 3Na, H |
| Syn. Ex. II-57 | Polymer II-57 | 2.4 | 3Na, H |
| Syn. Ex. II-58 | Polymer II-58 | 2.2 | 3Na, H |
| Syn. Ex. II-59 | Polymer II-59 | 1.9 | 2Na, 2H |
| Syn. Ex. II-60 | Polymer II-60 | 2.2 | 3K, H |
| Syn. Ex. II-61 | Polymer II-61 | 1.9 | 3K, H |
| Syn. Ex. II-62 | Polymer II-62 | 2.1 | 3K, H |
| Syn. Ex. II-63 | Polymer II-63 | 1.9 | 3Na, H |
| Syn. Ex. II-64 | Polymer II-64 | 1.8 | 3Na, H |
| Syn. Ex. II-65 | Polymer II-65 | 2.2 | 3TEtA, H |
| Syn. Ex. II-66 | Polymer II-66 | 2.6 | 3Na, H |
| Syn. Ex. II-67 | Polymer II-67 | 2.2 | 3Na, H |

TABLE II-2-continued

| | | | |
|---|---|---|---|
| Syn. Ex. II-68 | Polymer II-68 | 1.9 | 3Na, H |
| Syn. Ex. II-69 | Polymer II-69 | 1.9 | 3Na, H |
| Syn. Ex. II-70 | Polymer II-70 | 2.3 | 3Na, H |
| Syn. Ex. II-71 | Polymer II-71 | 1.4 | 3Na, H |
| Syn. Ex. II-72 | Polymer II-72 | 1.5 | 3Na, H |
| Syn. Ex. II-73 | Polymer II-73 | 4.0 | 3Na, H |
| Syn. Ex. II-74 | Polymer II-74 | 4.4 | 3Na, H |
| Syn. Ex. II-75 | Polymer II-75 | 1.9 | 3TetraBuA, H |

Pigment Dispersion Preparation Example

Preparation of Pigment Dispersion II-1

The following materials were premixed, subjected to a circulation dispersion by a disc type beads mill (KDL type from Shinmaru Enterprises Corp., using zirconia beads having a diameter of 0.1 mm) at a peripheral speed of 10 m/s for 10 min, and filtered with a membrane filter having an aperture of 1.2 μm to prepare a pigment dispersion II-1.

| | |
|---|---|
| Carbon black (NIPEX160 from Degussa AG) | 20.0 |
| Naphthalene sulfonic acid Na formalin condensate (A-45-PN from TAKEMOTO OIL & FAT Co., Ltd., including a solid content of 10% by weight) | 13.0 |
| Pure water | 67.0 |

Preparation of Pigment Dispersions II-2 to II-46

The procedure for preparation of the pigment dispersion II-1 was repeated except for changing the formulation as shown in Table II-3 to prepare pigment dispersions II-2 to I-46. The pigment dispersion II-1 includes naphthalene sulfonic acid Na formalin condensate, but the pigment dispersions II-2 to I-46 do not.

TABLE II-3

(1)

| | Solid Content (%) | Pigment Dispersion | | | | |
|---|---|---|---|---|---|---|
| | | II-1 | II-2 | II-3 | II-4 | II-5 |
| Naphthalene sulfonic acid Na formalin condensate | 10 | 13 | | | | |
| Polymer II-1 | 10 | | 50 | | | |
| Polymer II-2 | 10 | | | 50 | | |
| Polymer II-3 | 10 | | | | 50 | |
| Polymer II-4 | 10 | | | | | 50 |
| Polymer II-5 | 10 | | | | | |
| Polymer II-6 | 10 | | | | | |
| Polymer II-7 | 10 | | | | | |
| Polymer II-8 | 10 | | | | | |
| Polymer II-9 | 10 | | | | | |
| Polymer II-10 | 10 | | | | | |
| Polymer II-11 | 10 | | | | | |
| Polymer II-12 | 10 | | | | | |
| Polymer II-13 | 10 | | | | | |
| Polymer II-14 | 10 | | | | | |
| Polymer II-15 | 10 | | | | | |
| Polymer II-16 | 10 | | | | | |
| Polymer II-17 | 10 | | | | | |
| Polymer II-18 | 10 | | | | | |
| Polymer II-19 | 10 | | | | | |
| Polymer II-20 | 10 | | | | | |
| Polymer II-21 | 10 | | | | | |
| Polymer II-22 | 10 | | | | | |
| Polymer II-23 | 10 | | | | | |
| Polymer II-24 | 10 | | | | | |
| Polymer II-25 | 10 | | | | | |
| Polymer II-26 | 10 | | | | | |
| Polymer II-27 | 10 | | | | | |
| Polymer II-28 | 10 | | | | | |
| Polymer II-29 | 10 | | | | | |
| Polymer II-30 | 10 | | | | | |
| Polymer II-31 | 10 | | | | | |
| Polymer II-32 | 10 | | | | | |
| Polymer II-33 | 10 | | | | | |
| Polymer II-34 | 10 | | | | | |
| Polymer II-35 | 10 | | | | | |
| Polymer II-36 | 10 | | | | | |
| Polymer II-37 | 10 | | | | | |
| Polymer II-38 | 10 | | | | | |
| Polymer II-39 | 10 | | | | | |
| Polymer II-40 | 10 | | | | | |
| Polymer II-41 | 10 | | | | | |
| 1-hydroxyethylidene-1,1-bisphosphonic acid | | | | | | |
| Carbon black (*1) | | — | 20 | 20 | 20 | 20 | 20 |
| Pigment Blue 15:3 (*2) | | | | | | |
| Pigment Red 122 (*3) | | — | | | | |
| Pigment Yellow 74 (*4) | | | | | | |
| Pure water | | — | 67 | 30 | 30 | 30 | 30 |
| Total | | — | 100 | 100 | 100 | 100 | 100 |

(2)

| | Solid Content (%) | Pigment Dispersion | | | | |
|---|---|---|---|---|---|---|
| | | II-6 | II-7 | II-8 | II-9 | II-10 |
| Naphthalene sulfonic acid Na formalin condensate | 10 | | | | | |
| Polymer II-1 | 10 | | | | | |
| Polymer II-2 | 10 | | | | | |
| Polymer II-3 | 10 | | | | | |
| Polymer II-4 | 10 | | | | | |
| Polymer II-5 | 10 | 50 | | | | |
| Polymer II-6 | 10 | | 50 | | | |
| Polymer II-7 | 10 | | | 50 | | |
| Polymer II-8 | 10 | | | | 50 | |
| Polymer II-9 | 10 | | | | | 50 |
| Polymer II-10 | 10 | | | | | |
| Polymer II-11 | 10 | | | | | |
| Polymer II-12 | 10 | | | | | |
| Polymer II-13 | 10 | | | | | |
| Polymer II-14 | 10 | | | | | |
| Polymer II-15 | 10 | | | | | |
| Polymer II-16 | 10 | | | | | |
| Polymer II-17 | 10 | | | | | |
| Polymer II-18 | 10 | | | | | |
| Polymer II-19 | 10 | | | | | |
| Polymer II-20 | 10 | | | | | |
| Polymer II-21 | 10 | | | | | |
| Polymer II-22 | 10 | | | | | |
| Polymer II-23 | 10 | | | | | |
| Polymer II-24 | 10 | | | | | |
| Polymer II-25 | 10 | | | | | |

TABLE II-3-continued

| | Solid Content (%) | Pigment Dispersion | | | | |
|---|---|---|---|---|---|---|
| Polymer II-26 | 10 | | | | | |
| Polymer II-27 | 10 | | | | | |
| Polymer II-28 | 10 | | | | | |
| Polymer II-29 | 10 | | | | | |
| Polymer II-30 | 10 | | | | | |
| Polymer II-31 | 10 | | | | | |
| Polymer II-32 | 10 | | | | | |
| Polymer II-33 | 10 | | | | | |
| Polymer II-34 | 10 | | | | | |
| Polymer II-35 | 10 | | | | | |
| Polymer II-36 | 10 | | | | | |
| Polymer II-37 | 10 | | | | | |
| Polymer II-38 | 10 | | | | | |
| Polymer II-39 | 10 | | | | | |
| Polymer II-40 | 10 | | | | | |
| Polymer II-41 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | — | | | | | |
| Pigment Red 122 (*3) | — | | | | | |
| Pigment Yellow 74 (*4) | — | | | | | |
| Pure water | — | 67 | 30 | 30 | 30 | 30 |
| Total | — | 100 | 100 | 100 | 100 | 100 |

(3)

| | Solid Content (%) | Pigment Dispersion | | | | |
|---|---|---|---|---|---|---|
| | | II-11 | II-12 | II-13 | II-14 | II-15 |
| Naphthalene sulfonic acid Na formalin condensate | 10 | | | | | |
| Polymer II-1 | 10 | | | | | |
| Polymer II-2 | 10 | | | | | |
| Polymer II-3 | 10 | | | | | |
| Polymer II-4 | 10 | | | | | |
| Polymer II-5 | 10 | | | | | |
| Polymer II-6 | 10 | | | | | |
| Polymer II-7 | 10 | | | | | |
| Polymer II-8 | 10 | | | | | |
| Polymer II-9 | 10 | 50 | 50 | 50 | | |
| Polymer II-10 | 10 | | | | 50 | |
| Polymer II-11 | 10 | | | | | 50 |
| Polymer II-12 | 10 | | | | | |
| Polymer II-13 | 10 | | | | | |
| Polymer II-14 | 10 | | | | | |
| Polymer II-15 | 10 | | | | | |
| Polymer II-16 | 10 | | | | | |
| Polymer II-17 | 10 | | | | | |
| Polymer II-18 | 10 | | | | | |
| Polymer II-19 | 10 | | | | | |
| Polymer II-20 | 10 | | | | | |
| Polymer II-21 | 10 | | | | | |
| Polymer II-22 | 10 | | | | | |
| Polymer II-23 | 10 | | | | | |
| Polymer II-24 | 10 | | | | | |
| Polymer II-25 | 10 | | | | | |
| Polymer II-26 | 10 | | | | | |
| Polymer II-27 | 10 | | | | | |
| Polymer II-28 | 10 | | | | | |
| Polymer II-29 | 10 | | | | | |
| Polymer II-30 | 10 | | | | | |
| Polymer II-31 | 10 | | | | | |
| Polymer II-32 | 10 | | | | | |
| Polymer II-33 | 10 | | | | | |
| Polymer II-34 | 10 | | | | | |
| Polymer II-35 | 10 | | | | | |
| Polymer II-36 | 10 | | | | | |
| Polymer II-37 | 10 | | | | | |
| Polymer II-38 | 10 | | | | | |
| Polymer II-39 | 10 | | | | | |
| Polymer II-40 | 10 | | | | | |
| Polymer II-41 | 10 | | | | | |
| 1-hydroxyethylidene-1,1-bisphosphonic acid | 10 | | | | | |
| Carbon black (*1) | — | | 20 | 20 | 20 | 20 |
| Pigment Blue 15:3 (*2) | — | 20 | | | | |
| Pigment Red 122 (*3) | — | | 20 | | | |
| Pigment Yellow 74 (*4) | — | | | 20 | | |
| Pure water | — | 67 | 30 | 30 | 30 | 30 |
| Total | — | 100 | 100 | 100 | 100 | 100 |

(4)

| | Solid Content (%) | Pigment Dispersion | | | | |
|---|---|---|---|---|---|---|
| | | II-16 | II-17 | II-18 | II-19 | II-20 |
| Naphthalene sulfonic acid Na formalin condensate | 10 | | | | | |
| Polymer II-1 | 10 | | | | | |
| Polymer II-2 | 10 | | | | | |
| Polymer II-3 | 10 | | | | | |
| Polymer II-4 | 10 | | | | | |
| Polymer II-5 | 10 | | | | | |
| Polymer II-6 | 10 | | | | | |
| Polymer II-7 | 10 | | | | | |
| Polymer II-8 | 10 | | | | | |
| Polymer II-9 | 10 | | | | | |
| Polymer II-10 | 10 | | | | | |
| Polymer II-11 | 10 | | | | | |
| Polymer II-12 | 10 | 50 | | | | |
| Polymer II-13 | 10 | | 50 | | | |
| Polymer II-14 | 10 | | | 50 | | |
| Polymer II-15 | 10 | | | | 50 | |
| Polymer II-16 | 10 | | | | | 50 |
| Polymer II-17 | 10 | | | | | |
| Polymer II-18 | 10 | | | | | |
| Polymer II-19 | 10 | | | | | |
| Polymer II-20 | 10 | | | | | |
| Polymer II-21 | 10 | | | | | |
| Polymer II-22 | 10 | | | | | |
| Polymer II-23 | 10 | | | | | |
| Polymer II-24 | 10 | | | | | |
| Polymer II-25 | 10 | | | | | |
| Polymer II-26 | 10 | | | | | |
| Polymer II-27 | 10 | | | | | |
| Polymer II-28 | 10 | | | | | |
| Polymer II-29 | 10 | | | | | |
| Polymer II-30 | 10 | | | | | |
| Polymer II-31 | 10 | | | | | |
| Polymer II-32 | 10 | | | | | |
| Polymer II-33 | 10 | | | | | |
| Polymer II-34 | 10 | | | | | |
| Polymer II-35 | 10 | | | | | |
| Polymer II-36 | 10 | | | | | |
| Polymer II-37 | 10 | | | | | |
| Polymer II-38 | 10 | | | | | |
| Polymer II-39 | 10 | | | | | |
| Polymer II-40 | 10 | | | | | |
| Polymer II-41 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | — | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

TABLE II-3-continued (5)

| | Solid Content (%) | Pigment Dispersion | | | | |
|---|---|---|---|---|---|---|
| | | II-21 | II-22 | II-23 | II-24 | II-25 |
| Naphthalene sulfonic acid Na formalin condensate | 10 | | | | | |
| Polymer II-1 | 10 | | | | | |
| Polymer II-2 | 10 | | | | | |
| Polymer II-3 | 10 | | | | | |
| Polymer II-4 | 10 | | | | | |
| Polymer II-5 | 10 | | | | | |
| Polymer II-6 | 10 | | | | | |
| Polymer II-7 | 10 | | | | | |
| Polymer II-8 | 10 | | | | | |
| Polymer II-9 | 10 | | | | | |
| Polymer II-10 | 10 | | | | | |
| Polymer II-11 | 10 | | | | | |
| Polymer II-12 | 10 | | | | | |
| Polymer II-13 | 10 | | | | | |
| Polymer II-14 | 10 | | | | | |
| Polymer II-15 | 10 | | | | | |
| Polymer II-16 | 10 | | | | | |
| Polymer II-17 | 10 | 50 | | | | |
| Polymer II-18 | 10 | | 50 | | | |
| Polymer II-19 | 10 | | | 50 | | |
| Polymer II-20 | 10 | | | | 50 | |
| Polymer II-21 | 10 | | | | | 50 |
| Polymer II-22 | 10 | | | | | |
| Polymer II-23 | 10 | | | | | |
| Polymer II-24 | 10 | | | | | |
| Polymer II-25 | 10 | | | | | |
| Polymer II-26 | 10 | | | | | |
| Polymer II-27 | 10 | | | | | |
| Polymer II-28 | 10 | | | | | |
| Polymer II-29 | 10 | | | | | |
| Polymer II-30 | 10 | | | | | |
| Polymer II-31 | 10 | | | | | |
| Polymer II-32 | 10 | | | | | |
| Polymer II-33 | 10 | | | | | |
| Polymer II-34 | 10 | | | | | |
| Polymer II-35 | 10 | | | | | |
| Polymer II-36 | 10 | | | | | |
| Polymer II-37 | 10 | | | | | |
| Polymer II-38 | 10 | | | | | |
| Polymer II-39 | 10 | | | | | |
| Polymer II-40 | 10 | | | | | |
| Polymer II-41 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | | | | | | |
| Pure water | — | 30 | 30 | 30 | 30 | 30 |
| Total | — | 100 | 100 | 100 | 100 | 100 |

(6)

| | Solid Content (%) | Pigment Dispersion | | | | |
|---|---|---|---|---|---|---|
| | | II-26 | II-27 | II-28 | II-29 | II-30 |
| Naphthalene sulfonic acid Na formalin condensate | 10 | | | | | |
| Polymer II-1 | 10 | | | | | |
| Polymer II-2 | 10 | | | | | |
| Polymer II-3 | 10 | | | | | |
| Polymer II-4 | 10 | | | | | |
| Polymer II-5 | 10 | | | | | |
| Polymer II-6 | 10 | | | | | |
| Polymer II-7 | 10 | | | | | |
| Polymer II-8 | 10 | | | | | |
| Polymer II-9 | 10 | | | | | |
| Polymer II-10 | 10 | | | | | |
| Polymer II-11 | 10 | | | | | |
| Polymer II-12 | 10 | | | | | |
| Polymer II-13 | 10 | | | | | |
| Polymer II-14 | 10 | | | | | |
| Polymer II-15 | 10 | | | | | |
| Polymer II-16 | 10 | | | | | |
| Polymer II-17 | 10 | | | | | |
| Polymer II-18 | 10 | | | | | |
| Polymer II-19 | 10 | | | | | |
| Polymer II-20 | 10 | | | | | |
| Polymer II-21 | 10 | | | | | |
| Polymer II-22 | 10 | 50 | | | | |
| Polymer II-23 | 10 | | 50 | | | |
| Polymer II-24 | 10 | | | 50 | | |
| Polymer II-25 | 10 | | | | 50 | |
| Polymer II-26 | 10 | | | | | 50 |
| Polymer II-27 | 10 | | | | | |
| Polymer II-28 | 10 | | | | | |
| Polymer II-29 | 10 | | | | | |
| Polymer II-30 | 10 | | | | | |
| Polymer II-31 | 10 | | | | | |
| Polymer II-32 | 10 | | | | | |
| Polymer II-33 | 10 | | | | | |
| Polymer II-34 | 10 | | | | | |
| Polymer II-35 | 10 | | | | | |
| Polymer II-36 | 10 | | | | | |
| Polymer II-37 | 10 | | | | | |
| Polymer II-38 | 10 | | | | | |
| Polymer II-39 | 10 | | | | | |
| Polymer II-40 | 10 | | | | | |
| Polymer II-41 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | | | | | | |
| Pure water | — | 30 | 30 | 30 | 30 | 30 |
| Total | — | 100 | 100 | 100 | 100 | 100 |

(7)

| | Solid Content (%) | Pigment Dispersion | | | | |
|---|---|---|---|---|---|---|
| | | II-31 | II-32 | II-33 | II-34 | II-35 |
| Naphthalene sulfonic acid Na formalin condensate | 10 | | | | | |
| Polymer II-1 | 10 | | | | | |
| Polymer II-2 | 10 | | | | | |
| Polymer II-3 | 10 | | | | | |
| Polymer II-4 | 10 | | | | | |
| Polymer II-5 | 10 | | | | | |
| Polymer II-6 | 10 | | | | | |
| Polymer II-7 | 10 | | | | | |
| Polymer II-8 | 10 | | | | | |
| Polymer II-9 | 10 | | | | | |
| Polymer II-10 | 10 | | | | | |
| Polymer II-11 | 10 | | | | | |
| Polymer II-12 | 10 | | | | | |
| Polymer II-13 | 10 | | | | | |
| Polymer II-14 | 10 | | | | | |
| Polymer II-15 | 10 | | | | | |
| Polymer II-16 | 10 | | | | | |
| Polymer II-17 | 10 | | | | | |
| Polymer II-18 | 10 | | | | | |
| Polymer II-19 | 10 | | | | | |
| Polymer II-20 | 10 | | | | | |
| Polymer II-21 | 10 | | | | | |
| Polymer II-22 | 10 | | | | | |
| Polymer II-23 | 10 | | | | | |
| Polymer II-24 | 10 | | | | | |
| Polymer II-25 | 10 | | | | | |

TABLE II-3-continued

| | Solid Content (%) | Pigment Dispersion | | | | |
|---|---|---|---|---|---|---|
| | | II-31 | II-32 | II-33 | II-34 | II-35 |
| Polymer II-26 | 10 | | | | | |
| Polymer II-27 | 10 | 50 | | | | |
| Polymer II-28 | 10 | | 50 | | | |
| Polymer II-29 | 10 | | | 50 | | |
| Polymer II-30 | 10 | | | | 50 | |
| Polymer II-31 | 10 | | | | | 50 |
| Polymer II-32 | 10 | | | | | |
| Polymer II-33 | 10 | | | | | |
| Polymer II-34 | 10 | | | | | |
| Polymer II-35 | 10 | | | | | |
| Polymer II-36 | 10 | | | | | |
| Polymer II-37 | 10 | | | | | |
| Polymer II-38 | 10 | | | | | |
| Polymer II-39 | 10 | | | | | |
| Polymer II-40 | 10 | | | | | |
| Polymer II-41 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

(8)

| | Solid Content (%) | Pigment Dispersion | | | | |
|---|---|---|---|---|---|---|
| | | II-36 | II-37 | II-38 | II-39 | II-40 |
| Naphthalene sulfonic acid Na formalin condensate | 10 | | | | | |
| Polymer II-1 | 10 | | | | | |
| Polymer II-2 | 10 | | | | | |
| Polymer II-3 | 10 | | | | | |
| Polymer II-4 | 10 | | | | | |
| Polymer II-5 | 10 | | | | | |
| Polymer II-6 | 10 | | | | | |
| Polymer II-7 | 10 | | | | | |
| Polymer II-8 | 10 | | | | | |
| Polymer II-9 | 10 | | | | | |
| Polymer II-10 | 10 | | | | | |
| Polymer II-11 | 10 | | | | | |
| Polymer II-12 | 10 | | | | | |
| Polymer II-13 | 10 | | | | | |
| Polymer II-14 | 10 | | | | | |
| Polymer II-15 | 10 | | | | | |
| Polymer II-16 | 10 | | | | | |
| Polymer II-17 | 10 | | | | | |
| Polymer II-18 | 10 | | | | | |
| Polymer II-19 | 10 | | | | | |
| Polymer II-20 | 10 | | | | | |
| Polymer II-21 | 10 | | | | | |
| Polymer II-22 | 10 | | | | | |
| Polymer II-23 | 10 | | | | | |
| Polymer II-24 | 10 | | | | | |
| Polymer II-25 | 10 | | | | | |
| Polymer II-26 | 10 | | | | | |
| Polymer II-27 | 10 | | | | | |
| Polymer II-28 | 10 | | | | | |
| Polymer II-29 | 10 | | | | | |
| Polymer II-30 | 10 | | | | | |
| Polymer II-31 | 10 | | | | | |
| Polymer II-32 | 10 | 50 | | | | |
| Polymer II-33 | 10 | | 50 | | | |
| Polymer II-34 | 10 | | | 50 | | |
| Polymer II-35 | 10 | | | | 50 | |
| Polymer II-36 | 10 | | | | | 50 |
| Polymer II-37 | 10 | | | | | |
| Polymer II-38 | 10 | | | | | |
| Polymer II-39 | 10 | | | | | |
| Polymer II-40 | 10 | | | | | |
| Polymer II-41 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

(9)

| | Solid Content (%) | Pigment Dispersion | | | | |
|---|---|---|---|---|---|---|
| | | II-41 | II-42 | II-43 | II-44 | II-45 |
| Naphthalene sulfonic acid Na formalin condensate | 10 | | | | | |
| Polymer II-1 | 10 | | | | | |
| Polymer II-2 | 10 | | | | | |
| Polymer II-3 | 10 | | | | | |
| Polymer II-4 | 10 | | | | | |
| Polymer II-5 | 10 | | | | | |
| Polymer II-6 | 10 | | | | | |
| Polymer II-7 | 10 | | | | | |
| Polymer II-8 | 10 | | | | | |
| Polymer II-9 | 10 | | | | | |
| Polymer II-10 | 10 | | | | | |
| Polymer II-11 | 10 | | | | | |
| Polymer II-12 | 10 | | | | | |
| Polymer II-13 | 10 | | | | | |
| Polymer II-14 | 10 | | | | | |
| Polymer II-15 | 10 | | | | | |
| Polymer II-16 | 10 | | | | | |
| Polymer II-17 | 10 | | | | | |
| Polymer II-18 | 10 | | | | | |
| Polymer II-19 | 10 | | | | | |
| Polymer II-20 | 10 | | | | | |
| Polymer II-21 | 10 | | | | | |
| Polymer II-22 | 10 | | | | | |
| Polymer II-23 | 10 | | | | | |
| Polymer II-24 | 10 | | | | | |
| Polymer II-25 | 10 | | | | | |
| Polymer II-26 | 10 | | | | | |
| Polymer II-27 | 10 | | | | | |
| Polymer II-28 | 10 | | | | | |
| Polymer II-29 | 10 | | | | | |
| Polymer II-30 | 10 | | | | | |
| Polymer II-31 | 10 | | | | | |
| Polymer II-32 | 10 | | | | | |
| Polymer II-33 | 10 | | | | | |
| Polymer II-34 | 10 | | | | | |
| Polymer II-35 | 10 | | | | | |
| Polymer II-36 | 10 | | | | | |
| Polymer II-37 | 10 | 50 | | | | |
| Polymer II-38 | 10 | | 50 | | | |
| Polymer II-39 | 10 | | | 50 | | |
| Polymer II-40 | 10 | | | | 50 | |
| Polymer II-41 | 10 | | | | | 50 |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

(10)

| | Solid Content (%) | Pigment Dispersion II-46 |
|---|---|---|
| Naphthalene sulfonic acid Na formalin condensate | 10 | |

TABLE II-3-continued

| | | |
|---|---|---|
| Polymer II-1 | 10 | |
| Polymer II-2 | 10 | |
| Polymer II-3 | 10 | |
| Polymer II-4 | 10 | |
| Polymer II-5 | 10 | |
| Polymer II-6 | 10 | |
| Polymer II-7 | 10 | |
| Polymer II-8 | 10 | |
| Polymer II-9 | 10 | |
| Polymer II-10 | 10 | |
| Polymer II-11 | 10 | |
| Polymer II-12 | 10 | |
| Polymer II-13 | 10 | |
| Polymer II-14 | 10 | |
| Polymer II-15 | 10 | |
| Polymer II-16 | 10 | |
| Polymer II-17 | 10 | |
| Polymer II-18 | 10 | |
| Polymer II-19 | 10 | |
| Polymer II-20 | 10 | |
| Polymer II-21 | 10 | |
| Polymer II-22 | 10 | |
| Polymer II-23 | 10 | |
| Polymer II-24 | 10 | |
| Polymer II-25 | 10 | |
| Polymer II-26 | 10 | |
| Polymer II-27 | 10 | |
| Polymer II-28 | 10 | |
| Polymer II-29 | 10 | |
| Polymer II-30 | 10 | |
| Polymer II-31 | 10 | |
| Polymer II-32 | 10 | |
| Polymer II-33 | 10 | |
| Polymer II-34 | 10 | |
| Polymer II-35 | 10 | |
| Polymer II-36 | 10 | |
| Polymer II-37 | 10 | |
| Polymer II-38 | 10 | |
| Polymer II-39 | 10 | |
| Polymer II-40 | 10 | |
| Polymer II-41 | 10 | |
| 1-hydroxyethylidene-1,1-bisphosphonic acid | 10 | 50 |
| Carbon black (*1) | — | 20 |
| Pigment Blue 15:3 (*2) | — | |
| Pigment Red 122 (*3) | — | |
| Pigment Yellow 74 (*4) | — | |
| Pure water | — | 30 |
| Total | — | 100 |

Preparation of Pigment Dispersion II-47

The following materials were premixed, subjected to a circulation dispersion by a disc type beads mill (KDL type from Shinmaru Enterprises Corp., using zirconia beads having a diameter of 0.1 mm) at a peripheral speed of 10 m/s for 10 min, and filtered with a membrane filter having an aperture of 1.2 μm to prepare a pigment dispersion II-47.

| | |
|---|---|
| Carbon black (NIPEX160 from Degussa AG) | 20.0 |
| Naphthalene sulfonic acid Na formalin condensate (A-45-PN from TAKEMOTO OIL & FAT Co., Ltd., including a solid content of 10% by weight) | 13.0 |
| Pure water | 67.0 |

Preparation of Pigment Dispersions II-48 to II-87

The procedure for preparation of the pigment dispersion II-47 was repeated except for changing the formulation as shown in Table II-4 to prepare pigment dispersions II-48 to II-87. The pigment dispersion II-47 includes naphthalene sulfonic acid Na formalin condensate, but the pigment dispersions II-48 to I-87 do not.

TABLE II-4

| | Solid Content (%) | Pigment Dispersion | | | | |
|---|---|---|---|---|---|---|
| | | II-47 | II-48 | II-49 | II-50 | II-51 |
| Naphthalene sulfonic acid Na formalin condensate | 10 | 13 | | | | |
| Polymer II-42 | 10 | | 50 | | | |
| Polymer II-43 | 10 | | | 50 | | |
| Polymer II-44 | 10 | | | | 50 | |
| Polymer II-45 | 10 | | | | | 50 |
| Polymer II-46 | 10 | | | | | |
| Polymer II-47 | 10 | | | | | |
| Polymer II-48 | 10 | | | | | |
| Polymer II-49 | 10 | | | | | |
| Polymer II-50 | 10 | | | | | |
| Polymer II-51 | 10 | | | | | |
| Polymer II-52 | 10 | | | | | |
| Polymer II-53 | 10 | | | | | |
| Polymer II-54 | 10 | | | | | |
| Polymer II-55 | 10 | | | | | |
| Polymer II-56 | 10 | | | | | |
| Polymer II-57 | 10 | | | | | |
| Polymer II-58 | 10 | | | | | |
| Polymer II-59 | 10 | | | | | |
| Polymer II-60 | 10 | | | | | |
| Polymer II-61 | 10 | | | | | |
| Polymer II-62 | 10 | | | | | |
| Polymer II-63 | 10 | | | | | |
| Polymer II-64 | 10 | | | | | |
| Polymer II-65 | 10 | | | | | |
| Polymer II-66 | 10 | | | | | |
| Polymer II-67 | 10 | | | | | |
| Polymer II-68 | 10 | | | | | |
| Polymer II-69 | 10 | | | | | |
| Polymer II-70 | 10 | | | | | |
| Polymer II-71 | 10 | | | | | |
| Polymer II-72 | 10 | | | | | |
| Polymer II-73 | 10 | | | | | |
| Polymer II-74 | 10 | | | | | |
| Polymer II-75 | 10 | | | | | |
| Polymer II-76 | 10 | | | | | |
| Polymer II-77 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | | — | | | | |
| Pigment Yellow 74 (*4) | | | | | | |
| Pure water | — | 67 | 30 | 30 | 30 | 30 |
| Total | — | 100 | 100 | 100 | 100 | 100 |

| | Solid Content (%) | Pigment Dispersion | | | | |
|---|---|---|---|---|---|---|
| | | II-52 | II-53 | II-54 | II-55 | II-56 |
| Naphthalene sulfonic acid Na formalin condensate | 10 | | | | | |
| Polymer II-42 | 10 | | | | | |
| Polymer II-43 | 10 | | | | | |
| Polymer II-44 | 10 | | | | | |
| Polymer II-45 | 10 | | | | | |
| Polymer II-46 | 10 | 50 | | | | |
| Polymer II-47 | 10 | | 50 | | | |
| Polymer II-48 | 10 | | | 50 | | |
| Polymer II-49 | 10 | | | | 50 | |
| Polymer II-50 | 10 | | | | | 50 |
| Polymer II-51 | 10 | | | | | |
| Polymer II-52 | 10 | | | | | |
| Polymer II-53 | 10 | | | | | |
| Polymer II-54 | 10 | | | | | |
| Polymer II-55 | 10 | | | | | |
| Polymer II-56 | 10 | | | | | |

TABLE II-4-continued

| | Solid Content (%) | Pigment Dispersion | | | | |
|---|---|---|---|---|---|---|
| | | II-57 | II-58 | II-59 | II-60 | II-61 |
| Naphthalene sulfonic acid Na formalin condensate | 10 | | | | | |
| Polymer II-42 | 10 | | | | | |
| Polymer II-43 | 10 | | | | | |
| Polymer II-44 | 10 | | | | | |
| Polymer II-45 | 10 | | | | | |
| Polymer II-46 | 10 | | | | | |
| Polymer II-47 | 10 | | | | | |
| Polymer II-48 | 10 | | | | | |
| Polymer II-49 | 10 | | | | | |
| Polymer II-50 | 10 | 50 | 50 | 50 | | |
| Polymer II-51 | 10 | | | | 50 | |
| Polymer II-52 | 10 | | | | | 50 |
| Polymer II-53 | 10 | | | | | |
| Polymer II-54 | 10 | | | | | |
| Polymer II-55 | 10 | | | | | |
| Polymer II-56 | 10 | | | | | |
| Polymer II-57 | 10 | | | | | |
| Polymer II-58 | 10 | | | | | |
| Polymer II-59 | 10 | | | | | |
| Polymer II-60 | 10 | | | | | |
| Polymer II-61 | 10 | | | | | |
| Polymer II-62 | 10 | | | | | |
| Polymer II-63 | 10 | | | | | |
| Polymer II-64 | 10 | | | | | |
| Polymer II-65 | 10 | | | | | |
| Polymer II-66 | 10 | | | | | |
| Polymer II-67 | 10 | | | | | |
| Polymer II-68 | 10 | | | | | |
| Polymer II-69 | 10 | | | | | |
| Polymer II-70 | 10 | | | | | |
| Polymer II-71 | 10 | | | | | |
| Polymer II-72 | 10 | | | | | |
| Polymer II-73 | 10 | | | | | |
| Polymer II-74 | 10 | | | | | |
| Polymer II-75 | 10 | | | | | |
| Polymer II-76 | 10 | | | | | |
| Polymer II-77 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

| | Solid Content (%) | Pigment Dispersion | | | | |
|---|---|---|---|---|---|---|
| | | II-62 | II-63 | II-64 | II-65 | II-66 |
| Naphthalene sulfonic acid Na formalin condensate | 10 | | | | | |
| Polymer II-42 | 10 | | | | | |
| Polymer II-43 | 10 | | | | | |
| Polymer II-44 | 10 | | | | | |
| Polymer II-45 | 10 | | | | | |
| Polymer II-46 | 10 | | | | | |
| Polymer II-47 | 10 | | | | | |
| Polymer II-48 | 10 | | | | | |
| Polymer II-49 | 10 | | | | | |
| Polymer II-50 | 10 | | | | | |
| Polymer II-51 | 10 | | | | | |
| Polymer II-52 | 10 | | | | | |
| Polymer II-53 | 10 | 50 | | | | |
| Polymer II-54 | 10 | | 50 | | | |
| Polymer II-55 | 10 | | | 50 | | |
| Polymer II-56 | 10 | | | | 50 | |
| Polymer II-57 | 10 | | | | | 50 |
| Polymer II-58 | 10 | | | | | |
| Polymer II-59 | 10 | | | | | |
| Polymer II-60 | 10 | | | | | |
| Polymer II-61 | 10 | | | | | |
| Polymer II-62 | 10 | | | | | |
| Polymer II-63 | 10 | | | | | |
| Polymer II-64 | 10 | | | | | |
| Polymer II-65 | 10 | | | | | |
| Polymer II-66 | 10 | | | | | |
| Polymer II-67 | 10 | | | | | |
| Polymer II-68 | 10 | | | | | |
| Polymer II-69 | 10 | | | | | |
| Polymer II-70 | 10 | | | | | |
| Polymer II-71 | 10 | | | | | |
| Polymer II-72 | 10 | | | | | |
| Polymer II-73 | 10 | | | | | |
| Polymer II-74 | 10 | | | | | |
| Polymer II-75 | 10 | | | | | |
| Polymer II-76 | 10 | | | | | |
| Polymer II-77 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

| | Solid Content (%) | Pigment Dispersion | | | | |
|---|---|---|---|---|---|---|
| | | II-67 | II-68 | II-69 | II-70 | II-71 |
| Naphthalene sulfonic acid Na formalin condensate | 10 | | | | | |
| Polymer II-42 | 10 | | | | | |
| Polymer II-43 | 10 | | | | | |
| Polymer II-44 | 10 | | | | | |
| Polymer II-45 | 10 | | | | | |
| Polymer II-46 | 10 | | | | | |
| Polymer II-47 | 10 | | | | | |
| Polymer II-48 | 10 | | | | | |
| Polymer II-49 | 10 | | | | | |
| Polymer II-50 | 10 | | | | | |
| Polymer II-51 | 10 | | | | | |
| Polymer II-52 | 10 | | | | | |
| Polymer II-53 | 10 | | | | | |
| Polymer II-54 | 10 | | | | | |
| Polymer II-55 | 10 | | | | | |

TABLE II-4-continued

| | Solid Content (%) | Pigment Dispersion II-67 | II-68 | II-69 | II-70 | II-71 |
|---|---|---|---|---|---|---|
| Polymer II-56 | 10 | | | | | |
| Polymer II-57 | 10 | | | | | |
| Polymer II-58 | 10 | 50 | | | | |
| Polymer II-59 | 10 | | 50 | | | |
| Polymer II-60 | 10 | | | 50 | | |
| Polymer II-61 | 10 | | | | 50 | |
| Polymer II-62 | 10 | | | | | 50 |
| Polymer II-63 | 10 | | | | | |
| Polymer II-64 | 10 | | | | | |
| Polymer II-65 | 10 | | | | | |
| Polymer II-66 | 10 | | | | | |
| Polymer II-67 | 10 | | | | | |
| Polymer II-68 | 10 | | | | | |
| Polymer II-69 | 10 | | | | | |
| Polymer II-70 | 10 | | | | | |
| Polymer II-71 | 10 | | | | | |
| Polymer II-72 | 10 | | | | | |
| Polymer II-73 | 10 | | | | | |
| Polymer II-74 | 10 | | | | | |
| Polymer II-75 | 10 | | | | | |
| Polymer II-76 | 10 | | | | | |
| Polymer II-77 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | — | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

| | Solid Content (%) | Pigment Dispersion II-72 | II-73 | II-74 | II-75 | II-76 |
|---|---|---|---|---|---|---|
| Naphthalene sulfonic acid Na formalin condensate | 10 | | | | | |
| Polymer II-42 | 10 | | | | | |
| Polymer II-43 | 10 | | | | | |
| Polymer II-44 | 10 | | | | | |
| Polymer II-45 | 10 | | | | | |
| Polymer II-46 | 10 | | | | | |
| Polymer II-47 | 10 | | | | | |
| Polymer II-48 | 10 | | | | | |
| Polymer II-49 | 10 | | | | | |
| Polymer II-50 | 10 | | | | | |
| Polymer II-51 | 10 | | | | | |
| Polymer II-52 | 10 | | | | | |
| Polymer II-53 | 10 | | | | | |
| Polymer II-54 | 10 | | | | | |
| Polymer II-55 | 10 | | | | | |
| Polymer II-56 | 10 | | | | | |
| Polymer II-57 | 10 | | | | | |
| Polymer II-58 | 10 | | | | | |
| Polymer II-59 | 10 | | | | | |
| Polymer II-60 | 10 | | | | | |
| Polymer II-61 | 10 | | | | | |
| Polymer II-62 | 10 | | | | | |
| Polymer II-63 | 10 | 50 | | | | |
| Polymer II-64 | 10 | | 50 | | | |
| Polymer II-65 | 10 | | | 50 | | |
| Polymer II-66 | 10 | | | | 50 | |
| Polymer II-67 | 10 | | | | | 50 |
| Polymer II-68 | 10 | | | | | |
| Polymer II-69 | 10 | | | | | |
| Polymer II-70 | 10 | | | | | |
| Polymer II-71 | 10 | | | | | |
| Polymer II-72 | 10 | | | | | |
| Polymer II-73 | 10 | | | | | |
| Polymer II-74 | 10 | | | | | |
| Polymer II-75 | 10 | | | | | |
| Polymer II-76 | 10 | | | | | |
| Polymer II-77 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | — | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

| | Solid Content (%) | Pigment Dispersion II-77 | II-78 | II-79 | II-80 | II-81 |
|---|---|---|---|---|---|---|
| Naphthalene sulfonic acid Na formalin condensate | 10 | | | | | |
| Polymer II-42 | 10 | | | | | |
| Polymer II-43 | 10 | | | | | |
| Polymer II-44 | 10 | | | | | |
| Polymer II-45 | 10 | | | | | |
| Polymer II-46 | 10 | | | | | |
| Polymer II-47 | 10 | | | | | |
| Polymer II-48 | 10 | | | | | |
| Polymer II-49 | 10 | | | | | |
| Polymer II-50 | 10 | | | | | |
| Polymer II-51 | 10 | | | | | |
| Polymer II-52 | 10 | | | | | |
| Polymer II-53 | 10 | | | | | |
| Polymer II-54 | 10 | | | | | |
| Polymer II-55 | 10 | | | | | |
| Polymer II-56 | 10 | | | | | |
| Polymer II-57 | 10 | | | | | |
| Polymer II-58 | 10 | | | | | |
| Polymer II-59 | 10 | | | | | |
| Polymer II-60 | 10 | | | | | |
| Polymer II-61 | 10 | | | | | |
| Polymer II-62 | 10 | | | | | |
| Polymer II-63 | 10 | | | | | |
| Polymer II-64 | 10 | | | | | |
| Polymer II-65 | 10 | | | | | |
| Polymer II-66 | 10 | | | | | |
| Polymer II-67 | 10 | | | | | |
| Polymer II-68 | 10 | 50 | | | | |
| Polymer II-69 | 10 | | 50 | | | |
| Polymer II-70 | 10 | | | 50 | | |
| Polymer II-71 | 10 | | | | 50 | |
| Polymer II-72 | 10 | | | | | 50 |
| Polymer II-73 | 10 | | | | | |
| Polymer II-74 | 10 | | | | | |
| Polymer II-75 | 10 | | | | | |
| Polymer II-76 | 10 | | | | | |
| Polymer II-77 | 10 | | | | | |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | — | | | | | |
| Pigment Red 122 (*3) | — | | | | | |
| Pigment Yellow 74 (*4) | — | | | | | |
| Pure water | — | 30 | 30 | 30 | 30 | 30 |
| Total | — | 100 | 100 | 100 | 100 | 100 |

| | Solid Content (%) | Pigment Dispersion II-82 | II-83 | II-84 | II-85 | II-86 |
|---|---|---|---|---|---|---|
| Naphthalene sulfonic acid Na formalin condensate | 10 | | | | | |
| Polymer II-42 | 10 | | | | | |
| Polymer II-43 | 10 | | | | | |
| Polymer II-44 | 10 | | | | | |
| Polymer II-45 | 10 | | | | | |
| Polymer II-46 | 10 | | | | | |
| Polymer II-47 | 10 | | | | | |
| Polymer II-48 | 10 | | | | | |
| Polymer II-49 | 10 | | | | | |
| Polymer II-50 | 10 | | | | | |
| Polymer II-51 | 10 | | | | | |
| Polymer II-52 | 10 | | | | | |
| Polymer II-53 | 10 | | | | | |

TABLE II-4-continued

| | | | | | | |
|---|---|---|---|---|---|---|
| Polymer II-54 | 10 | | | | | |
| Polymer II-55 | 10 | | | | | |
| Polymer II-56 | 10 | | | | | |
| Polymer II-57 | 10 | | | | | |
| Polymer II-58 | 10 | | | | | |
| Polymer II-59 | 10 | | | | | |
| Polymer II-60 | 10 | | | | | |
| Polymer II-61 | 10 | | | | | |
| Polymer II-62 | 10 | | | | | |
| Polymer II-63 | 10 | | | | | |
| Polymer II-64 | 10 | | | | | |
| Polymer II-65 | 10 | | | | | |
| Polymer II-66 | 10 | | | | | |
| Polymer II-67 | 10 | | | | | |
| Polymer II-68 | 10 | | | | | |
| Polymer II-69 | 10 | | | | | |
| Polymer II-70 | 10 | | | | | |
| Polymer II-71 | 10 | | | | | |
| Polymer II-72 | 10 | | | | | |
| Polymer II-73 | 10 | 50 | | | | |
| Polymer II-74 | 10 | | 50 | | | |
| Polymer II-75 | 10 | | | 50 | | |
| Polymer II-76 | 10 | | | | 50 | |
| Polymer II-77 | | | | | | 50 |
| 1-hydroxyethylidene-1,1-bisphosphonic acid | 10 | | | | | |
| Carbon black (*1) | — | 20 | 20 | 20 | 20 | 20 |
| Pigment Blue 15:3 (*2) | | | | | | |
| Pigment Red 122 (*3) | | | | | | |
| Pigment Yellow 74 (*4) | | | | | | |
| Pure water | — | 30 | 30 | 30 | 30 | 30 |
| Total | — | 100 | 100 | 100 | 100 | 100 |

| | Solid Content (%) | Pigment Dispersion II-87 |
|---|---|---|
| Naphthalene sulfonic acid Na formalin condensate | 10 | |
| Polymer II-42 | 10 | |
| Polymer II-43 | 10 | |
| Polymer II-44 | 10 | |
| Polymer II-45 | 10 | |
| Polymer II-46 | 10 | |
| Polymer II-47 | 10 | |
| Polymer II-48 | 10 | |
| Polymer II-49 | 10 | |
| Polymer II-50 | 10 | |
| Polymer II-51 | 10 | |
| Polymer II-52 | 10 | |
| Polymer II-53 | 10 | |
| Polymer II-54 | 10 | |
| Polymer II-55 | 10 | |
| Polymer II-56 | 10 | |
| Polymer II-57 | 10 | |
| Polymer II-58 | 10 | |
| Polymer II-59 | 10 | |
| Polymer II-60 | 10 | |
| Polymer II-61 | 10 | |
| Polymer II-62 | 10 | |
| Polymer II-63 | 10 | |
| Polymer II-64 | 10 | |
| Polymer II-65 | 10 | |
| Polymer II-66 | 10 | |
| Polymer II-67 | 10 | |
| Polymer II-68 | 10 | |
| Polymer II-69 | 10 | |
| Polymer II-70 | 10 | |
| Polymer II-71 | 10 | |
| Polymer II-72 | 10 | |
| Polymer II-73 | 10 | |
| Polymer II-74 | 10 | |
| Polymer II-75 | 10 | |
| Polymer II-76 | 10 | |
| Polymer II-77 | | |
| 1-hydroxyethylidene-1,1-bisphosphonic acid | 10 | 50 |
| Carbon black (*1) | — | 20 |
| Pigment Blue 15:3 (*2) | | |

TABLE II-4-continued

| | | |
|---|---|---|
| Pigment Red 122 (*3) | | — |
| Pigment Yellow 74 (*4) | | — |
| Pure water | — | 30 |
| Total | — | 100 |

(*1) = NIPEX 160
(*2) = CHROMOFINE BLUE A-220J from Dainichiseika Color & Chemicals Mfg. Co., Ltd.
(*3) = Toner Magenta E-0002 from Clariant
(*4) = FAST YELLOW 531 from Dainichiseika Color & Chemicals Mfg. Co., Ltd.

Preparation of Ink for Inkjet Recording

Example II-1

The following materials were mixed, stirred for 1.5 hrs and filtered with a membrane filter having an aperture of 1.2 μm to prepare an ink.

| | |
|---|---|
| Pigment Dispersion II-1 (including a solid content of pigment in an amount of 20% by weight) | 40.0 |
| 1,3-butanediol (hydrosoluble solvent) | 20.0 |
| Glycerin (hydrosoluble solvent) | 10.0 |
| 2-ethyl-1,3-hexanediol (hydrosoluble solvent) | 1.0 |
| 2,2,4-trimethyl-1,3-pentadiol (hydrosoluble solvent) | 1.0 |
| Fluorine surfactant (Zonyl FS-300 from DuPont including a solid content in an amount of 40% by weight) | 2.0 |
| Aqueous solution of polymer II-14 (including a solid content in an amount of 10% by weight) | 20.0 |
| Distilled water | 6.0 |

Example II-2

The following materials were mixed, stirred for 1.5 hrs and filtered with a membrane filter having an aperture of 1.2 μm to prepare an ink.

| | |
|---|---|
| Pigment Dispersion II-2 (including a solid content of pigment in an amount of 20% by weight) | 40.0 |
| 1,3-butanediol (hydrosoluble solvent) | 20.0 |
| Glycerin (hydrosoluble solvent) | 10.0 |
| 2-ethyl-1,3-hexanediol (hydrosoluble solvent) | 1.0 |
| 2,2,4-trimethyl-1,3-pentadiol (hydrosoluble solvent) | 1.0 |
| Fluorine surfactant (Zonyl FS-300 from DuPont including a solid content in an amount of 40% by weight) | 2.0 |
| Distilled water | 26.0 |

Examples II-3 to II-43 and Comparative Examples II-1 to II-3

The procedure for preparation of the ink in Example II-2 was repeated except for changing the formulation as show in Table II-5 to prepare inks of Examples II-3 to II-43 and Comparative Examples II-1 to II-3. The ink of Example 10 is the ink of Example II-1 naphthalene sulfonic acid Na formalin condensate is excluded from and includes polymer 9 more than Example II-1.

TABLE II-5

| Material | | Example | | | | |
|---|---|---|---|---|---|---|
| | | II-1 | II-2 | II-3 | II-4 | II-5 |
| Pigment dispersion II-1 | Naphthalene sulfonic acid Na | 40 | | | | |
| Pigment dispersion II-2 | Bk dispersion including polymer II-1 | | 40 | | | |
| Pigment dispersion II-3 | Bk dispersion including polymer II-2 | | | 40 | | |
| Pigment dispersion II-4 | Bk dispersion including polymer II-3 | | | | 40 | |
| Pigment dispersion II-5 | Bk dispersion including polymer II-4 | | | | | 40 |
| Pigment dispersion II-6 | Bk dispersion including polymer II-5 | | | | | |
| Pigment dispersion II-7 | Bk dispersion including polymer II-6 | | | | | |
| Pigment dispersion II-8 | Bk dispersion including polymer II-7 | | | | | |
| Pigment dispersion II-9 | Bk dispersion including polymer II-8 | | | | | |
| Pigment dispersion II-10 | Bk dispersion including polymer II-9 | | | | | |
| Pigment dispersion II-11 | Cy dispersion including polymer II-9 | | | | | |
| Pigment dispersion II-12 | Ma dispersion including polymer II-9 | | | | | |
| Pigment dispersion II-13 | Ye dispersion including polymer II-9 | | | | | |
| Pigment dispersion II-14 | Bk dispersion including polymer II-10 | | | | | |
| Pigment dispersion II-15 | Bk dispersion including polymer II-11 | | | | | |
| Pigment dispersion II-16 | Cy dispersion including polymer II-12 | | | | | |
| Pigment dispersion II-17 | Ma dispersion including polymer II-13 | | | | | |
| Pigment dispersion II-18 | Ye dispersion including polymer II-14 | | | | | |
| Pigment dispersion II-19 | Bk dispersion including polymer II-15 | | | | | |
| Pigment dispersion II-20 | Bk dispersion including polymer II-16 | | | | | |
| Pigment dispersion II-21 | Bk dispersion including polymer II-17 | | | | | |
| Pigment dispersion II-22 | Bk dispersion including polymer II-18 | | | | | |
| Pigment dispersion II-23 | Bk dispersion including polymer II-19 | | | | | |
| Pigment dispersion II-24 | Bk dispersion including polymer II-20 | | | | | |
| Pigment dispersion II-25 | Bk dispersion including polymer II-21 | | | | | |
| Pigment dispersion II-26 | Bk dispersion including polymer I-22 | | | | | |
| Pigment dispersion II-27 | Bk dispersion including polymer II-23 | | | | | |
| Pigment dispersion II-28 | Bk dispersion including polymer II-24 | | | | | |
| Pigment dispersion II-29 | Bk dispersion including polymer II-25 | | | | | |
| Pigment dispersion II-30 | Bk dispersion including polymer II-26 | | | | | |
| Pigment dispersion II-31 | Bk dispersion including polymer II-27 | | | | | |
| Pigment dispersion II-32 | Bk dispersion including polymer II-28 | | | | | |
| Pigment dispersion II-33 | Bk dispersion including polymer II-29 | | | | | |
| Pigment dispersion II-34 | Bk dispersion including polymer II-30 | | | | | |
| Pigment dispersion II-35 | Bk dispersion including polymer II-31 | | | | | |
| Pigment dispersion II-36 | Bk dispersion including polymer II-32 | | | | | |
| Pigment dispersion II-37 | Bk dispersion including polymer II-33 | | | | | |
| Pigment dispersion II-38 | Bk dispersion including polymer II-34 | | | | | |
| Pigment dispersion II-39 | Bk dispersion including polymer II-35 | | | | | |
| Pigment dispersion II-40 | Bk dispersion including polymer II-36 | | | | | |
| Pigment dispersion II-41 | Bk dispersion including polymer II-37 | | | | | |
| Pigment dispersion II-42 | Bk dispersion including polymer II-38 | | | | | |
| Pigment dispersion II-43 | Bk dispersion including polymer II-39 | | | | | |
| Pigment dispersion II-44 | Bk dispersion including polymer II-40 | | | | | |
| Pigment dispersion II-45 | Bk dispersion including polymer II-41 | | | | | |
| Pigment dispersion II-46 | Low-molecular-weight bisphosphonic acid *1 | | | | | |
| Aqueous solution of polymer I-14 including a solid content of 10% by weight | | 20 | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 6 | 26 | 26 | 26 | 26 |
| Total | | 100 | 100 | 100 | 100 | 100 |

TABLE II-5-continued

| | | Example | | | | |
|---|---|---|---|---|---|---|
| | Material | II-6 | II-7 | II-8 | II-9 | II-10 |
| Pigment dispersion II-1 | Naphthalene sulfonic acid Na | | | | | |
| Pigment dispersion II-2 | Bk dispersion including polymer II-1 | | | | | |
| Pigment dispersion II-3 | Bk dispersion including polymer II-2 | | | | | |
| Pigment dispersion II-4 | Bk dispersion including polymer II-3 | | | | | |
| Pigment dispersion II-5 | Bk dispersion including polymer II-4 | | | | | |
| Pigment dispersion II-6 | Bk dispersion including polymer II-5 | 40 | | | | |
| Pigment dispersion II-7 | Bk dispersion including polymer II-6 | | 40 | | | |
| Pigment dispersion II-8 | Bk dispersion including polymer II-7 | | | 40 | | |
| Pigment dispersion II-9 | Bk dispersion including polymer II-8 | | | | 40 | |
| Pigment dispersion II-10 | Bk dispersion including polymer II-9 | | | | | 40 |
| Pigment dispersion II-11 | Cy dispersion including polymer II-9 | | | | | |
| Pigment dispersion II-12 | Ma dispersion including polymer II-9 | | | | | |
| Pigment dispersion II-13 | Ye dispersion including polymer II-9 | | | | | |
| Pigment dispersion II-14 | Bk dispersion including polymer II-10 | | | | | |
| Pigment dispersion II-15 | Bk dispersion including polymer II-11 | | | | | |
| Pigment dispersion II-16 | Cy dispersion including polymer II-12 | | | | | |
| Pigment dispersion II-17 | Ma dispersion including polymer II-13 | | | | | |
| Pigment dispersion II-18 | Ye dispersion including polymer II-14 | | | | | |
| Pigment dispersion II-19 | Bk dispersion including polymer II-15 | | | | | |
| Pigment dispersion II-20 | Bk dispersion including polymer II-16 | | | | | |
| Pigment dispersion II-21 | Bk dispersion including polymer II-17 | | | | | |
| Pigment dispersion II-22 | Bk dispersion including polymer II-18 | | | | | |
| Pigment dispersion II-23 | Bk dispersion including polymer II-19 | | | | | |
| Pigment dispersion II-24 | Bk dispersion including polymer II-20 | | | | | |
| Pigment dispersion II-25 | Bk dispersion including polymer II-21 | | | | | |
| Pigment dispersion II-26 | Bk dispersion including polymer I-22 | | | | | |
| Pigment dispersion II-27 | Bk dispersion including polymer II-23 | | | | | |
| Pigment dispersion II-28 | Bk dispersion including polymer II-24 | | | | | |
| Pigment dispersion II-29 | Bk dispersion including polymer II-25 | | | | | |
| Pigment dispersion II-30 | Bk dispersion including polymer II-26 | | | | | |
| Pigment dispersion II-31 | Bk dispersion including polymer II-27 | | | | | |
| Pigment dispersion II-32 | Bk dispersion including polymer II-28 | | | | | |
| Pigment dispersion II-33 | Bk dispersion including polymer II-29 | | | | | |
| Pigment dispersion II-34 | Bk dispersion including polymer II-30 | | | | | |
| Pigment dispersion II-35 | Bk dispersion including polymer II-31 | | | | | |
| Pigment dispersion II-36 | Bk dispersion including polymer II-32 | | | | | |
| Pigment dispersion II-37 | Bk dispersion including polymer II-33 | | | | | |
| Pigment dispersion II-38 | Bk dispersion including polymer II-34 | | | | | |
| Pigment dispersion II-39 | Bk dispersion including polymer II-35 | | | | | |
| Pigment dispersion II-40 | Bk dispersion including polymer II-36 | | | | | |
| Pigment dispersion II-41 | Bk dispersion including polymer II-37 | | | | | |
| Pigment dispersion II-42 | Bk dispersion including polymer II-38 | | | | | |
| Pigment dispersion II-43 | Bk dispersion including polymer II-39 | | | | | |
| Pigment dispersion II-44 | Bk dispersion including polymer II-40 | | | | | |
| Pigment dispersion II-45 | Bk dispersion including polymer II-41 | | | | | |
| Pigment dispersion II-46 | Low-molecular-weight bisphosphonic acid *1 | | | | | |
| | Aqueous solution of polymer I-14 including a solid content of 10% by weight | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE II-5-continued

| Material | | Example | | | | |
|---|---|---|---|---|---|---|
| | | II-11 | II-12 | II-13 | II-14 | II-15 |
| Pigment dispersion II-1 | Naphthalene sulfonic acid Na | | | | | |
| Pigment dispersion II-2 | Bk dispersion including polymer II-1 | | | | | |
| Pigment dispersion II-3 | Bk dispersion including polymer II-2 | | | | | |
| Pigment dispersion II-4 | Bk dispersion including polymer II-3 | | | | | |
| Pigment dispersion II-5 | Bk dispersion including polymer II-4 | | | | | |
| Pigment dispersion II-6 | Bk dispersion including polymer II-5 | | | | | |
| Pigment dispersion II-7 | Bk dispersion including polymer II-6 | | | | | |
| Pigment dispersion II-8 | Bk dispersion including polymer II-7 | | | | | |
| Pigment dispersion II-9 | Bk dispersion including polymer II-8 | | | | | |
| Pigment dispersion II-10 | Bk dispersion including polymer II-9 | | | | | |
| Pigment dispersion II-11 | Cy dispersion including polymer II-9 | 40 | | | | |
| Pigment dispersion II-12 | Ma dispersion including polymer II-9 | | 40 | | | |
| Pigment dispersion II-13 | Ye dispersion including polymer II-9 | | | 40 | | |
| Pigment dispersion II-14 | Bk dispersion including polymer II-10 | | | | 40 | |
| Pigment dispersion II-15 | Bk dispersion including polymer II-11 | | | | | 40 |
| Pigment dispersion II-16 | Bk dispersion including polymer II-12 | | | | | |
| Pigment dispersion II-17 | Bk dispersion including polymer II-13 | | | | | |
| Pigment dispersion II-18 | Bk dispersion including polymer II-14 | | | | | |
| Pigment dispersion II-19 | Bk dispersion including polymer II-15 | | | | | |
| Pigment dispersion II-20 | Bk dispersion including polymer II-16 | | | | | |
| Pigment dispersion II-21 | Bk dispersion including polymer II-17 | | | | | |
| Pigment dispersion II-22 | Bk dispersion including polymer II-18 | | | | | |
| Pigment dispersion II-23 | Bk dispersion including polymer II-19 | | | | | |
| Pigment dispersion II-24 | Bk dispersion including polymer II-20 | | | | | |
| Pigment dispersion II-25 | Bk dispersion including polymer II-21 | | | | | |
| Pigment dispersion II-26 | Bk dispersion including polymer I-22 | | | | | |
| Pigment dispersion II-27 | Bk dispersion including polymer II-23 | | | | | |
| Pigment dispersion II-28 | Bk dispersion including polymer II-24 | | | | | |
| Pigment dispersion II-29 | Bk dispersion including polymer II-25 | | | | | |
| Pigment dispersion II-30 | Bk dispersion including polymer II-26 | | | | | |
| Pigment dispersion II-31 | Bk dispersion including polymer II-27 | | | | | |
| Pigment dispersion II-32 | Bk dispersion including polymer II-28 | | | | | |
| Pigment dispersion II-33 | Bk dispersion including polymer II-29 | | | | | |
| Pigment dispersion II-34 | Bk dispersion including polymer II-30 | | | | | |
| Pigment dispersion II-35 | Bk dispersion including polymer II-31 | | | | | |
| Pigment dispersion II-36 | Bk dispersion including polymer II-32 | | | | | |
| Pigment dispersion II-37 | Bk dispersion including polymer II-33 | | | | | |
| Pigment dispersion II-38 | Bk dispersion including polymer II-34 | | | | | |
| Pigment dispersion II-39 | Bk dispersion including polymer II-35 | | | | | |
| Pigment dispersion II-40 | Bk dispersion including polymer II-36 | | | | | |
| Pigment dispersion II-41 | Bk dispersion including polymer II-37 | | | | | |
| Pigment dispersion II-42 | Bk dispersion including polymer II-38 | | | | | |
| Pigment dispersion II-43 | Bk dispersion including polymer II-39 | | | | | |
| Pigment dispersion II-44 | Bk dispersion including polymer II-40 | | | | | |
| Pigment dispersion II-45 | Bk dispersion including polymer II-41 | | | | | |
| Pigment dispersion II-46 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE II-5-continued

| Material | | Example | | | | |
|---|---|---|---|---|---|---|
| | | II-16 | II-17 | II-18 | II-19 | II-20 |
| Pigment dispersion II-1 | Naphthalene sulfonic acid Na | | | | | |
| Pigment dispersion II-2 | Bk dispersion including polymer II-1 | | | | | |
| Pigment dispersion II-3 | Bk dispersion including polymer II-2 | | | | | |
| Pigment dispersion II-4 | Bk dispersion including polymer II-3 | | | | | |
| Pigment dispersion II-5 | Bk dispersion including polymer II-4 | | | | | |
| Pigment dispersion II-6 | Bk dispersion including polymer II-5 | | | | | |
| Pigment dispersion II-7 | Bk dispersion including polymer II-6 | | | | | |
| Pigment dispersion II-8 | Bk dispersion including polymer II-7 | | | | | |
| Pigment dispersion II-9 | Bk dispersion including polymer II-8 | | | | | |
| Pigment dispersion II-10 | Bk dispersion including polymer II-9 | | | | | |
| Pigment dispersion II-11 | Cy dispersion including polymer II-9 | | | | | |
| Pigment dispersion II-12 | Ma dispersion including polymer II-9 | | | | | |
| Pigment dispersion II-13 | Ye dispersion including polymer II-9 | | | | | |
| Pigment dispersion II-14 | Bk dispersion including polymer II-10 | | | | | |
| Pigment dispersion II-15 | Bk dispersion including polymer II-11 | | | | | |
| Pigment dispersion II-16 | Bk dispersion including polymer II-12 | 40 | | | | |
| Pigment dispersion II-17 | Bk dispersion including polymer II-13 | | 40 | | | |
| Pigment dispersion II-18 | Bk dispersion including polymer II-14 | | | 40 | | |
| Pigment dispersion II-19 | Bk dispersion including polymer II-15 | | | | 40 | |
| Pigment dispersion II-20 | Bk dispersion including polymer II-16 | | | | | 40 |
| Pigment dispersion II-21 | Bk dispersion including polymer II-17 | | | | | |
| Pigment dispersion II-22 | Bk dispersion including polymer II-18 | | | | | |
| Pigment dispersion II-23 | Bk dispersion including polymer II-19 | | | | | |
| Pigment dispersion II-24 | Bk dispersion including polymer II-20 | | | | | |
| Pigment dispersion II-25 | Bk dispersion including polymer II-21 | | | | | |
| Pigment dispersion II-26 | Bk dispersion including polymer I-22 | | | | | |
| Pigment dispersion II-27 | Bk dispersion including polymer II-23 | | | | | |
| Pigment dispersion II-28 | Bk dispersion including polymer II-24 | | | | | |
| Pigment dispersion II-29 | Bk dispersion including polymer II-25 | | | | | |
| Pigment dispersion II-30 | Bk dispersion including polymer II-26 | | | | | |
| Pigment dispersion II-31 | Bk dispersion including polymer II-27 | | | | | |
| Pigment dispersion II-32 | Bk dispersion including polymer II-28 | | | | | |
| Pigment dispersion II-33 | Bk dispersion including polymer II-29 | | | | | |
| Pigment dispersion II-34 | Bk dispersion including polymer II-30 | | | | | |
| Pigment dispersion II-35 | Bk dispersion including polymer II-31 | | | | | |
| Pigment dispersion II-36 | Bk dispersion including polymer II-32 | | | | | |
| Pigment dispersion II-37 | Bk dispersion including polymer II-33 | | | | | |
| Pigment dispersion II-38 | Bk dispersion including polymer II-34 | | | | | |
| Pigment dispersion II-39 | Bk dispersion including polymer II-35 | | | | | |
| Pigment dispersion II-40 | Bk dispersion including polymer II-36 | | | | | |
| Pigment dispersion II-41 | Bk dispersion including polymer II-37 | | | | | |
| Pigment dispersion II-42 | Bk dispersion including polymer II-38 | | | | | |
| Pigment dispersion II-43 | Bk dispersion including polymer II-39 | | | | | |
| Pigment dispersion II-44 | Bk dispersion including polymer II-40 | | | | | |
| Pigment dispersion II-45 | Bk dispersion including polymer II-41 | | | | | |
| Pigment dispersion II-46 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE II-5-continued

|  | Material | \multicolumn{5}{c}{Example} |
|---|---|---|---|---|---|---|
|  |  | II-21 | II-22 | II-23 | II-24 | II-25 |
| Pigment dispersion II-1 | Naphthalene sulfonic acid Na | | | | | |
| Pigment dispersion II-2 | Bk dispersion including polymer II-1 | | | | | |
| Pigment dispersion II-3 | Bk dispersion including polymer II-2 | | | | | |
| Pigment dispersion II-4 | Bk dispersion including polymer II-3 | | | | | |
| Pigment dispersion II-5 | Bk dispersion including polymer II-4 | | | | | |
| Pigment dispersion II-6 | Bk dispersion including polymer II-5 | | | | | |
| Pigment dispersion II-7 | Bk dispersion including polymer II-6 | | | | | |
| Pigment dispersion II-8 | Bk dispersion including polymer II-7 | | | | | |
| Pigment dispersion II-9 | Bk dispersion including polymer II-8 | | | | | |
| Pigment dispersion II-10 | Bk dispersion including polymer II-9 | | | | | |
| Pigment dispersion II-11 | Cy dispersion including polymer II-9 | | | | | |
| Pigment dispersion II-12 | Ma dispersion including polymer II-9 | | | | | |
| Pigment dispersion II-13 | Ye dispersion including polymer II-9 | | | | | |
| Pigment dispersion II-14 | Bk dispersion including polymer II-10 | | | | | |
| Pigment dispersion II-15 | Bk dispersion including polymer II-11 | | | | | |
| Pigment dispersion II-16 | Bk dispersion including polymer II-12 | | | | | |
| Pigment dispersion II-17 | Bk dispersion including polymer II-13 | | | | | |
| Pigment dispersion II-18 | Bk dispersion including polymer II-14 | | | | | |
| Pigment dispersion II-19 | Bk dispersion including polymer II-15 | | | | | |
| Pigment dispersion II-20 | Bk dispersion including polymer II-16 | | | | | |
| Pigment dispersion II-21 | Bk dispersion including polymer II-17 | 40 | | | | |
| Pigment dispersion II-22 | Bk dispersion including polymer II-18 | | 40 | | | |
| Pigment dispersion II-23 | Bk dispersion including polymer II-19 | | | 40 | | |
| Pigment dispersion II-24 | Bk dispersion including polymer II-20 | | | | 40 | |
| Pigment dispersion II-25 | Bk dispersion including polymer II-21 | | | | | 40 |
| Pigment dispersion II-26 | Bk dispersion including polymer I-22 | | | | | |
| Pigment dispersion II-27 | Bk dispersion including polymer II-23 | | | | | |
| Pigment dispersion II-28 | Bk dispersion including polymer II-24 | | | | | |
| Pigment dispersion II-29 | Bk dispersion including polymer II-25 | | | | | |
| Pigment dispersion II-30 | Bk dispersion including polymer II-26 | | | | | |
| Pigment dispersion II-31 | Bk dispersion including polymer II-27 | | | | | |
| Pigment dispersion II-32 | Bk dispersion including polymer II-28 | | | | | |
| Pigment dispersion II-33 | Bk dispersion including polymer II-29 | | | | | |
| Pigment dispersion II-34 | Bk dispersion including polymer II-30 | | | | | |
| Pigment dispersion II-35 | Bk dispersion including polymer II-31 | | | | | |
| Pigment dispersion II-36 | Bk dispersion including polymer II-32 | | | | | |
| Pigment dispersion II-37 | Bk dispersion including polymer II-33 | | | | | |
| Pigment dispersion II-38 | Bk dispersion including polymer II-34 | | | | | |
| Pigment dispersion II-39 | Bk dispersion including polymer II-35 | | | | | |
| Pigment dispersion II-40 | Bk dispersion including polymer II-36 | | | | | |
| Pigment dispersion II-41 | Bk dispersion including polymer II-37 | | | | | |
| Pigment dispersion II-42 | Bk dispersion including polymer II-38 | | | | | |
| Pigment dispersion II-43 | Bk dispersion including polymer II-39 | | | | | |
| Pigment dispersion II-44 | Bk dispersion including polymer II-40 | | | | | |
| Pigment dispersion II-45 | Bk dispersion including polymer II-41 | | | | | |
| Pigment dispersion II-46 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE II-5-continued

| Material | | Example | | | | |
|---|---|---|---|---|---|---|
| | | II-26 | II-27 | II-28 | II-29 | II-30 |
| Pigment dispersion II-1 | Naphthalene sulfonic acid Na | | | | | |
| Pigment dispersion II-2 | Bk dispersion including polymer II-1 | | | | | |
| Pigment dispersion II-3 | Bk dispersion including polymer II-2 | | | | | |
| Pigment dispersion II-4 | Bk dispersion including polymer II-3 | | | | | |
| Pigment dispersion II-5 | Bk dispersion including polymer II-4 | | | | | |
| Pigment dispersion II-6 | Bk dispersion including polymer II-5 | | | | | |
| Pigment dispersion II-7 | Bk dispersion including polymer II-6 | | | | | |
| Pigment dispersion II-8 | Bk dispersion including polymer II-7 | | | | | |
| Pigment dispersion II-9 | Bk dispersion including polymer II-8 | | | | | |
| Pigment dispersion II-10 | Bk dispersion including polymer II-9 | | | | | |
| Pigment dispersion II-11 | Cy dispersion including polymer II-9 | | | | | |
| Pigment dispersion II-12 | Ma dispersion including polymer II-9 | | | | | |
| Pigment dispersion II-13 | Ye dispersion including polymer II-9 | | | | | |
| Pigment dispersion II-14 | Bk dispersion including polymer II-10 | | | | | |
| Pigment dispersion II-15 | Bk dispersion including polymer II-11 | | | | | |
| Pigment dispersion II-16 | Bk dispersion including polymer II-12 | | | | | |
| Pigment dispersion II-17 | Bk dispersion including polymer II-13 | | | | | |
| Pigment dispersion II-18 | Bk dispersion including polymer II-14 | | | | | |
| Pigment dispersion II-19 | Bk dispersion including polymer II-15 | | | | | |
| Pigment dispersion II-20 | Bk dispersion including polymer II-16 | | | | | |
| Pigment dispersion II-21 | Bk dispersion including polymer II-17 | | | | | |
| Pigment dispersion II-22 | Bk dispersion including polymer II-18 | | | | | |
| Pigment dispersion II-23 | Bk dispersion including polymer II-19 | | | | | |
| Pigment dispersion II-24 | Bk dispersion including polymer II-20 | | | | | |
| Pigment dispersion II-25 | Bk dispersion including polymer II-21 | | | | | |
| Pigment dispersion II-26 | Bk dispersion including polymer I-22 | 40 | | | | |
| Pigment dispersion II-27 | Bk dispersion including polymer II-23 | | 40 | | | |
| Pigment dispersion II-28 | Bk dispersion including polymer II-24 | | | 40 | | |
| Pigment dispersion II-29 | Bk dispersion including polymer II-25 | | | | 40 | |
| Pigment dispersion II-30 | Bk dispersion including polymer II-26 | | | | | 40 |
| Pigment dispersion II-31 | Bk dispersion including polymer II-27 | | | | | |
| Pigment dispersion II-32 | Bk dispersion including polymer II-28 | | | | | |
| Pigment dispersion II-33 | Bk dispersion including polymer II-29 | | | | | |
| Pigment dispersion II-34 | Bk dispersion including polymer II-30 | | | | | |
| Pigment dispersion II-35 | Bk dispersion including polymer II-31 | | | | | |
| Pigment dispersion II-36 | Bk dispersion including polymer II-32 | | | | | |
| Pigment dispersion II-37 | Bk dispersion including polymer II-33 | | | | | |
| Pigment dispersion II-38 | Bk dispersion including polymer II-34 | | | | | |
| Pigment dispersion II-39 | Bk dispersion including polymer II-35 | | | | | |
| Pigment dispersion II-40 | Bk dispersion including polymer II-36 | | | | | |
| Pigment dispersion II-41 | Bk dispersion including polymer II-37 | | | | | |
| Pigment dispersion II-42 | Bk dispersion including polymer II-38 | | | | | |
| Pigment dispersion II-43 | Bk dispersion including polymer II-39 | | | | | |
| Pigment dispersion II-44 | Bk dispersion including polymer II-40 | | | | | |
| Pigment dispersion II-45 | Bk dispersion including polymer II-41 | | | | | |
| Pigment dispersion II-46 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE II-5-continued

| Material | | Example | | | | |
|---|---|---|---|---|---|---|
| | | II-31 | II-32 | II-33 | II-34 | II-35 |
| Pigment dispersion II-1 | Naphthalene sulfonic acid Na | | | | | |
| Pigment dispersion II-2 | Bk dispersion including polymer II-1 | | | | | |
| Pigment dispersion II-3 | Bk dispersion including polymer II-2 | | | | | |
| Pigment dispersion II-4 | Bk dispersion including polymer II-3 | | | | | |
| Pigment dispersion II-5 | Bk dispersion including polymer II-4 | | | | | |
| Pigment dispersion II-6 | Bk dispersion including polymer II-5 | | | | | |
| Pigment dispersion II-7 | Bk dispersion including polymer II-6 | | | | | |
| Pigment dispersion II-8 | Bk dispersion including polymer II-7 | | | | | |
| Pigment dispersion II-9 | Bk dispersion including polymer II-8 | | | | | |
| Pigment dispersion II-10 | Bk dispersion including polymer II-9 | | | | | |
| Pigment dispersion II-11 | Cy dispersion including polymer II-9 | | | | | |
| Pigment dispersion II-12 | Ma dispersion including polymer II-9 | | | | | |
| Pigment dispersion II-13 | Ye dispersion including polymer II-9 | | | | | |
| Pigment dispersion II-14 | Bk dispersion including polymer II-10 | | | | | |
| Pigment dispersion II-15 | Bk dispersion including polymer II-11 | | | | | |
| Pigment dispersion II-16 | Bk dispersion including polymer II-12 | | | | | |
| Pigment dispersion II-17 | Bk dispersion including polymer II-13 | | | | | |
| Pigment dispersion II-18 | Bk dispersion including polymer II-14 | | | | | |
| Pigment dispersion II-19 | Bk dispersion including polymer II-15 | | | | | |
| Pigment dispersion II-20 | Bk dispersion including polymer II-16 | | | | | |
| Pigment dispersion II-21 | Bk dispersion including polymer II-17 | | | | | |
| Pigment dispersion II-22 | Bk dispersion including polymer II-18 | | | | | |
| Pigment dispersion II-23 | Bk dispersion including polymer II-19 | | | | | |
| Pigment dispersion II-24 | Bk dispersion including polymer II-20 | | | | | |
| Pigment dispersion II-25 | Bk dispersion including polymer II-21 | | | | | |
| Pigment dispersion II-26 | Bk dispersion including polymer I-22 | | | | | |
| Pigment dispersion II-27 | Bk dispersion including polymer II-23 | | | | | |
| Pigment dispersion II-28 | Bk dispersion including polymer II-24 | | | | | |
| Pigment dispersion II-29 | Bk dispersion including polymer II-25 | | | | | |
| Pigment dispersion II-30 | Bk dispersion including polymer II-26 | | | | | |
| Pigment dispersion II-31 | Bk dispersion including polymer II-27 | 40 | | | | |
| Pigment dispersion II-32 | Bk dispersion including polymer II-28 | | 40 | | | |
| Pigment dispersion II-33 | Bk dispersion including polymer II-29 | | | 40 | | |
| Pigment dispersion II-34 | Bk dispersion including polymer II-30 | | | | 40 | |
| Pigment dispersion II-35 | Bk dispersion including polymer II-31 | | | | | 40 |
| Pigment dispersion II-36 | Bk dispersion including polymer II-32 | | | | | |
| Pigment dispersion II-37 | Bk dispersion including polymer II-33 | | | | | |
| Pigment dispersion II-38 | Bk dispersion including polymer II-34 | | | | | |
| Pigment dispersion II-39 | Bk dispersion including polymer II-35 | | | | | |
| Pigment dispersion II-40 | Bk dispersion including polymer II-36 | | | | | |
| Pigment dispersion II-41 | Bk dispersion including polymer II-37 | | | | | |
| Pigment dispersion II-42 | Bk dispersion including polymer II-38 | | | | | |
| Pigment dispersion II-43 | Bk dispersion including polymer II-39 | | | | | |
| Pigment dispersion II-44 | Bk dispersion including polymer II-40 | | | | | |
| Pigment dispersion II-45 | Bk dispersion including polymer II-41 | | | | | |
| Pigment dispersion II-46 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE II-5-continued

|  | Material | II-36 | II-37 | II-38 | II-39 | II-40 |
|---|---|---|---|---|---|---|
| Pigment dispersion II-1 | Naphthalene sulfonic acid Na | | | | | |
| Pigment dispersion II-2 | Bk dispersion including polymer II-1 | | | | | |
| Pigment dispersion II-3 | Bk dispersion including polymer II-2 | | | | | |
| Pigment dispersion II-4 | Bk dispersion including polymer II-3 | | | | | |
| Pigment dispersion II-5 | Bk dispersion including polymer II-4 | | | | | |
| Pigment dispersion II-6 | Bk dispersion including polymer II-5 | | | | | |
| Pigment dispersion II-7 | Bk dispersion including polymer II-6 | | | | | |
| Pigment dispersion II-8 | Bk dispersion including polymer II-7 | | | | | |
| Pigment dispersion II-9 | Bk dispersion including polymer II-8 | | | | | |
| Pigment dispersion II-10 | Bk dispersion including polymer II-9 | | | | | |
| Pigment dispersion II-11 | Cy dispersion including polymer II-9 | | | | | |
| Pigment dispersion II-12 | Ma dispersion including polymer II-9 | | | | | |
| Pigment dispersion II-13 | Ye dispersion including polymer II-9 | | | | | |
| Pigment dispersion II-14 | Bk dispersion including polymer II-10 | | | | | |
| Pigment dispersion II-15 | Bk dispersion including polymer II-11 | | | | | |
| Pigment dispersion II-16 | Bk dispersion including polymer II-12 | | | | | |
| Pigment dispersion II-17 | Bk dispersion including polymer II-13 | | | | | |
| Pigment dispersion II-18 | Bk dispersion including polymer II-14 | | | | | |
| Pigment dispersion II-19 | Bk dispersion including polymer II-15 | | | | | |
| Pigment dispersion II-20 | Bk dispersion including polymer II-16 | | | | | |
| Pigment dispersion II-21 | Bk dispersion including polymer II-17 | | | | | |
| Pigment dispersion II-22 | Bk dispersion including polymer II-18 | | | | | |
| Pigment dispersion II-23 | Bk dispersion including polymer II-19 | | | | | |
| Pigment dispersion II-24 | Bk dispersion including polymer II-20 | | | | | |
| Pigment dispersion II-25 | Bk dispersion including polymer II-21 | | | | | |
| Pigment dispersion II-26 | Bk dispersion including polymer I-22 | | | | | |
| Pigment dispersion II-27 | Bk dispersion including polymer II-23 | | | | | |
| Pigment dispersion II-28 | Bk dispersion including polymer II-24 | | | | | |
| Pigment dispersion II-29 | Bk dispersion including polymer II-25 | | | | | |
| Pigment dispersion II-30 | Bk dispersion including polymer II-26 | | | | | |
| Pigment dispersion II-31 | Bk dispersion including polymer II-27 | | | | | |
| Pigment dispersion II-32 | Bk dispersion including polymer II-28 | | | | | |
| Pigment dispersion II-33 | Bk dispersion including polymer II-29 | | | | | |
| Pigment dispersion II-34 | Bk dispersion including polymer II-30 | | | | | |
| Pigment dispersion II-35 | Bk dispersion including polymer II-31 | | | | | |
| Pigment dispersion II-36 | Bk dispersion including polymer II-32 | 40 | | | | |
| Pigment dispersion II-37 | Bk dispersion including polymer II-33 | | 40 | | | |
| Pigment dispersion II-38 | Bk dispersion including polymer II-34 | | | 40 | | |
| Pigment dispersion II-39 | Bk dispersion including polymer II-35 | | | | 40 | |
| Pigment dispersion II-40 | Bk dispersion including polymer II-36 | | | | | 40 |
| Pigment dispersion II-41 | Bk dispersion including polymer II-37 | | | | | |
| Pigment dispersion II-42 | Bk dispersion including polymer II-38 | | | | | |
| Pigment dispersion II-43 | Bk dispersion including polymer II-39 | | | | | |
| Pigment dispersion II-44 | Bk dispersion including polymer II-40 | | | | | |
| Pigment dispersion II-45 | Bk dispersion including polymer II-41 | | | | | |
| Pigment dispersion II-46 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE II-5-continued

| Material | | Example | | | Com. Ex. | |
|---|---|---|---|---|---|---|
| | | II-41 | II-42 | II-43 | II-1 | II-2 |
| Pigment dispersion II-1 | Naphthalene sulfonic acid Na | | | | | |
| Pigment dispersion II-2 | Bk dispersion including polymer II-1 | | | | | |
| Pigment dispersion II-3 | Bk dispersion including polymer II-2 | | | | | |
| Pigment dispersion II-4 | Bk dispersion including polymer II-3 | | | | | |
| Pigment dispersion II-5 | Bk dispersion including polymer II-4 | | | | | |
| Pigment dispersion II-6 | Bk dispersion including polymer II-5 | | | | | |
| Pigment dispersion II-7 | Bk dispersion including polymer II-6 | | | | | |
| Pigment dispersion II-8 | Bk dispersion including polymer II-7 | | | | | |
| Pigment dispersion II-9 | Bk dispersion including polymer II-8 | | | | | |
| Pigment dispersion II-10 | Bk dispersion including polymer II-9 | | | | | |
| Pigment dispersion II-11 | Cy dispersion including polymer II-9 | | | | | |
| Pigment dispersion II-12 | Ma dispersion including polymer II-9 | | | | | |
| Pigment dispersion II-13 | Ye dispersion including polymer II-9 | | | | | |
| Pigment dispersion II-14 | Bk dispersion including polymer II-10 | | | | | |
| Pigment dispersion II-15 | Bk dispersion including polymer II-11 | | | | | |
| Pigment dispersion II-16 | Bk dispersion including polymer II-12 | | | | | |
| Pigment dispersion II-17 | Bk dispersion including polymer II-13 | | | | | |
| Pigment dispersion II-18 | Bk dispersion including polymer II-14 | | | | | |
| Pigment dispersion II-19 | Bk dispersion including polymer II-15 | | | | | |
| Pigment dispersion II-20 | Bk dispersion including polymer II-16 | | | | | |
| Pigment dispersion II-21 | Bk dispersion including polymer II-17 | | | | | |
| Pigment dispersion II-22 | Bk dispersion including polymer II-18 | | | | | |
| Pigment dispersion II-23 | Bk dispersion including polymer II-19 | | | | | |
| Pigment dispersion II-24 | Bk dispersion including polymer II-20 | | | | | |
| Pigment dispersion II-25 | Bk dispersion including polymer II-21 | | | | | |
| Pigment dispersion II-26 | Bk dispersion including polymer I-22 | | | | | |
| Pigment dispersion II-27 | Bk dispersion including polymer II-23 | | | | | |
| Pigment dispersion II-28 | Bk dispersion including polymer II-24 | | | | | |
| Pigment dispersion II-29 | Bk dispersion including polymer II-25 | | | | | |
| Pigment dispersion II-30 | Bk dispersion including polymer II-26 | | | | | |
| Pigment dispersion II-31 | Bk dispersion including polymer II-27 | | | | | |
| Pigment dispersion II-32 | Bk dispersion including polymer II-28 | | | | | |
| Pigment dispersion II-33 | Bk dispersion including polymer II-29 | | | | | |
| Pigment dispersion II-34 | Bk dispersion including polymer II-30 | | | | | |
| Pigment dispersion II-35 | Bk dispersion including polymer II-31 | | | | | |
| Pigment dispersion II-36 | Bk dispersion including polymer II-32 | | | | | |
| Pigment dispersion II-37 | Bk dispersion including polymer II-33 | | | | | |
| Pigment dispersion II-38 | Bk dispersion including polymer II-34 | | | | | |
| Pigment dispersion II-39 | Bk dispersion including polymer II-35 | | | | | |
| Pigment dispersion II-40 | Bk dispersion including polymer II-36 | | | | | |
| Pigment dispersion II-41 | Bk dispersion including polymer II-37 | 40 | | | | |
| Pigment dispersion II-42 | Bk dispersion including polymer II-38 | | 40 | | | |
| Pigment dispersion II-43 | Bk dispersion including polymer II-39 | | | 40 | | |
| Pigment dispersion II-44 | Bk dispersion including polymer II-40 | | | | 40 | |
| Pigment dispersion II-45 | Bk dispersion including polymer II-41 | | | | | 40 |
| Pigment dispersion II-46 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE II-5-continued

| Material | | Com. Ex. II-3 |
|---|---|---|
| Pigment dispersion II-1 | Naphthalene sulfonic acid Na | |
| Pigment dispersion II-2 | Bk dispersion including polymer II-1 | |
| Pigment dispersion II-3 | Bk dispersion including polymer II-2 | |
| Pigment dispersion II-4 | Bk dispersion including polymer II-3 | |
| Pigment dispersion II-5 | Bk dispersion including polymer II-4 | |
| Pigment dispersion II-6 | Bk dispersion including polymer II-5 | |
| Pigment dispersion II-7 | Bk dispersion including polymer II-6 | |
| Pigment dispersion II-8 | Bk dispersion including polymer II-7 | |
| Pigment dispersion II-9 | Bk dispersion including polymer II-8 | |
| Pigment dispersion II-10 | Bk dispersion including polymer II-9 | |
| Pigment dispersion II-11 | Cy dispersion including polymer II-9 | |
| Pigment dispersion II-12 | Ma dispersion including polymer II-9 | |
| Pigment dispersion II-13 | Ye dispersion including polymer II-9 | |
| Pigment dispersion II-14 | Bk dispersion including polymer II-10 | |
| Pigment dispersion II-15 | Bk dispersion including polymer II-11 | |
| Pigment dispersion II-16 | Bk dispersion including polymer II-12 | |
| Pigment dispersion II-17 | Bk dispersion including polymer II-13 | |
| Pigment dispersion II-18 | Bk dispersion including polymer II-14 | |
| Pigment dispersion II-19 | Bk dispersion including polymer II-15 | |
| Pigment dispersion II-20 | Bk dispersion including polymer II-16 | |
| Pigment dispersion II-21 | Bk dispersion including polymer II-17 | |
| Pigment dispersion II-22 | Bk dispersion including polymer II-18 | |
| Pigment dispersion II-23 | Bk dispersion including polymer II-19 | |
| Pigment dispersion II-24 | Bk dispersion including polymer II-20 | |
| Pigment dispersion II-25 | Bk dispersion including polymer II-21 | |
| Pigment dispersion II-26 | Bk dispersion including polymer I-22 | |
| Pigment dispersion II-27 | Bk dispersion including polymer II-23 | |
| Pigment dispersion II-28 | Bk dispersion including polymer II-24 | |
| Pigment dispersion II-29 | Bk dispersion including polymer II-25 | |
| Pigment dispersion II-30 | Bk dispersion including polymer II-26 | |
| Pigment dispersion II-31 | Bk dispersion including polymer II-27 | |
| Pigment dispersion II-32 | Bk dispersion including polymer II-28 | |
| Pigment dispersion II-33 | Bk dispersion including polymer II-29 | |
| Pigment dispersion II-34 | Bk dispersion including polymer II-30 | |
| Pigment dispersion II-35 | Bk dispersion including polymer II-31 | |
| Pigment dispersion II-36 | Bk dispersion including polymer II-32 | |
| Pigment dispersion II-37 | Bk dispersion including polymer II-33 | |
| Pigment dispersion II-38 | Bk dispersion including polymer II-34 | |
| Pigment dispersion II-39 | Bk dispersion including polymer II-35 | |
| Pigment dispersion II-40 | Bk dispersion including polymer II-36 | |
| Pigment dispersion II-41 | Bk dispersion including polymer II-37 | |
| Pigment dispersion II-42 | Bk dispersion including polymer II-38 | |
| Pigment dispersion II-43 | Bk dispersion including polymer II-39 | |
| Pigment dispersion II-44 | Bk dispersion including polymer II-40 | |
| Pigment dispersion II-45 | Bk dispersion including polymer II-41 | |
| Pigment dispersion II-46 | Low-molecular-weight bisphosphonic acid *1 | 40 |
| Aqueous solution of polymer I-14 including a solid content of 10% by weight | | |
| Glycerin | | 10 |
| 1,3-butanediol | | 20 |
| 2-ethyl-1,3-hexanediol | | 1 |
| 2,2,4-trimethyl-1,3-pentadiol | | 1 |
| Surfactant (Zonyl FS-300) | | 2 |
| Distilled water | | 26 |
| Total | | 100 |

*1: Low-molecular-weight bisphosphonic acid = 1-hydroxyethylidene-1,1-bisphosphonic acid

Example II-44

The following materials were mixed, stirred for 1.5 hrs and filtered with a membrane filter having an aperture of 1.2 μm to prepare an ink.

| | |
|---|---|
| Pigment Dispersion II-47 | 40.0 |
| (including a solid content of pigment in an amount of 20% by weight) | |
| 1,3-butanediol (hydrosoluble solvent) | 20.0 |
| Glycerin (hydrosoluble solvent) | 10.0 |
| 2-ethyl-1,3-hexanediol (hydrosoluble solvent) | 1.0 |
| 2,2,4-trimethyl-1,3-pentadiol (hydrosoluble solvent) | 1.0 |
| Fluorine surfactant | 2.0 |
| (Zonyl FS-300 from DuPont including a solid content in an amount of 40% by weight) | |
| Aqueous solution of polymer II-14 | 20.0 |
| (including a solid content in an amount of 10% by weight) | |
| Distilled water | 6.0 |

Example II-45

The following materials were mixed, stirred for 1.5 hrs and filtered with a membrane filter having an aperture of 1.2 μm to prepare an ink.

| | |
|---|---|
| Pigment Dispersion II-48 | 40.0 |
| (including a solid content of pigment in an amount of 20% by weight) | |
| 1,3-butanediol (hydrosoluble solvent) | 20.0 |
| Glycerin (hydrosoluble solvent) | 10.0 |
| 2-ethyl-1,3-hexanediol (hydrosoluble solvent) | 1.0 |
| 2,2,4-trimethyl-1,3-pentadiol (hydrosoluble solvent) | 1.0 |
| Fluorine surfactant | 2.0 |
| (Zonyl FS-300 from DuPont including a solid content in an amount of 40% by weight) | |
| Distilled water | 26.0 |

Examples II-46 to II-81 and Comparative Examples II-4 to II-6

The procedure for preparation of the ink in Example II-45 was repeated except for changing the formulation as show in Table II-6 to prepare inks of Examples II-46 to II-81 and Comparative Examples II-4 to II-6. The ink of Example 53 is the ink of Example II-44 naphthalene sulfonic acid Na formalin condensate is excluded from.

TABLE II-6

(1)

| Material | | Example | | | | |
|---|---|---|---|---|---|---|
| | | II-44 | II-45 | II-46 | II-47 | II-48 |
| Pigment dispersion II-47 | Naphthalene sulfonic acid Na | 40 | | | | |
| Pigment dispersion II-48 | Bk dispersion including polymer II-42 | | 40 | | | |

TABLE II-6-continued

| | | | | |
|---|---|---|---|---|
| Pigment dispersion II-49 | Bk dispersion including polymer II-43 | 40 | | |
| Pigment dispersion II-50 | Bk dispersion including polymer II-44 | | 40 | |
| Pigment dispersion II-51 | Bk dispersion including polymer II-45 | | | 40 |
| Pigment dispersion II-52 | Bk dispersion including polymer II-46 | | | |
| Pigment dispersion II-53 | Bk dispersion including polymer II-47 | | | |
| Pigment dispersion II-54 | Bk dispersion including polymer II-48 | | | |
| Pigment dispersion II-55 | Bk dispersion including polymer II-49 | | | |
| Pigment dispersion II-56 | Cy dispersion including polymer II-49 | | | |
| Pigment dispersion II-57 | Ma dispersion including polymer II-49 | | | |
| Pigment dispersion II-58 | Ye dispersion including polymer II-49 | | | |
| Pigment dispersion II-59 | Bk dispersion including polymer II-50 | | | |
| Pigment dispersion II-60 | Bk dispersion including polymer II-51 | | | |
| Pigment dispersion II-61 | Bk dispersion including polymer II-52 | | | |
| Pigment dispersion II-62 | Bk dispersion including polymer II-53 | | | |
| Pigment dispersion II-63 | Bk dispersion including polymer II-54 | | | |
| Pigment dispersion II-64 | Bk dispersion including polymer II-55 | | | |
| Pigment dispersion II-65 | Bk dispersion including polymer II-56 | | | |
| Pigment dispersion II-66 | Bk dispersion including polymer II-57 | | | |
| Pigment dispersion II-67 | Bk dispersion including polymer II-58 | | | |
| Pigment dispersion II-68 | Bk dispersion including polymer II-59 | | | |
| Pigment dispersion II-69 | Bk dispersion including polymer II-60 | | | |
| Pigment dispersion II-70 | Bk dispersion including polymer II-61 | | | |
| Pigment dispersion II-71 | Bk dispersion including polymer II-62 | | | |
| Pigment dispersion II-72 | Bk dispersion including polymer II-63 | | | |
| Pigment dispersion II-73 | Bk dispersion including polymer II-64 | | | |
| Pigment dispersion II-74 | Bk dispersion including polymer II-65 | | | |

TABLE II-6-continued

| | | | | | | |
|---|---|---|---|---|---|---|
| Pigment dispersion II-75 | Bk dispersion including polymer II-66 | | | | | |
| Pigment dispersion II-76 | Bk dispersion including polymer II-67 | | | | | |
| Pigment dispersion II-77 | Bk dispersion including polymer II-68 | | | | | |
| Pigment dispersion II-78 | Bk dispersion including polymer II-69 | | | | | |
| Pigment dispersion II-79 | Bk dispersion including polymer II-70 | | | | | |
| Pigment dispersion II-80 | Bk dispersion including polymer II-71 | | | | | |
| Pigment dispersion II-81 | Bk dispersion including polymer II-72 | | | | | |
| Pigment dispersion II-82 | Bk dispersion including polymer II-73 | | | | | |
| Pigment dispersion II-83 | Bk dispersion including polymer II-74 | | | | | |
| Pigment dispersion II-84 | Bk dispersion including polymer II-75 | | | | | |
| Pigment dispersion II-85 | Bk dispersion including polymer II-76 | | | | | |
| Pigment dispersion II-86 | Bk dispersion including polymer II-77 | | | | | |
| Pigment dispersion II-87 | Low-molecular-weight bisphosphonic acid *1 | | | | | |
| Aqueous solution of polymer I-14 including a solid content of 10% by weight | | 20 | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 6 | 26 | 26 | 26 | 26 |
| Total | | 100 | 100 | 100 | 100 | 100 |

(2)

| | | Example | | | | |
|---|---|---|---|---|---|---|
| | Material | II-49 | II-50 | II-51 | II-52 | II-53 |
| Pigment dispersion II-47 | Naphthalene sulfonic acid Na | | | | | |
| Pigment dispersion II-48 | Bk dispersion including polymer II-42 | | | | | |
| Pigment dispersion II-49 | Bk dispersion including polymer II-43 | | | | | |
| Pigment dispersion II-50 | Bk dispersion including polymer II-44 | | | | | |
| Pigment dispersion II-51 | Bk dispersion including polymer II-45 | | | | | |
| Pigment dispersion II-52 | Bk dispersion including polymer II-46 | 40 | | | | |

TABLE II-6-continued

| | | | | | |
|---|---|---|---|---|---|
| Pigment dispersion II-53 | Bk dispersion including polymer II-47 | 40 | | | |
| Pigment dispersion II-54 | Bk dispersion including polymer II-48 | | 40 | | |
| Pigment dispersion II-55 | Bk dispersion including polymer II-49 | | | 40 | |
| Pigment dispersion II-56 | Cy dispersion including polymer II-49 | | | | 40 |
| Pigment dispersion II-57 | Ma dispersion including polymer II-49 | | | | |
| Pigment dispersion II-58 | Ye dispersion including polymer II-49 | | | | |
| Pigment dispersion II-59 | Bk dispersion including polymer II-50 | | | | |
| Pigment dispersion II-60 | Bk dispersion including polymer II-51 | | | | |
| Pigment dispersion II-61 | Bk dispersion including polymer II-52 | | | | |
| Pigment dispersion II-62 | Bk dispersion including polymer II-53 | | | | |
| Pigment dispersion II-63 | Bk dispersion including polymer II-54 | | | | |
| Pigment dispersion II-64 | Bk dispersion including polymer II-55 | | | | |
| Pigment dispersion II-65 | Bk dispersion including polymer II-56 | | | | |
| Pigment dispersion II-66 | Bk dispersion including polymer II-57 | | | | |
| Pigment dispersion II-67 | Bk dispersion including polymer II-58 | | | | |
| Pigment dispersion II-68 | Bk dispersion including polymer II-59 | | | | |
| Pigment dispersion II-69 | Bk dispersion including polymer II-60 | | | | |
| Pigment dispersion II-70 | Bk dispersion including polymer II-61 | | | | |
| Pigment dispersion II-71 | Bk dispersion including polymer II-62 | | | | |
| Pigment dispersion II-72 | Bk dispersion including polymer II-63 | | | | |
| Pigment dispersion II-73 | Bk dispersion including polymer II-64 | | | | |
| Pigment dispersion II-74 | Bk dispersion including polymer II-65 | | | | |
| Pigment dispersion II-75 | Bk dispersion including polymer II-66 | | | | |
| Pigment dispersion II-76 | Bk dispersion including polymer II-67 | | | | |
| Pigment dispersion II-77 | Bk dispersion including polymer II-68 | | | | |
| Pigment dispersion II-78 | Bk dispersion including polymer II-69 | | | | |

TABLE II-6-continued

| | Material | | | | | |
|---|---|---|---|---|---|---|
| Pigment dispersion II-79 | Bk dispersion including polymer II-70 | | | | | |
| Pigment dispersion II-80 | Bk dispersion including polymer II-71 | | | | | |
| Pigment dispersion II-81 | Bk dispersion including polymer II-72 | | | | | |
| Pigment dispersion II-82 | Bk dispersion including polymer II-73 | | | | | |
| Pigment dispersion II-83 | Bk dispersion including polymer II-74 | | | | | |
| Pigment dispersion II-84 | Bk dispersion including polymer II-75 | | | | | |
| Pigment dispersion II-85 | Bk dispersion including polymer II-76 | | | | | |
| Pigment dispersion II-86 | Bk dispersion including polymer II-77 | | | | | |
| Pigment dispersion II-87 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

(3)

| | | Example | | | | |
|---|---|---|---|---|---|---|
| | Material | II-54 | II-55 | II-56 | II-57 | II-58 |
| Pigment dispersion II-47 | Naphthalene sulfonic acid Na | | | | | |
| Pigment dispersion II-48 | Bk dispersion including polymer II-42 | | | | | |
| Pigment dispersion II-49 | Bk dispersion including polymer II-43 | | | | | |
| Pigment dispersion II-50 | Bk dispersion including polymer II-44 | | | | | |
| Pigment dispersion II-51 | Bk dispersion including polymer II-45 | | | | | |
| Pigment dispersion II-52 | Bk dispersion including polymer II-46 | | | | | |
| Pigment dispersion II-53 | Bk dispersion including polymer II-47 | | | | | |
| Pigment dispersion II-54 | Bk dispersion including polymer II-48 | | | | | |
| Pigment dispersion II-55 | Bk dispersion including polymer II-49 | | | | | |
| Pigment dispersion II-56 | Cy dispersion including polymer II-49 | | | | | |

TABLE II-6-continued

| | | | | | |
|---|---|---|---|---|---|
| Pigment dispersion II-57 | Ma dispersion including polymer II-49 | 40 | | | |
| Pigment dispersion II-58 | Ye dispersion including polymer II-49 | | 40 | | |
| Pigment dispersion II-59 | Bk dispersion including polymer II-50 | | | 40 | |
| Pigment dispersion II-60 | Bk dispersion including polymer II-51 | | | | 40 |
| Pigment dispersion II-61 | Bk dispersion including polymer II-52 | | | | | 40 |
| Pigment dispersion II-62 | Bk dispersion including polymer II-53 | | | | |
| Pigment dispersion II-63 | Bk dispersion including polymer II-54 | | | | |
| Pigment dispersion II-64 | Bk dispersion including polymer II-55 | | | | |
| Pigment dispersion II-65 | Bk dispersion including polymer II-56 | | | | |
| Pigment dispersion II-66 | Bk dispersion including polymer II-57 | | | | |
| Pigment dispersion II-67 | Bk dispersion including polymer II-58 | | | | |
| Pigment dispersion II-68 | Bk dispersion including polymer II-59 | | | | |
| Pigment dispersion II-69 | Bk dispersion including polymer II-60 | | | | |
| Pigment dispersion II-70 | Bk dispersion including polymer II-61 | | | | |
| Pigment dispersion II-71 | Bk dispersion including polymer II-62 | | | | |
| Pigment dispersion II-72 | Bk dispersion including polymer II-63 | | | | |
| Pigment dispersion II-73 | Bk dispersion including polymer II-64 | | | | |
| Pigment dispersion II-74 | Bk dispersion including polymer II-65 | | | | |
| Pigment dispersion II-75 | Bk dispersion including polymer II-66 | | | | |
| Pigment dispersion II-76 | Bk dispersion including polymer II-67 | | | | |
| Pigment dispersion II-77 | Bk dispersion including polymer II-68 | | | | |
| Pigment dispersion II-78 | Bk dispersion including polymer II-69 | | | | |
| Pigment dispersion II-79 | Bk dispersion including polymer II-70 | | | | |
| Pigment dispersion II-80 | Bk dispersion including polymer II-71 | | | | |
| Pigment dispersion II-81 | Bk dispersion including polymer II-72 | | | | |
| Pigment dispersion II-82 | Bk dispersion including polymer II-73 | | | | |

TABLE II-6-continued

| | | | | | | |
|---|---|---|---|---|---|---|
| Pigment dispersion II-83 | Bk dispersion including polymer II-74 | | | | | |
| Pigment dispersion II-84 | Bk dispersion including polymer II-75 | | | | | |
| Pigment dispersion II-85 | Bk dispersion including polymer II-76 | | | | | |
| Pigment dispersion II-86 | Bk dispersion including polymer II-77 | | | | | |
| Pigment dispersion II-87 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

(4)

| | | Example | | | | |
|---|---|---|---|---|---|---|
| | Material | II-59 | II-60 | II-61 | II-62 | II-63 |
| Pigment dispersion II-47 | Naphthalene sulfonic acid Na | | | | | |
| Pigment dispersion II-48 | Bk dispersion including polymer II-42 | | | | | |
| Pigment dispersion II-49 | Bk dispersion including polymer II-43 | | | | | |
| Pigment dispersion II-50 | Bk dispersion including polymer II-44 | | | | | |
| Pigment dispersion II-51 | Bk dispersion including polymer II-45 | | | | | |
| Pigment dispersion II-52 | Bk dispersion including polymer II-46 | | | | | |
| Pigment dispersion II-53 | Bk dispersion including polymer II-47 | | | | | |
| Pigment dispersion II-54 | Bk dispersion including polymer II-48 | | | | | |
| Pigment dispersion II-55 | Bk dispersion including polymer II-49 | | | | | |
| Pigment dispersion II-56 | Cy dispersion including polymer II-49 | | | | | |
| Pigment dispersion II-57 | Ma dispersion including polymer II-49 | | | | | |
| Pigment dispersion II-58 | Ye dispersion including polymer II-49 | | | | | |
| Pigment dispersion II-59 | Bk dispersion including polymer II-50 | | | | | |
| Pigment dispersion II-60 | Bk dispersion including polymer II-51 | | | | | |

TABLE II-6-continued

| Pigment dispersion | Component | C1 | C2 | C3 | C4 | C5 | C6 |
|---|---|---|---|---|---|---|---|
| Pigment dispersion II-61 | Bk dispersion including polymer II-52 | | | | | | |
| Pigment dispersion II-62 | Bk dispersion including polymer II-53 | 40 | | | | | |
| Pigment dispersion II-63 | Bk dispersion including polymer II-54 | | 40 | | | | |
| Pigment dispersion II-64 | Bk dispersion including polymer II-55 | | | 40 | | | |
| Pigment dispersion II-65 | Bk dispersion including polymer II-56 | | | | 40 | | |
| Pigment dispersion II-66 | Bk dispersion including polymer II-57 | | | | | 40 | |
| Pigment dispersion II-67 | Bk dispersion including polymer II-58 | | | | | | |
| Pigment dispersion II-68 | Bk dispersion including polymer II-59 | | | | | | |
| Pigment dispersion II-69 | Bk dispersion including polymer II-60 | | | | | | |
| Pigment dispersion II-70 | Bk dispersion including polymer II-61 | | | | | | |
| Pigment dispersion II-71 | Bk dispersion including polymer II-62 | | | | | | |
| Pigment dispersion II-72 | Bk dispersion including polymer II-63 | | | | | | |
| Pigment dispersion II-73 | Bk dispersion including polymer II-64 | | | | | | |
| Pigment dispersion II-74 | Bk dispersion including polymer II-65 | | | | | | |
| Pigment dispersion II-75 | Bk dispersion including polymer II-66 | | | | | | |
| Pigment dispersion II-76 | Bk dispersion including polymer II-67 | | | | | | |
| Pigment dispersion II-77 | Bk dispersion including polymer II-68 | | | | | | |
| Pigment dispersion II-78 | Bk dispersion including polymer II-69 | | | | | | |
| Pigment dispersion II-79 | Bk dispersion including polymer II-70 | | | | | | |
| Pigment dispersion II-80 | Bk dispersion including polymer II-71 | | | | | | |
| Pigment dispersion II-81 | Bk dispersion including polymer II-72 | | | | | | |
| Pigment dispersion II-82 | Bk dispersion including polymer II-73 | | | | | | |
| Pigment dispersion II-83 | Bk dispersion including polymer II-74 | | | | | | |
| Pigment dispersion II-84 | Bk dispersion including polymer II-75 | | | | | | |
| Pigment dispersion II-85 | Bk dispersion including polymer II-76 | | | | | | |

TABLE II-6-continued

| | | | | | | |
|---|---|---|---|---|---|---|
| Pigment dispersion II-86 | Bk dispersion including polymer II-77 | | | | | |
| Pigment dispersion II-87 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

(5)

| | | Example | | | | |
|---|---|---|---|---|---|---|
| Material | | II-64 | II-65 | II-66 | II-67 | II-68 |
| Pigment dispersion II-47 | Naphthalene sulfonic acid Na | | | | | |
| Pigment dispersion II-48 | Bk dispersion including polymer II-42 | | | | | |
| Pigment dispersion II-49 | Bk dispersion including polymer II-43 | | | | | |
| Pigment dispersion II-50 | Bk dispersion including polymer II-44 | | | | | |
| Pigment dispersion II-51 | Bk dispersion including polymer II-45 | | | | | |
| Pigment dispersion II-52 | Bk dispersion including polymer II-46 | | | | | |
| Pigment dispersion II-53 | Bk dispersion including polymer II-47 | | | | | |
| Pigment dispersion II-54 | Bk dispersion including polymer II-48 | | | | | |
| Pigment dispersion II-55 | Bk dispersion including polymer II-49 | | | | | |
| Pigment dispersion II-56 | Cy dispersion including polymer II-49 | | | | | |
| Pigment dispersion II-57 | Ma dispersion including polymer II-49 | | | | | |
| Pigment dispersion II-58 | Ye dispersion including polymer II-49 | | | | | |
| Pigment dispersion II-59 | Bk dispersion including polymer II-50 | | | | | |
| Pigment dispersion II-60 | Bk dispersion including polymer II-51 | | | | | |
| Pigment dispersion II-61 | Bk dispersion including polymer II-52 | | | | | |
| Pigment dispersion II-62 | Bk dispersion including polymer II-53 | | | | | |
| Pigment dispersion II-63 | Bk dispersion including polymer II-54 | | | | | |

TABLE II-6-continued

| | | | | | | |
|---|---|---|---|---|---|---|
| Pigment dispersion II-64 | Bk dispersion including polymer II-55 | | | | | |
| Pigment dispersion II-65 | Bk dispersion including polymer II-56 | | | | | |
| Pigment dispersion II-66 | Bk dispersion including polymer II-57 | | | | | |
| Pigment dispersion II-67 | Bk dispersion including polymer II-58 | 40 | | | | |
| Pigment dispersion II-68 | Bk dispersion including polymer II-59 | | 40 | | | |
| Pigment dispersion II-69 | Bk dispersion including polymer II-60 | | | 40 | | |
| Pigment dispersion II-70 | Bk dispersion including polymer II-61 | | | | 40 | |
| Pigment dispersion II-71 | Bk dispersion including polymer II-62 | | | | | 40 |
| Pigment dispersion II-72 | Bk dispersion including polymer II-63 | | | | | |
| Pigment dispersion II-73 | Bk dispersion including polymer II-64 | | | | | |
| Pigment dispersion II-74 | Bk dispersion including polymer II-65 | | | | | |
| Pigment dispersion II-75 | Bk dispersion including polymer II-66 | | | | | |
| Pigment dispersion II-76 | Bk dispersion including polymer II-67 | | | | | |
| Pigment dispersion II-77 | Bk dispersion including polymer II-68 | | | | | |
| Pigment dispersion II-78 | Bk dispersion including polymer II-69 | | | | | |
| Pigment dispersion II-79 | Bk dispersion including polymer II-70 | | | | | |
| Pigment dispersion II-80 | Bk dispersion including polymer II-71 | | | | | |
| Pigment dispersion II-81 | Bk dispersion including polymer II-72 | | | | | |
| Pigment dispersion II-82 | Bk dispersion including polymer II-73 | | | | | |
| Pigment dispersion II-83 | Bk dispersion including polymer II-74 | | | | | |
| Pigment dispersion II-84 | Bk dispersion including polymer II-75 | | | | | |
| Pigment dispersion II-85 | Bk dispersion including polymer II-76 | | | | | |
| Pigment dispersion II-86 | Bk dispersion including polymer II-77 | | | | | |
| Pigment dispersion II-87 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |

TABLE II-6-continued

|  |  |  |  |  |  |
|---|---|---|---|---|---|
| 2-ethyl-1,3-hexanediol | 1 | 1 | 1 | 1 | 1 |
| 2,2,4-trimethyl-1,3-pentadiol | 1 | 1 | 1 | 1 | 1 |
| Surfactant (Zonyl FS-300) | 2 | 2 | 2 | 2 | 2 |
| Distilled water | 26 | 26 | 26 | 26 | 26 |
| Total | 100 | 100 | 100 | 100 | 100 |

(6)

| Material | | Example | | | | |
|---|---|---|---|---|---|---|
| | | II-69 | II-70 | II-71 | II-72 | II-73 |
| Pigment dispersion II-47 | Naphthalene sulfonic acid Na | | | | | |
| Pigment dispersion II-48 | Bk dispersion including polymer II-42 | | | | | |
| Pigment dispersion II-49 | Bk dispersion including polymer II-43 | | | | | |
| Pigment dispersion II-50 | Bk dispersion including polymer II-44 | | | | | |
| Pigment dispersion II-51 | Bk dispersion including polymer II-45 | | | | | |
| Pigment dispersion II-52 | Bk dispersion including polymer II-46 | | | | | |
| Pigment dispersion II-53 | Bk dispersion including polymer II-47 | | | | | |
| Pigment dispersion II-54 | Bk dispersion including polymer II-48 | | | | | |
| Pigment dispersion II-55 | Bk dispersion including polymer II-49 | | | | | |
| Pigment dispersion II-56 | Cy dispersion including polymer II-49 | | | | | |
| Pigment dispersion II-57 | Ma dispersion including polymer II-49 | | | | | |
| Pigment dispersion II-58 | Ye dispersion including polymer II-49 | | | | | |
| Pigment dispersion II-59 | Bk dispersion including polymer II-50 | | | | | |
| Pigment dispersion II-60 | Bk dispersion including polymer II-51 | | | | | |
| Pigment dispersion II-61 | Bk dispersion including polymer II-52 | | | | | |
| Pigment dispersion II-62 | Bk dispersion including polymer II-53 | | | | | |
| Pigment dispersion II-63 | Bk dispersion including polymer II-54 | | | | | |
| Pigment dispersion II-64 | Bk dispersion including polymer II-55 | | | | | |
| Pigment dispersion II-65 | Bk dispersion including polymer II-56 | | | | | |
| Pigment dispersion II-66 | Bk dispersion including polymer II-57 | | | | | |

TABLE II-6-continued

| | | | | | | |
|---|---|---|---|---|---|---|
| Pigment dispersion II-67 | Bk dispersion including polymer II-58 | | | | | |
| Pigment dispersion II-68 | Bk dispersion including polymer II-59 | | | | | |
| Pigment dispersion II-69 | Bk dispersion including polymer II-60 | | | | | |
| Pigment dispersion II-70 | Bk dispersion including polymer II-61 | | | | | |
| Pigment dispersion II-71 | Bk dispersion including polymer II-62 | | | | | |
| Pigment dispersion II-72 | Bk dispersion including polymer II-63 | 40 | | | | |
| Pigment dispersion II-73 | Bk dispersion including polymer II-64 | | 40 | | | |
| Pigment dispersion II-74 | Bk dispersion including polymer II-65 | | | 40 | | |
| Pigment dispersion II-75 | Bk dispersion including polymer II-66 | | | | 40 | |
| Pigment dispersion II-76 | Bk dispersion including polymer II-67 | | | | | 40 |
| Pigment dispersion II-77 | Bk dispersion including polymer II-68 | | | | | |
| Pigment dispersion II-78 | Bk dispersion including polymer II-69 | | | | | |
| Pigment dispersion II-79 | Bk dispersion including polymer II-70 | | | | | |
| Pigment dispersion II-80 | Bk dispersion including polymer II-71 | | | | | |
| Pigment dispersion II-81 | Bk dispersion including polymer II-72 | | | | | |
| Pigment dispersion II-82 | Bk dispersion including polymer II-73 | | | | | |
| Pigment dispersion II-83 | Bk dispersion including polymer II-74 | | | | | |
| Pigment dispersion II-84 | Bk dispersion including polymer II-75 | | | | | |
| Pigment dispersion II-85 | Bk dispersion including polymer II-76 | | | | | |
| Pigment dispersion II-86 | Bk dispersion including polymer II-77 | | | | | |
| Pigment dispersion II-87 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |

TABLE II-6-continued

| | | | | | | |
|---|---|---|---|---|---|---|
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

(7)

| | | Example | | | | |
|---|---|---|---|---|---|---|
| Material | | II-74 | II-75 | II-76 | II-77 | II-78 |
| Pigment dispersion II-47 | Naphthalene sulfonic acid Na | | | | | |
| Pigment dispersion II-48 | Bk dispersion including polymer II-42 | | | | | |
| Pigment dispersion II-49 | Bk dispersion including polymer II-43 | | | | | |
| Pigment dispersion II-50 | Bk dispersion including polymer II-44 | | | | | |
| Pigment dispersion II-51 | Bk dispersion including polymer II-45 | | | | | |
| Pigment dispersion II-52 | Bk dispersion including polymer II-46 | | | | | |
| Pigment dispersion II-53 | Bk dispersion including polymer II-47 | | | | | |
| Pigment dispersion II-54 | Bk dispersion including polymer II-48 | | | | | |
| Pigment dispersion II-55 | Bk dispersion including polymer II-49 | | | | | |
| Pigment dispersion II-56 | Cy dispersion including polymer II-49 | | | | | |
| Pigment dispersion II-57 | Ma dispersion including polymer II-49 | | | | | |
| Pigment dispersion II-58 | Ye dispersion including polymer II-49 | | | | | |
| Pigment dispersion II-59 | Bk dispersion including polymer II-50 | | | | | |
| Pigment dispersion II-60 | Bk dispersion including polymer II-51 | | | | | |
| Pigment dispersion II-61 | Bk dispersion including polymer II-52 | | | | | |
| Pigment dispersion II-62 | Bk dispersion including polymer II-53 | | | | | |
| Pigment dispersion II-63 | Bk dispersion including polymer II-54 | | | | | |
| Pigment dispersion II-64 | Bk dispersion including polymer II-55 | | | | | |
| Pigment dispersion II-65 | Bk dispersion including polymer II-56 | | | | | |
| Pigment dispersion II-66 | Bk dispersion including polymer II-57 | | | | | |
| Pigment dispersion II-67 | Bk dispersion including polymer II-58 | | | | | |
| Pigment dispersion II-68 | Bk dispersion including polymer II-59 | | | | | |
| Pigment dispersion II-69 | Bk dispersion including polymer II-60 | | | | | |

TABLE II-6-continued

| | | | | | | |
|---|---|---|---|---|---|---|
| Pigment dispersion II-70 | Bk dispersion including polymer II-61 | | | | | |
| Pigment dispersion II-71 | Bk dispersion including polymer II-62 | | | | | |
| Pigment dispersion II-72 | Bk dispersion including polymer II-63 | | | | | |
| Pigment dispersion II-73 | Bk dispersion including polymer II-64 | | | | | |
| Pigment dispersion II-74 | Bk dispersion including polymer II-65 | | | | | |
| Pigment dispersion II-75 | Bk dispersion including polymer II-66 | | | | | |
| Pigment dispersion II-76 | Bk dispersion including polymer II-67 | | | | | |
| Pigment dispersion II-77 | Bk dispersion including polymer II-68 | 40 | | | | |
| Pigment dispersion II-78 | Bk dispersion including polymer II-69 | | 40 | | | |
| Pigment dispersion II-79 | Bk dispersion including polymer II-70 | | | 40 | | |
| Pigment dispersion II-80 | Bk dispersion including polymer II-71 | | | | 40 | |
| Pigment dispersion II-81 | Bk dispersion including polymer II-72 | | | | | 40 |
| Pigment dispersion II-82 | Bk dispersion including polymer II-73 | | | | | |
| Pigment dispersion II-83 | Bk dispersion including polymer II-74 | | | | | |
| Pigment dispersion II-84 | Bk dispersion including polymer II-75 | | | | | |
| Pigment dispersion II-85 | Bk dispersion including polymer II-76 | | | | | |
| Pigment dispersion II-86 | Bk dispersion including polymer II-77 | | | | | |
| Pigment dispersion II-87 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

TABLE II-6-continued

| | | Example | | | Com. Ex. | |
|---|---|---|---|---|---|---|
| Material | | II-79 | II-80 | II-81 | II-4 | II-5 |
| Pigment dispersion II-47 | Naphthalene sulfonic acid Na | | | | | |
| Pigment dispersion II-48 | Bk dispersion including polymer II-42 | | | | | |
| Pigment dispersion II-49 | Bk dispersion including polymer II-43 | | | | | |
| Pigment dispersion II-50 | Bk dispersion including polymer II-44 | | | | | |
| Pigment dispersion II-51 | Bk dispersion including polymer II-45 | | | | | |
| Pigment dispersion II-52 | Bk dispersion including polymer II-46 | | | | | |
| Pigment dispersion II-53 | Bk dispersion including polymer II-47 | | | | | |
| Pigment dispersion II-54 | Bk dispersion including polymer II-48 | | | | | |
| Pigment dispersion II-55 | Bk dispersion including polymer II-49 | | | | | |
| Pigment dispersion II-56 | Cy dispersion including polymer II-49 | | | | | |
| Pigment dispersion II-57 | Ma dispersion including polymer II-49 | | | | | |
| Pigment dispersion II-58 | Ye dispersion including polymer II-49 | | | | | |
| Pigment dispersion II-59 | Bk dispersion including polymer II-50 | | | | | |
| Pigment dispersion II-60 | Bk dispersion including polymer II-51 | | | | | |
| Pigment dispersion II-61 | Bk dispersion including polymer II-52 | | | | | |
| Pigment dispersion II-62 | Bk dispersion including polymer II-53 | | | | | |
| Pigment dispersion II-63 | Bk dispersion including polymer II-54 | | | | | |
| Pigment dispersion II-64 | Bk dispersion including polymer II-55 | | | | | |
| Pigment dispersion II-65 | Bk dispersion including polymer II-56 | | | | | |
| Pigment dispersion II-66 | Bk dispersion including polymer II-57 | | | | | |
| Pigment dispersion II-67 | Bk dispersion including polymer II-58 | | | | | |
| Pigment dispersion II-68 | Bk dispersion including polymer II-59 | | | | | |
| Pigment dispersion II-69 | Bk dispersion including polymer II-60 | | | | | |
| Pigment dispersion II-70 | Bk dispersion including polymer II-61 | | | | | |
| Pigment dispersion II-71 | Bk dispersion including polymer II-62 | | | | | |

TABLE II-6-continued

| Pigment dispersion II-72 | Bk dispersion including polymer II-63 | | | | | |
|---|---|---|---|---|---|---|
| Pigment dispersion II-73 | Bk dispersion including polymer II-64 | | | | | |
| Pigment dispersion II-74 | Bk dispersion including polymer II-65 | | | | | |
| Pigment dispersion II-75 | Bk dispersion including polymer II-66 | | | | | |
| Pigment dispersion II-76 | Bk dispersion including polymer II-67 | | | | | |
| Pigment dispersion II-77 | Bk dispersion including polymer II-68 | | | | | |
| Pigment dispersion II-78 | Bk dispersion including polymer II-69 | | | | | |
| Pigment dispersion II-79 | Bk dispersion including polymer II-70 | | | | | |
| Pigment dispersion II-80 | Bk dispersion including polymer II-71 | | | | | |
| Pigment dispersion II-81 | Bk dispersion including polymer II-72 | | | | | |
| Pigment dispersion II-82 | Bk dispersion including polymer II-73 | 40 | | | | |
| Pigment dispersion II-83 | Bk dispersion including polymer II-74 | | 40 | | | |
| Pigment dispersion II-84 | Bk dispersion including polymer II-75 | | | 40 | | |
| Pigment dispersion II-85 | Bk dispersion including polymer II-76 | | | | 40 | |
| Pigment dispersion II-86 | Bk dispersion including polymer II-77 | | | | | 40 |
| Pigment dispersion II-87 | Low-molecular-weight bisphosphonic acid *1 | | | | | |
| Aqueous solution of polymer I-14 including a solid content of 10% by weight | | | | | | |
| Glycerin | | 10 | 10 | 10 | 10 | 10 |
| 1,3-butanediol | | 20 | 20 | 20 | 20 | 20 |
| 2-ethyl-1,3-hexanediol | | 1 | 1 | 1 | 1 | 1 |
| 2,2,4-trimethyl-1,3-pentadiol | | 1 | 1 | 1 | 1 | 1 |
| Surfactant (Zonyl FS-300) | | 2 | 2 | 2 | 2 | 2 |
| Distilled water | | 26 | 26 | 26 | 26 | 26 |
| Total | | 100 | 100 | 100 | 100 | 100 |

(9)

| Material | Com. Ex. II-79 |
|---|---|
| Pigment dispersion II-47 | Naphthalene sulfonic acid Na |
| Pigment dispersion II-48 | Bk dispersion including polymer II-42 |
| Pigment dispersion II-49 | Bk dispersion including polymer II-43 |
| Pigment dispersion II-50 | Bk dispersion including polymer II-44 |
| Pigment dispersion II-51 | Bk dispersion including polymer II-45 |

TABLE II-6-continued

| | | |
|---|---|---|
| Pigment dispersion II-52 | Bk dispersion including polymer II-46 | |
| Pigment dispersion II-53 | Bk dispersion including polymer II-47 | |
| Pigment dispersion II-54 | Bk dispersion including polymer II-48 | |
| Pigment dispersion II-55 | Bk dispersion including polymer II-49 | |
| Pigment dispersion II-56 | Cy dispersion including polymer II-49 | |
| Pigment dispersion II-57 | Ma dispersion including polymer II-49 | |
| Pigment dispersion II-58 | Ye dispersion including polymer II-49 | |
| Pigment dispersion II-59 | Bk dispersion including polymer II-50 | |
| Pigment dispersion II-60 | Bk dispersion including polymer II-51 | |
| Pigment dispersion II-61 | Bk dispersion including polymer II-52 | |
| Pigment dispersion II-62 | Bk dispersion including polymer II-53 | |
| Pigment dispersion II-63 | Bk dispersion including polymer II-54 | |
| Pigment dispersion II-64 | Bk dispersion including polymer II-55 | |
| Pigment dispersion II-65 | Bk dispersion including polymer II-56 | |
| Pigment dispersion II-66 | Bk dispersion including polymer II-57 | |
| Pigment dispersion II-67 | Bk dispersion including polymer II-58 | |
| Pigment dispersion II-68 | Bk dispersion including polymer II-59 | |
| Pigment dispersion II-69 | Bk dispersion including polymer II-60 | |
| Pigment dispersion II-70 | Bk dispersion including polymer II-61 | |
| Pigment dispersion II-71 | Bk dispersion including polymer II-62 | |
| Pigment dispersion II-72 | Bk dispersion including polymer II-63 | |
| Pigment dispersion II-73 | Bk dispersion including polymer II-64 | |
| Pigment dispersion II-74 | Bk dispersion including polymer II-65 | |
| Pigment dispersion II-75 | Bk dispersion including polymer II-66 | |
| Pigment dispersion II-76 | Bk dispersion including polymer II-67 | |
| Pigment dispersion II-77 | Bk dispersion including polymer II-68 | |
| Pigment dispersion II-78 | Bk dispersion including polymer II-69 | |
| Pigment dispersion II-79 | Bk dispersion including polymer II-70 | |
| Pigment dispersion II-80 | Bk dispersion including polymer II-71 | |
| Pigment dispersion II-81 | Bk dispersion including polymer II-72 | |
| Pigment dispersion II-82 | Bk dispersion including polymer II-73 | |
| Pigment dispersion II-83 | Bk dispersion including polymer II-74 | |
| Pigment dispersion II-84 | Bk dispersion including polymer II-75 | |
| Pigment dispersion II-85 | Bk dispersion including polymer II-76 | |
| Pigment dispersion II-86 | Bk dispersion including polymer II-77 | |
| Pigment dispersion II-87 | Low-molecular-weight bisphosphonic acid *1 | 40 |
| Aqueous solution of polymer I-14 including a solid content of 10% by weight | | |
| Glycerin | | 10 |
| 1,3-butanediol | | 20 |
| 2-ethyl-1,3-hexanediol | | 1 |
| 2,2,4-trimethyl-1,3-pentadiol | | 1 |
| Surfactant (Zonyl FS-300) | | 2 |
| Distilled water | | 26 |
| Total | | 100 |

*1: Low-molecular-weight bisphosphonic acid = 1-hydroxyethylidene-1,1-bisphosphonic acid The inks for inkjet recording of Examples II-1 to II-81 and Comparative Examples II-1 to II-6 were evaluated by the following methods. The results are shown in Table II-7.

<Image Density (ID)>

In an environment of 23° C. and 50 RH, the ink was filled in an inkjet printer IPSiO GX5000 from Ricoh Company, Ltd. After a chart on which general marks "■" of JIS X 0208 (1997), 2223 having 64 points are described by Microsoft Word 2003 was printed on a plain paper 1 (XEROX 4200 from XEROX, Inc.) and a plain paper 2 (My Paper from Ricoh Company, Ltd.), the image density of "■" was evaluated using X-Rite938 from X-Rite, Inc. Then, the printing mode was "plain paper-fast" mode by a driver of the printer without color calibration.

Image density was evaluated under the following standard.

(Black)
A: not less than 1.25
B: not less than 1.20 and less than 1.25
C: not less than 1.10 and less than 1.20
D: less than 1.10
E: Unprintable as pigment was gelated and undispersible (Yellow)
A: not less than 0.80
B: not less than 0.75 and less than 0.80
C: not less than 0.70 and less than 0.75
D: less than 0.70
E: Unprintable as pigment was gelated and undispersible (Magenta)
A: not less than 0.95
B: not less than 0.85 and less than 0.95
C: not less than 0.75 and less than 0.85
D: less than 0.75
E: Unprintable as pigment was gelated and undispersible (Cyan)
A: not less than 1.05
B: not less than 0.95 and less than 1.05
C: not less than 0.85 and less than 0.95
D: less than 0.85
E: Unprintable as pigment was gelated and undispersible <Storage Stability of Pigment Dispersion>

Each of the pigment dispersions was placed in a polyethylene container and sealed. The viscosity after stored at 60° C. for 1 week was measured to evaluate under the following standard, compared with the initial viscosity.

Viscosity Variation(%)=(Viscosity after Stored/Viscosity before Stored)×100

The viscosity was measured by a viscometer RE500L from TOKI SANGYO CO., LTD. at 25° C., adjusting the rotational number at from 50 to 100 rpm according the viscosity.

A: Viscosity variation was not greater than ±5%
B: Viscosity variation was greater than ±5% and not greater than ±8%
C: Viscosity variation was greater than ±8% and not greater than ±10%
D: Viscosity variation was greater than ±10% and not greater than ±30%
E: Viscosity variation was greater than ±30% (Unevaluable as pigment was gelated)<

<Storage Stability of Ink>

Each of the inks was filled in an ink cartridge. The viscosity after stored at 60° C. for 1 week was measured to evaluate under the following standard, compared with the initial viscosity.

Viscosity Variation(%)=(Viscosity after Stored/Viscosity before Stored)×100

The viscosity was measured by a viscometer RE500L from TOKI SANGYO CO., LTD. at 25° C., adjusting the rotational number at from 50 to 100 rpm according the viscosity.

A: Viscosity variation was not greater than ±5%
B: Viscosity variation was greater than ±5% and not greater than ±8%
C: Viscosity variation was greater than ±8% and not greater than ±10%
D: Viscosity variation was greater than ±10% and not greater than ±30%
E: Viscosity variation was greater than ±30% (Unevaluable as pigment was gelated)

TABLE II-7

| | | Evaluation Results | | | |
|---|---|---|---|---|---|
| | Pigment Dispersion | ID Plain Paper 1 | ID Plain Paper 2 | Storage Stability of Pigment Dispersion | Storage Stability of Ink |
| Example II-1 | Pigment Dispersion II-1 | B | B | B | C |
| Example II-2 | Pigment Dispersion II-2 | B | B | A | B |
| Example II-3 | Pigment Dispersion II-3 | A | A | A | A |
| Example II-4 | Pigment Dispersion II-4 | A | A | A | A |
| Example II-5 | Pigment Dispersion II-5 | A | A | A | A |
| Example II-6 | Pigment Dispersion II-6 | A | A | A | A |
| Example II-7 | Pigment Dispersion II-7 | B | B | A | A |
| Example II-8 | Pigment Dispersion II-8 | A | B | A | A |
| Example II-9 | Pigment Dispersion II-9 | A | A | A | A |
| Example II-10 | Pigment Dispersion II-10 | A | A | A | A |
| Example II-11 | Pigment Dispersion II-11 | A | A | A | A |
| Example II-12 | Pigment Dispersion II-12 | A | A | A | A |
| Example II-13 | Pigment Dispersion II-13 | A | A | A | A |
| Example II-14 | Pigment Dispersion II-14 | A | A | A | A |
| Example II-15 | Pigment Dispersion II-15 | A | A | A | B |
| Example II-16 | Pigment Dispersion II-16 | A | A | B | B |
| Example II-17 | Pigment Dispersion II-17 | A | A | A | A |
| Example II-18 | Pigment Dispersion II-18 | A | A | A | A |
| Example II-19 | Pigment Dispersion II-19 | A | A | A | A |
| Example II-20 | Pigment Dispersion II-20 | A | A | A | A |
| Example II-21 | Pigment Dispersion II-21 | A | A | A | A |
| Example II-22 | Pigment Dispersion II-22 | A | A | A | A |

TABLE II-7-continued

|  | Pigment Dispersion | Evaluation Results | | | |
|---|---|---|---|---|---|
|  |  | ID Plain Paper 1 | ID Plain Paper 2 | Storage Stability of Pigment Dispersion | Storage Stability of Ink |
| Example II-23 | Pigment Dispersion II-23 | A | A | A | A |
| Example II-24 | Pigment Dispersion II-24 | A | A | A | A |
| Example II-25 | Pigment Dispersion II-25 | A | A | A | A |
| Example II-26 | Pigment Dispersion II-26 | A | A | A | A |
| Example II-27 | Pigment Dispersion II-27 | A | A | A | A |
| Example II-28 | Pigment Dispersion II-28 | A | A | A | A |
| Example II-29 | Pigment Dispersion II-29 | A | A | A | A |
| Example II-30 | Pigment Dispersion II-30 | A | A | A | A |
| Example II-31 | Pigment Dispersion II-31 | A | A | A | C |
| Example II-32 | Pigment Dispersion II-32 | A | A | A | A |
| Example II-33 | Pigment Dispersion II-33 | A | A | A | B |
| Example II-34 | Pigment Dispersion II-34 | A | A | A | A |
| Example II-35 | Pigment Dispersion II-35 | A | A | A | A |
| Example II-36 | Pigment Dispersion II-36 | A | A | A | A |
| Example II-37 | Pigment Dispersion II-37 | A | A | A | A |
| Example II-38 | Pigment Dispersion II-38 | A | A | A | A |
| Example II-39 | Pigment Dispersion II-39 | B | B | A | A |
| Example II-40 | Pigment Dispersion II-40 | A | B | A | A |
| Example II-41 | Pigment Dispersion II-41 | A | A | A | B |
| Example II-42 | Pigment Dispersion II-42 | A | A | B | B |
| Example II-43 | Pigment dispersion II-43 | A | A | A | A |
| Example II-44 | Pigment dispersion II-47 | B | B | B | C |
| Example II-45 | Pigment dispersion II-48 | B | B | A | B |
| Example II-46 | Pigment dispersion II-49 | A | A | A | A |
| Example II-47 | Pigment dispersion II-50 | A | A | A | A |
| Example II-48 | Pigment dispersion II-51 | A | A | A | A |
| Example II-49 | Pigment dispersion II-52 | A | A | A | A |
| Example II-50 | Pigment dispersion II-53 | B | B | A | A |
| Example II-51 | Pigment dispersion II-54 | A | B | A | A |
| Example II-52 | Pigment dispersion II-55 | A | A | A | A |
| Example II-53 | Pigment dispersion II-56 | A | A | A | A |
| Example II-54 | Pigment dispersion II-57 | A | A | A | A |
| Example II-55 | Pigment dispersion II-58 | A | A | A | A |
| Example II-56 | Pigment dispersion II-59 | A | A | A | A |
| Example II-57 | Pigment dispersion II-60 | A | A | A | A |
| Example II-58 | Pigment dispersion II-61 | A | A | A | B |

TABLE II-7-continued

| | Pigment Dispersion | Evaluation Results | | | |
|---|---|---|---|---|---|
| | | ID Plain Paper 1 | ID Plain Paper 2 | Storage Stability of Pigment Dispersion | Storage Stability of Ink |
| Example II-59 | Pigment dispersion II-62 | A | A | B | B |
| Example II-60 | Pigment dispersion II-63 | A | A | A | A |
| Example II-61 | Pigment dispersion II-64 | A | A | A | A |
| Example II-62 | Pigment dispersion II-65 | A | A | A | A |
| Example II-63 | Pigment dispersion II-66 | A | A | A | A |
| Example II-64 | Pigment dispersion II-67 | A | A | A | A |
| Example II-65 | Pigment dispersion II-68 | A | A | A | A |
| Example II-66 | Pigment dispersion II-69 | A | A | A | A |
| Example II-67 | Pigment dispersion II-70 | A | A | A | A |
| Example II-68 | Pigment dispersion II-71 | A | A | A | A |
| Example II-69 | Pigment dispersion II-72 | A | A | A | A |
| Example II-70 | Pigment dispersion II-73 | A | A | A | A |
| Example II-71 | Pigment dispersion II-74 | A | A | A | A |
| Example II-72 | Pigment dispersion II-75 | A | A | A | A |
| Example II-73 | Pigment dispersion II-76 | A | A | A | A |
| Example II-74 | Pigment dispersion II-77 | A | A | A | C |
| Example II-75 | Pigment dispersion II-78 | A | A | A | A |
| Example II-76 | Pigment dispersion II-79 | A | A | A | B |
| Example II-77 | Pigment dispersion II-80 | B | B | A | A |
| Example II-78 | Pigment dispersion II-81 | A | B | A | A |
| Example II-79 | Pigment dispersion II-82 | A | A | A | B |
| Example II-80 | Pigment dispersion II-83 | A | A | B | B |
| Example II-81 | Pigment dispersion II-84 | A | A | A | A |
| Comparative Example II-1 | Pigment Dispersion II-44 | C | C | E | E |
| Comparative Example II-2 | Pigment Dispersion II-45 | E | C | E | E |
| Comparative Example II-3 | Pigment Dispersion II-46 | E | E | E | E |
| Comparative Example II-4 | Pigment dispersion II-85 | C | C | E | E |
| Comparative Example II-5 | Pigment dispersion II-86 | E | C | E | E |
| Comparative Example II-6 | Pigment dispersion II-87 | E | E | E | E |

Table II-7 shows the inks of Examples produce images having higher image density than those produced by the inks of Comparative Examples even on typical plain papers, and have good storage stability even when including the hydro-soluble organic solvent in an amount greater than 20% by weight.

Having now fully described the invention, it will be apparent to one of ordinary skill in the art that many changes and modifications can be made thereto without departing from the spirit and scope of the invention as set forth therein.

What is claimed is:

1. An ink for inkjet recording, comprising:
   water;
   a hydrosoluble solvent;
   a pigment; and
   a copolymer comprising; a salt of a diphosphonic acid group, wherein the copolymer comprises structural units having the following formulae (1) and (2):

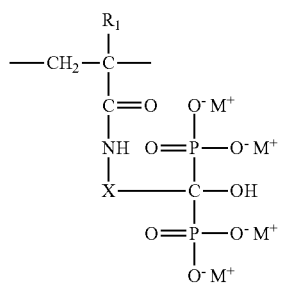

(1)

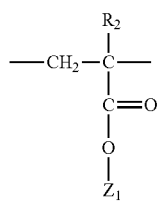

(2)

wherein:
   X represents an alkylene group having 1 to 3 carbon atoms;
   each of $R_1$ and $R_2$ represent a hydrogen atom or a methyl group;
   $M^+$ represents an alkali metal ion, an organic ammonium ion or a proton: and
   $Z_1$ represents a hydrocarbon group having 6 to 22 carbon atoms, wherein the alkali metal ion or the organic ammonium ion and the proton may be mixed, and half or more of the $M^+$ are alkali metal ions or the organic ammonium ions.

2. The ink for inkjet recording of claim 1, wherein the copolymer further comprises:
   a structural unit having the following formula (3a) or (3b):

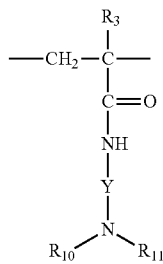

(3a)

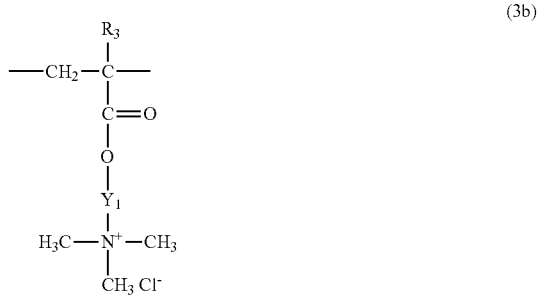

(3b)

wherein:
   $R_3$ represents a hydrogen atom or a methyl group;
   each of $R_{10}$ and $R_{11}$ represents an alkyl group having 1 to 3 carbon atoms;
   Y represents an alkylene group having 1 to 4 carbon atoms; and
   $Y_1$ represents an alkylene group having 1 to 3 carbon atoms.

3. The ink for inkjet recording of claim 1, wherein $Z_1$ represents a benzyl group, a phenetyl group or an alkyl group having 12 to 22 carbon atoms.

4. The ink for inkjet recording of claim 1, wherein the copolymer comprises the 5 structural unit having the following formula (1) in an amount of from 30 to 70% by weight, based on the weight of the copolymer.

5. The ink for inkjet recording of claim 1, wherein the copolymer comprises the structural unit having the following formula (1) in an amount of from 40 to 60% by weight, based on the weight of the copolymer.

6. The ink for inkjet recording of claim 1, wherein an aqueous solution of the copolymer having a concentration of 10% by weight has a viscosity of from 1.5 to 4.0 mPa·s at 25° C.

7. The ink for inkjet recording of claim 1, wherein $M^+$ is a tetraalkylammonium ion.

8. An ink cartridge containing the ink for inkjet recording according to claim 1.

9. An inkjet recording method, comprising: applying a stimulation to the ink for inkjet recording according to claim 1 to fly and record an image.

10. An inkjet recorder, comprising: a flyer configured to apply a stimulation to the ink for inkjet recording according to claim 1 to fly and record an image.

11. An ink-recorded matter having an image recorded by the ink for inkjet recording 25 according to claim 1.

12. An ink for inkjet recording, comprising:
water;
a hydrosoluble solvent;
a pigment; and
a copolymer comprising a salt of a diphosphonic acid group, wherein the copolymer is synthesized by radical polymerization with monomers having the following formulae (4) and (5) as starting materials:

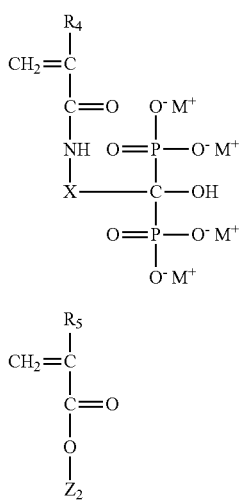

wherein:
X represents an alkylene group having 1 to 3 carbon atoms;
each of $R_4$ and $R_5$ represents a hydrogen atom or a methyl group;
$M^+$ represents an alkali metal ion, an organic ammonium ion or a proton; and
$Z_2$ represents a hydrocarbon group having 6 to 22 carbon atoms.

13. The ink for inkjet recording of claim 12, wherein the copolymer further comprises a structural unit having the following formula (6a) or (6b):

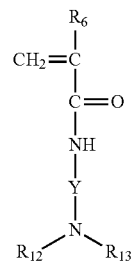

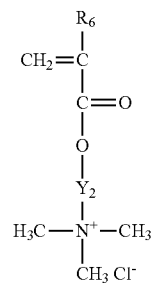

wherein:
$R_6$ represents a hydrogen atom or a methyl group;
each of $R_{12}$ and $R_{13}$ represent an alkyl group having 1 to 3 carbon atoms;
Y represents an alkylene group having 1 to 4 carbon atoms.

14. The ink for inkjet recording of claim 12, wherein $M^+$ is a tetraalkylammonium ion.

15. An ink cartridge containing the ink for inkjet recording according to claim 12.

16. An inkjet recording method, comprising: applying a stimulation to the ink for inkjet recording according to claim 12 to fly and record an image.

17. An inkjet recorder, comprising: a flyer configured to apply a stimulation to the ink for inkjet recording according to claim 12 to fly and record an image.

18. An ink-recorded matter having an image recorded by the ink for inkjet recording 10 according to claim 12.

* * * * *